US012523664B2

United States Patent
Shao et al.

(10) Patent No.: US 12,523,664 B2
(45) Date of Patent: Jan. 13, 2026

(54) SENSOR CHIP AND METHODS THEREOF

(71) Applicant: NATIONAL UNIVERSITY OF SINGAPORE, Singapore (SG)

(72) Inventors: Huilin Shao, Singapore (SG); Zhi Jun Carine Lim, Singapore (SG); Yan Zhang, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 822 days.

(21) Appl. No.: 17/310,289

(22) PCT Filed: Jan. 30, 2020

(86) PCT No.: PCT/IB2020/050765
§ 371 (c)(1),
(2) Date: Jul. 27, 2021

(87) PCT Pub. No.: WO2020/157706
PCT Pub. Date: Aug. 6, 2020

(65) Prior Publication Data
US 2022/0373562 A1 Nov. 24, 2022

(30) Foreign Application Priority Data
Jan. 31, 2019 (SG) .......................... 10201900937Q

(51) Int. Cl.
*G01N 33/68* (2006.01)
*G01N 21/552* (2014.01)
(Continued)

(52) U.S. Cl.
CPC ....... *G01N 33/6896* (2013.01); *G01N 21/554* (2013.01); *G01N 21/59* (2013.01);
(Continued)

(58) Field of Classification Search
CPC .. G01N 33/6896; G01N 21/554; G01N 21/59; G01N 33/54373; G01N 2021/5903;
(Continued)

(56) References Cited

U.S. PATENT DOCUMENTS

| 5,776,785 A | 7/1998 | Lin et al. |
| 7,405,054 B1 * | 7/2008 | Hasenbank ...... G01N 33/54373 |
| | | 436/514 |

(Continued)

FOREIGN PATENT DOCUMENTS

| CN | 106062559 A | 10/2016 |
| CN | 107576805 A | 1/2018 |

(Continued)

OTHER PUBLICATIONS

Kee et al. Plasmonic nanohole arrays for monitoring growth of bacteria and antibiotic susceptibility test. Sensors and Actuators, B: Chemical. 2013;182:576-583. (Year: 2013).*
(Continued)

*Primary Examiner* — Christopher L Chin
*Assistant Examiner* — Ellis Follett Lusi
(74) *Attorney, Agent, or Firm* — Clark & Elbing LLP

(57) ABSTRACT

The present disclosure relates generally to a sensor chip and methods for the detection of an analyte. In particular, the disclosure relates to a sensor chip for detecting an analyte in a subject suffering from a neurodegenerative disease. The sensor chip comprises a conductive layer on a membrane support layer, wherein a plurality of apertures extend through the conductive layer and the membrane support layer and are arranged such that illumination of the conductive layer and/or the membrane support layer produces a surface plasmon resonance.

21 Claims, 29 Drawing Sheets
Specification includes a Sequence Listing.

(51) Int. Cl.
  *G01N 21/59* (2006.01)
  *G01N 33/543* (2006.01)
  *G03F 7/00* (2006.01)
  *G03F 7/20* (2006.01)

(52) U.S. Cl.
  CPC ..... *G01N 33/54373* (2013.01); *G03F 7/0015* (2013.01); *G03F 7/2004* (2013.01); *G01N 2021/5903* (2013.01); *G01N 2333/4709* (2013.01); *G01N 2800/28* (2013.01)

(58) Field of Classification Search
  CPC ....... G01N 2333/4709; G01N 2800/28; G01N 33/532; G01N 33/553; G01N 2800/2814; G01N 2800/2821; G01N 2800/2835; G01N 2800/285; G03F 7/0015; G03F 7/2004; A61P 25/28; B82Y 15/00
  USPC .......... 435/7.92, 7.94, 7.2, 7.1, 4, 28, 287.2, 435/288.7; 436/518, 524, 525, 532
  See application file for complete search history.

(56) References Cited

U.S. PATENT DOCUMENTS

| | | | |
|---|---|---|---|
| 8,958,999 | B1 | 2/2015 | Ptasinski et al. |
| 2012/0105853 | A1* | 5/2012 | Pang ........................ G03H 1/02 356/445 |
| 2012/0184047 | A1 | 7/2012 | Jonsson et al. |
| 2013/0065777 | A1 | 3/2013 | Altug et al. |
| 2014/0256793 | A1 | 9/2014 | Yuyama et al. |
| 2016/0334398 | A1 | 11/2016 | Weissleder |
| 2017/0023476 | A1 | 1/2017 | Altug et al. |
| 2018/0238910 | A1 | 8/2018 | Kang |
| 2018/0340945 | A1 | 11/2018 | Mitsuhashi |
| 2019/0025330 | A1 | 1/2019 | John et al. |
| 2019/0117570 | A1 | 4/2019 | Kalluri et al. |
| 2022/0397580 | A1 | 12/2022 | Shao et al. |

FOREIGN PATENT DOCUMENTS

| | | | |
|---|---|---|---|
| EP | 3121587 | A1 | 1/2017 |
| JP | 2003-232725 | A | 8/2003 |
| JP | 2004-170364 | A | 6/2004 |
| JP | 2006-078364 | A | 3/2006 |
| JP | 2008-519254 | A | 6/2008 |
| JP | 2012042233 | A | 3/2012 |
| JP | 2015-127442 | A | 7/2015 |
| JP | 2017-067692 | A | 4/2017 |
| WO | 2011040868 | A1 | 4/2011 |
| WO | 2011106057 | A2 | 9/2011 |
| WO | WO-2015/061634 | A2 | 4/2015 |
| WO | 2015188182 | A1 | 12/2015 |
| WO | WO-2015/200851 | A1 | 12/2015 |
| WO | 2016160131 | A1 | 10/2016 |
| WO | 2017053516 | A1 | 3/2017 |
| WO | WO-2017/087467 | A1 | 5/2017 |
| WO | WO-2017/124000 | A1 | 7/2017 |
| WO | WO-2017193115 | A1 | 11/2017 |
| WO | WO-2018/218090 | A1 | 11/2018 |
| WO | WO-2020157705 | A1 | 8/2020 |

OTHER PUBLICATIONS

Hnasko, R.M. (2015). Bioconjugation of Antibodies to Horseradish Peroxidase (HRP). In: Hnasko, R. (eds) ELISA. Methods in Molecular Biology, vol. 1318. Humana Press, New York, NY. (Year: 2015).*
Im et al. Label-free detection and molecular profiling of exosomes with a nano-plasmonic sensor. Nat Biotechnol. May 2014;32(5):490-5. doi: 10.1038/nbt.2886. Epub Apr. 20, 2014. (Year: 2014).*
Niel et al. Tetraspanin CD63 controls basolateral sorting of organic cation transporter 2 in renal proximal tubules. FASEB J. Apr. 2017;31(4):1421-1433. (Year: 2017).*
Fiandaca et al. Identification of preclinical Alzheimer's disease by a profile of pathogenic proteins in neurally derived blood exosomes: A case-control study. Alzheimers Dement. Jun. 2015;11(6):600-7. e1. doi: 10.1016/j.jalz.2014.06.008. Epub Aug. 15, 2014. (Year: 2014).*
Bao et al., "PET Imaging for Early Detection of Alzheimer's Disease: From Pathologic to Physiologic Biomarkers," PET Clin. 12(3):329-350 (Jul. 2017).
Im et al., "Nano-Plasmonic Exosome Diagnostics," Expert Rev Mol Diagn. 15(6): 725-733 (Jun. 2015).
International Search and Written Opinion for PCT/IB2020/050764, dated Apr. 2, 2020 (9 pages).
Lim et al., "Subtyping of circulating exosome-bound amyloid β reflects brain plaque deposition," Nat Commun. 10(1):1144 (Mar. 2019) (11 pages).
Park et al., "Analyses of Intravesicular Exosomal Proteins Using a Nano-Plasmonic System," ACS Photonics 5(2):487-94 (Feb. 21, 2018).
Rajendran et al., "Alzheimer's disease beta-amyloid peptides are released in association with exosomes," Proc Natl Acad Sci U.S.A. 103(30):11172-7 (Jul. 25, 2006).
Coskun, A. F. et al., Lensfree optofluidic plasmonic sensor for real-time and label-free monitoring of molecular binding events over a wide field-of-view. *Scientific Reports*, Oct. 27, 2014, vol. 4, pp. 6789: 1-7.
PCT/IB2020/050765 , "International Search Report and Written Opinion", Apr. 3, 2020, 13 pages.
PCT/IB2020/050765 , "Invitation to Pay Additional Fees and, Where Applicable, Protest Fee", Feb. 25, 2020, 2 pages.
Extended European Search Report received for EP 20749205.9, dated Jan. 23, 2023.
Li, et al., 'Detection of Protein Biomarkers Using RNA Aptamer Microarrays and Enzymatically Amplified Surface Plasmon Resonance Imaging', Analytical Chemistry, vol. 79, No. 3, 2007, pp. 1082-1088.
Cetin, et al., "Handheld High-throughput Plasmonic Biosensor Using Computational on-chip Imaging", Light: Science & Applications, vol. 3, XP055105770, Jan. 3, 2014, 10 pages and "Supplementary Information for Handheld High-throughput Plasmonic Biosensor Using Computational On-chip Imaging", XP055593612, Jan. 3, 2014.
EP20749205.9, "Partial Supplementary European Search Report", Sep. 26, 2022, 13 pages.
SG11202107605S Search Report, Apr. 14, 2023, 14 pages.
Nguyen, et al., "Surface Plasmon Resonance: A Versatile Technique for Biosensor Applications", Sensors, vol. 15, No. 5, May 5, 2015, pp. 10481-10510.
Xia, et al., "Regenerable and Simultaneous Surface Plasmon Resonance Detection of Aβ(1-40) and Aβ(1-42) Peptides in Cerebrospinal Fluids with Signal Amplification by Streptavidin Conjugated to an N-Terminus-Specific Antibody", Analytical Chemistry, vol. 82, No. 24, Nov. 12, 2010, 15.

* cited by examiner

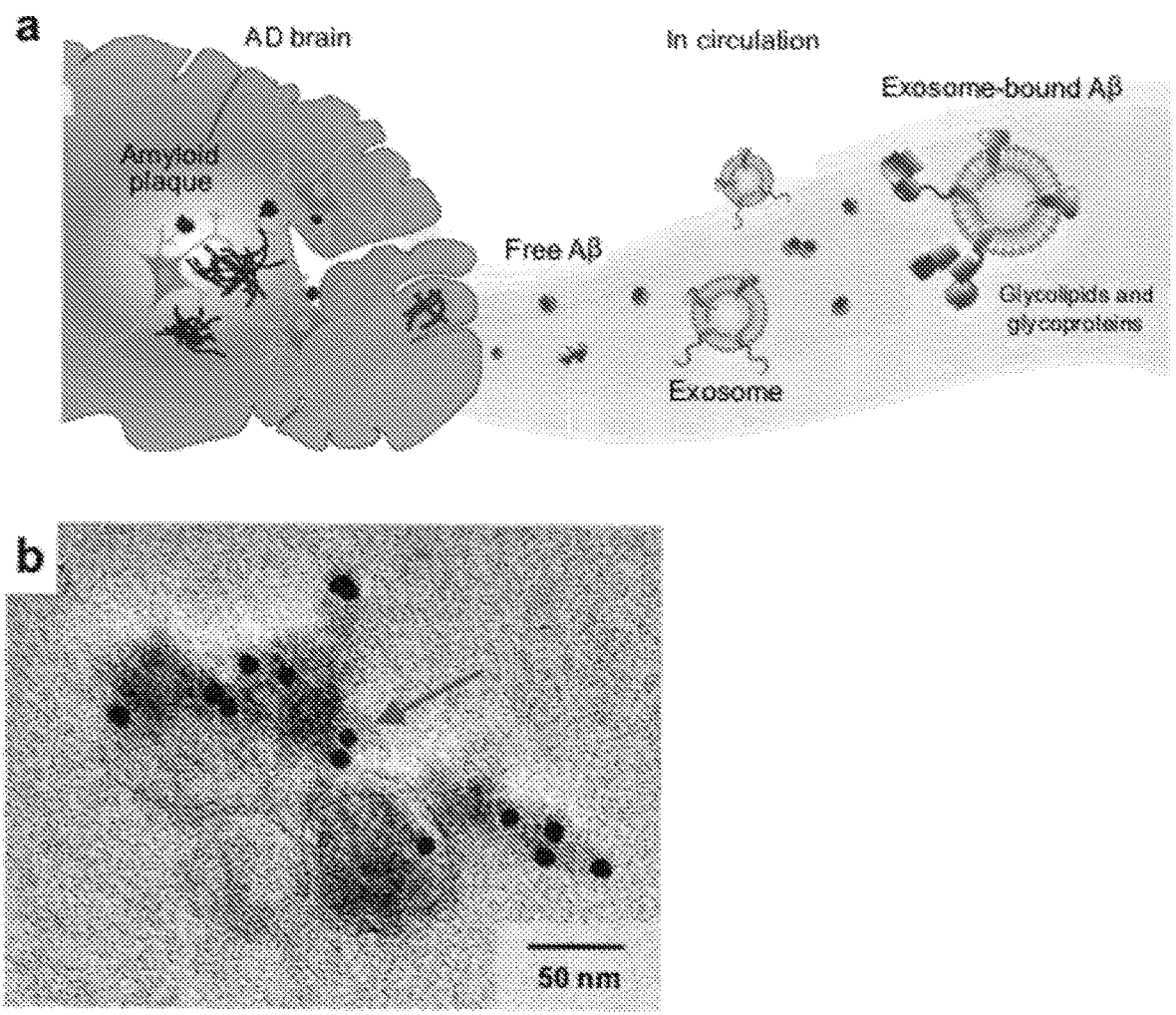
FIGURE 1(a)-(b)

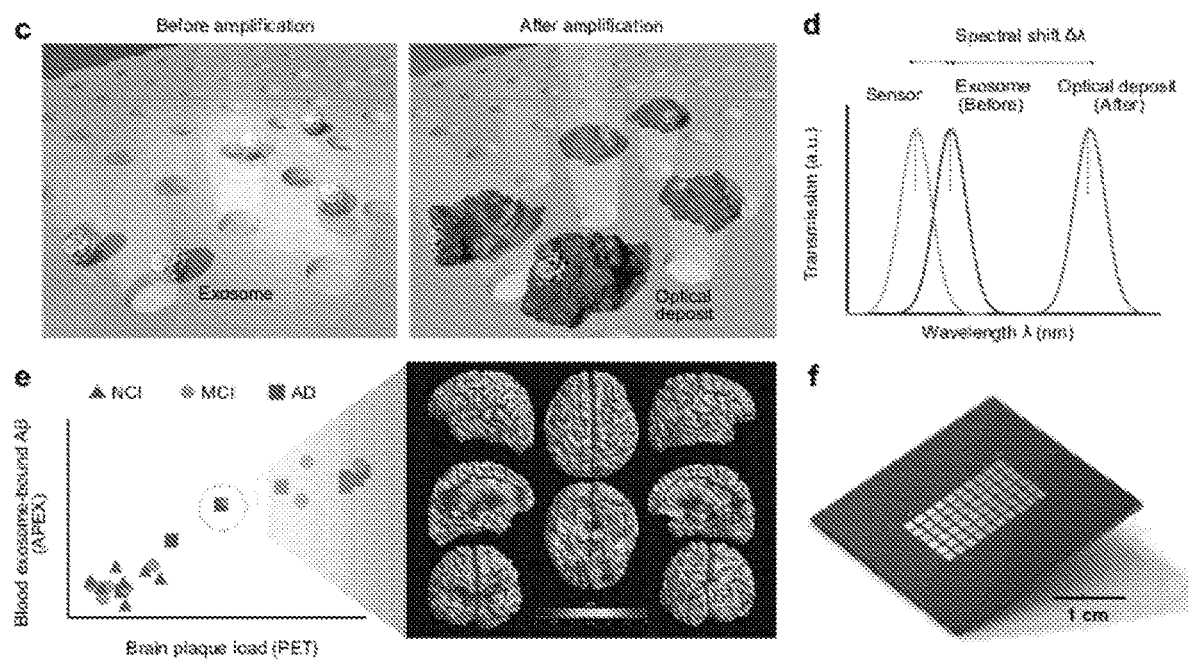
FIGURE 1(c)-(f)

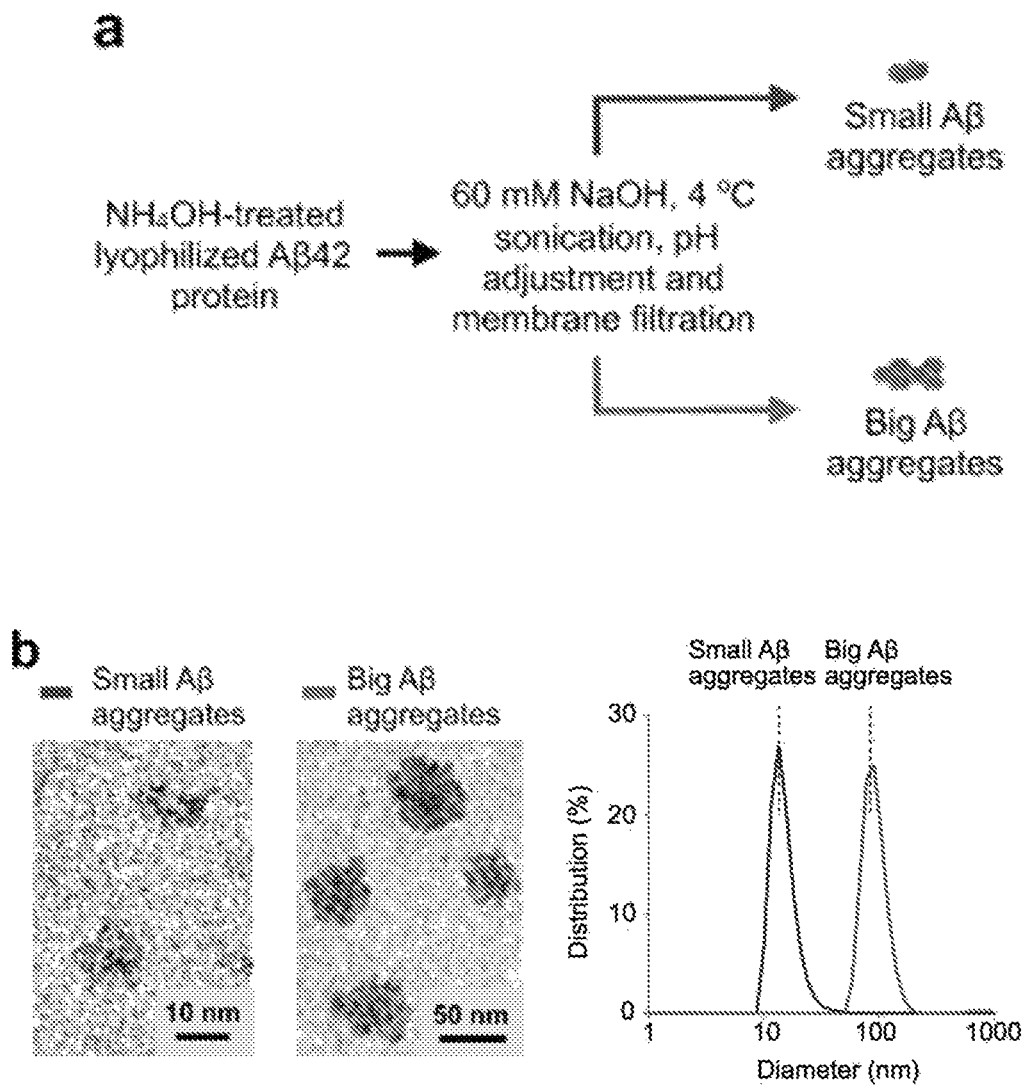
FIGURE 3(a)-(b)

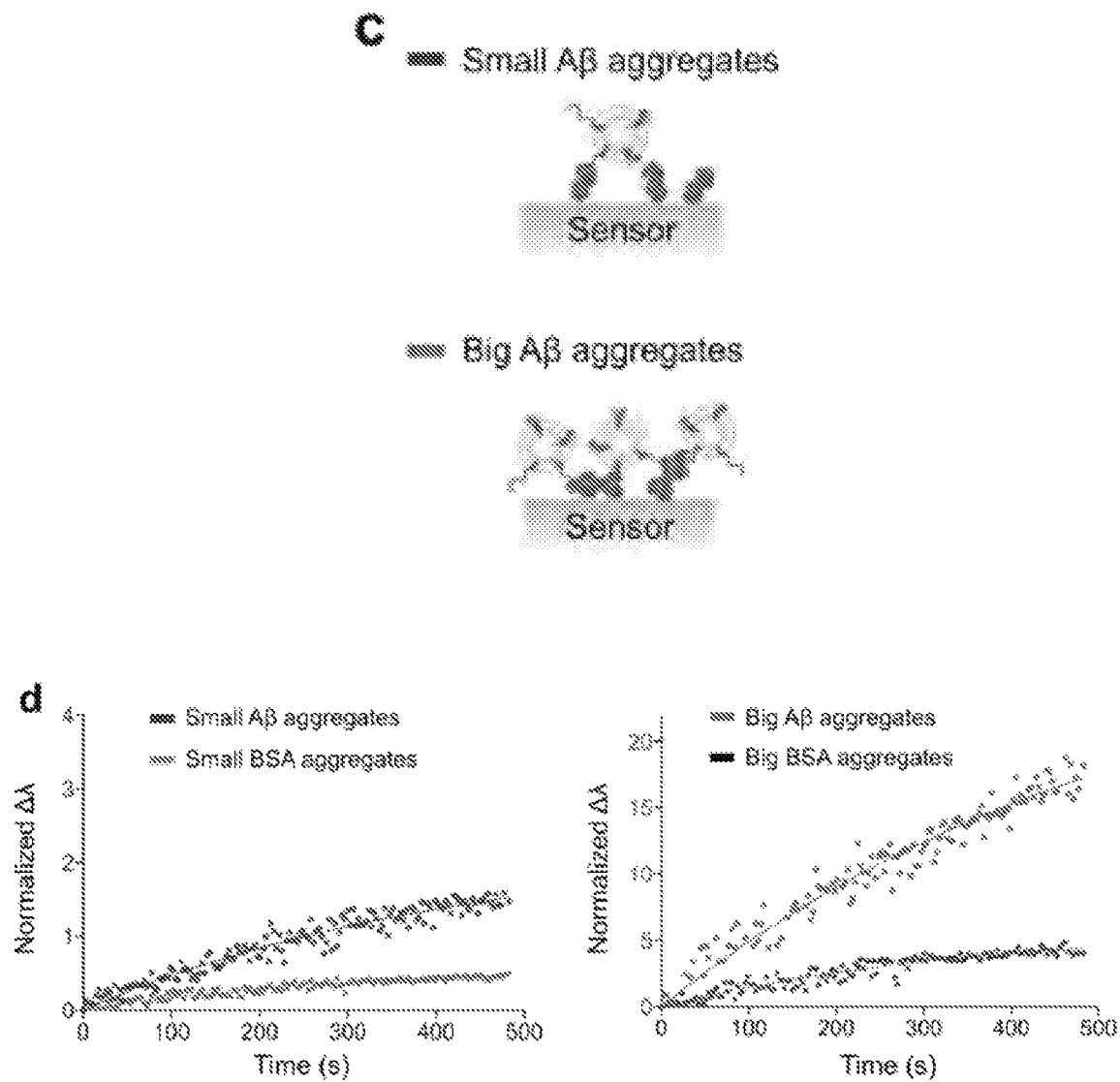
FIGURE 3(c)-(d)

a  Before amplification 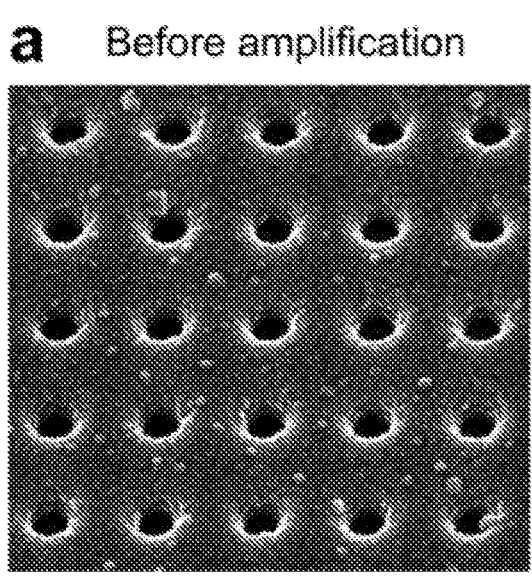
b  After amplification 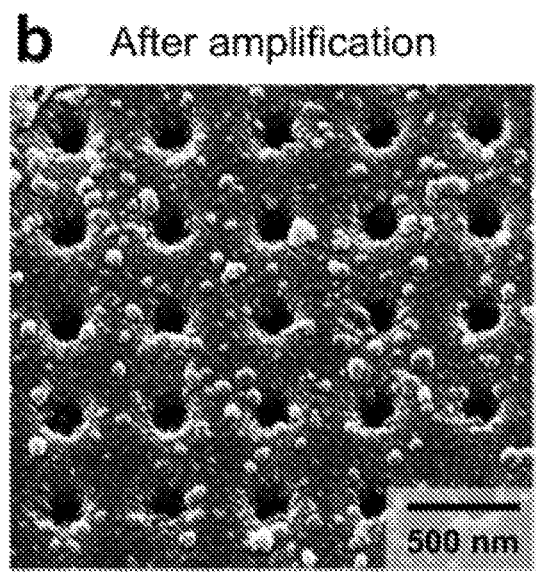
FIGURE 6 a
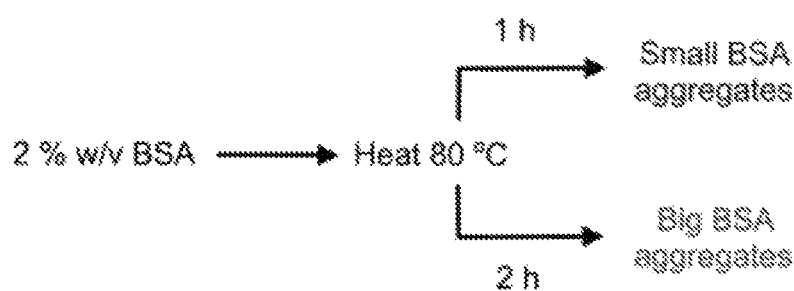
b
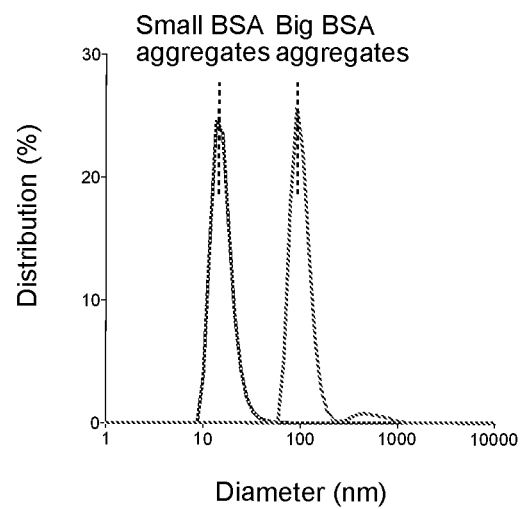
FIGURE 13

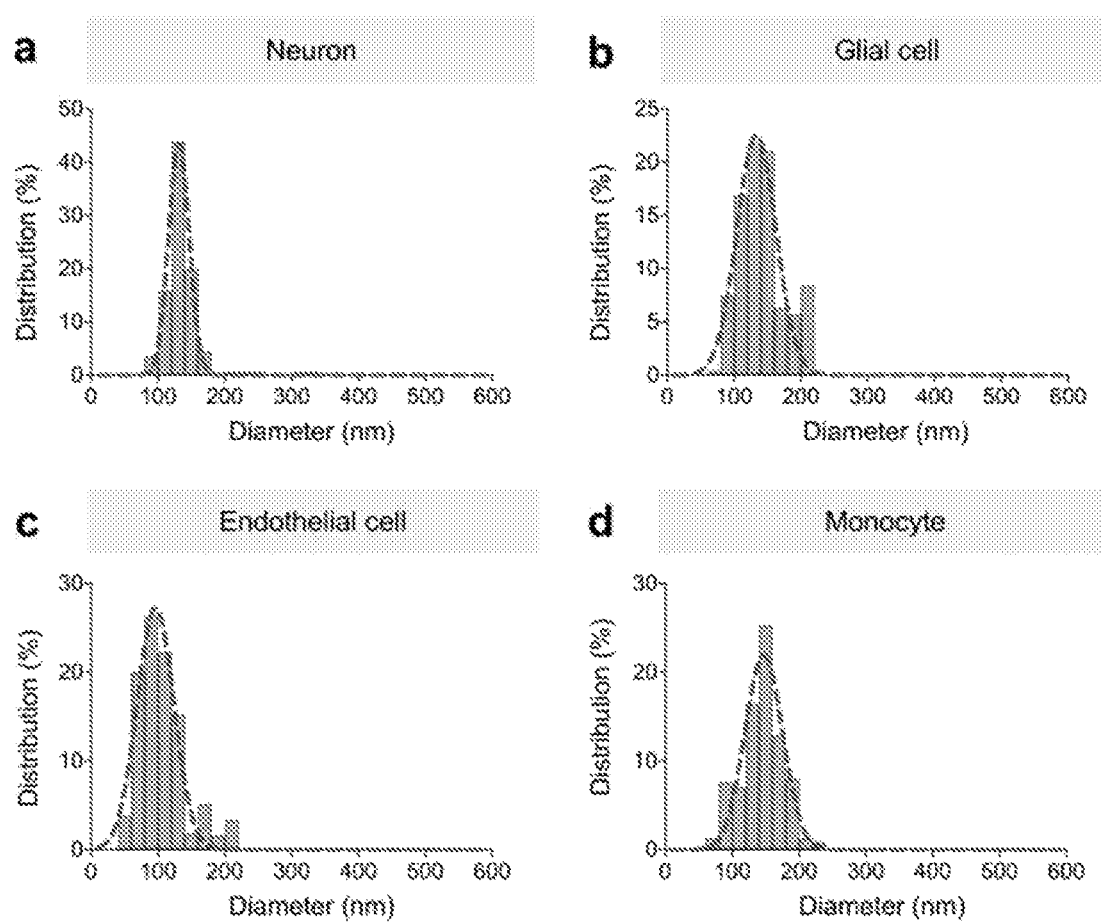
FIGURE 14 (a)-(d)

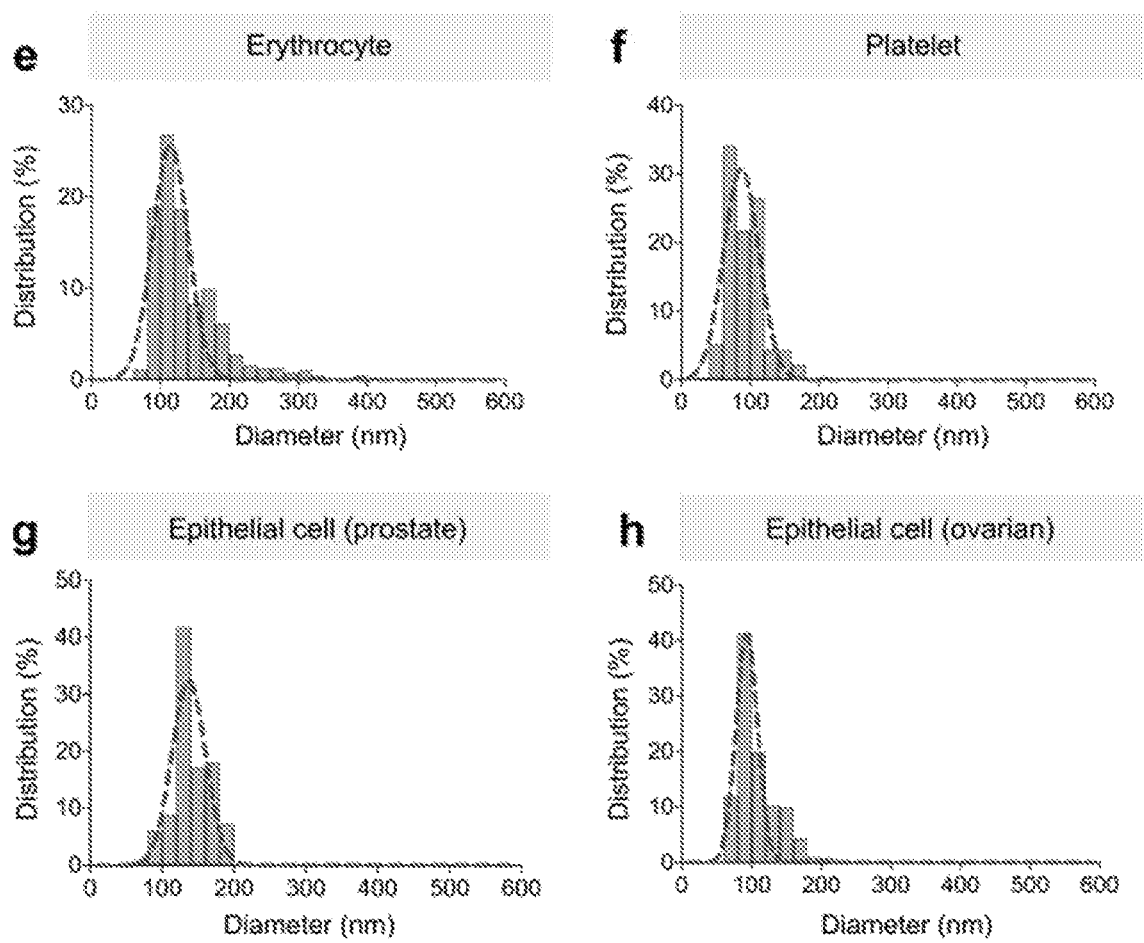
FIGURE 14 (e)-(h)

Figure 19(b)-(c)

| | APEX | Other SPR platforms |
|---|---|---|
| Assay technology | 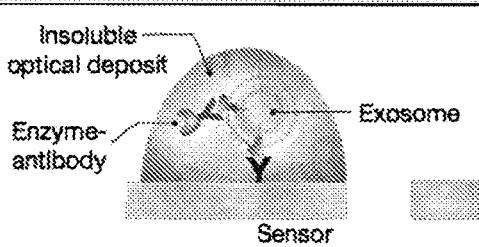<br>• Immuno-captures exosomes and enzymatically deposits a localized, insoluble optical product on sensor-bound exosomes<br>• Insoluble deposit forms only when multiple targets are co-localized in exosomes<br>• Insoluble deposit changes the refractive index and amplifies SPR detection signal<br>• Limit of detection ~ 200 exosomes | 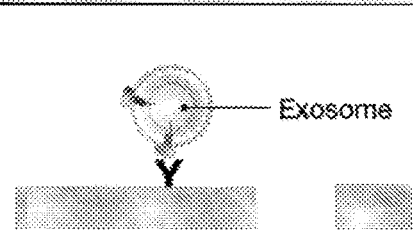<br>• Immuno-captures exosomes and detects via exosome-induced changes in refractive index<br>• Limit of detection ~ 3000 exosomes |
| Possible targets | • Detects diverse exosome proteins (extravesicular and intravesicular) and RNA targets<br>• Detects exosomal target co-localization (e.g., Aβ42+ CD63+) | • Detects exosome extravesciular proteins<br>• Cannot detect target co-localization |
| Device design | <br>▨ Au  ▨ Si₃N₄  ■ Si wafer<br>• Gold (Au) nanoholes suspended on a patterned silicon nitride (Si₃N₄) membrane<br>• Double-layered nanostructure | 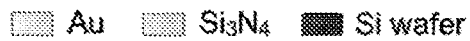<br>▨ Au  ▨ Glass<br>• Gold (Au) nanoholes on a uniform glass substrate<br>• Gold-on-glass |

Figure 20A

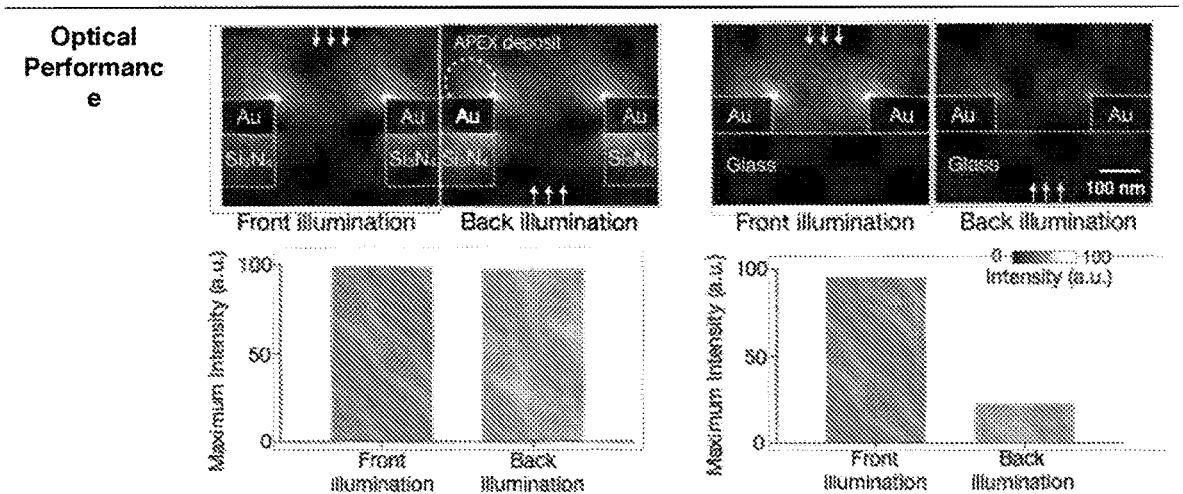

| Optical Performance | | |
|---|---|---|
| Optical performance | • APEX design enables bidirectional light excitation, likely due to Fano resonance in the coupled, double-layered plasmonic structure (i.e., periodic nanoholes in both Au and $Si_3N_4$ layers)<br>• SPR can be excited by both front illumination (light illuminating from Au side) or back illumination (from $Si_3N_4$ side), and equally strong transmission intensity can be detected in both cases<br>• Back illumination minimizes direct incident illumination on the enzymatic APEX amplification (deposits on the Au side) and improves the analytical stability | • Gold-on-glass nanohole design supports only front illumination (light illuminating from Au side) |
| Fabrication | Deep ultraviolet lithography<br>• Advanced, parallel processing for precise nanohole pattern transfer<br>• Large, wafer-scale fabrication<br>• Compatible with well-established manufacturing process for mass production | Focused ion-beam milling<br>• Serial processing whereby every nanohole is sequentially milled<br>• Lengthy and costly process and thus only suitable for small-scale prototyping |

Figure 20B

SEQUENCE LISTING

<160> NUMBER OF SEQ ID NOS: 7

<210> SEQ ID NO 1
<211> LENGTH: 22
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 1
uuucgguuau cuagcuuuau uu                                              22

<210> SEQ ID NO 2
<211> LENGTH: 22
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 2

```
uaaaccauga ugugcugcua uu                                              22

<210> SEQ ID NO 3
<211> LENGTH: 23
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 3
cacugauuuc aaauggugcu auu                                             23

<210> SEQ ID NO 4
<211> LENGTH: 22
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 4
acaccaggag aaaucgguca uu                                              22

<210> SEQ ID NO 5
<211> LENGTH: 23
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 5
auagcccugu acaaugcugc uuu                                             23

<210> SEQ ID NO 6
<211> LENGTH: 22
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 6
cccauggaau ucaguucuca uu                                              22

<210> SEQ ID NO 7
<211> LENGTH: 22
<212> TYPE: RNA
<213> ORGANISM: Artificial Sequence
<220> FEATURE:
<223> OTHER INFORMATION: Description of Artificial Sequence: Synthetic
      probe

<400> SEQUENCE: 7
ucaccgacag guugaauguu uu                                              22
```

SENSOR CHIP AND METHODS THEREOF

CROSS-REFERENCES TO RELATED APPLICATIONS

This application claims priority to Singapore Provisional Aβ plication No. 10201900937Q, filed on 31 Jan. 2019 and entitled SENSOR CHIP AND METHODS THEREOF.

SEQUENCE LISTING

The instant application contains a Sequence Listing which has been submitted electronically in ASCII format and is hereby incorporated by reference in its entirety. Said ASCII copy, created on Aug. 5, 2022, is named 107877-1249871_003610US_SL.txt and is 1,903 bytes in size.

FIELD

The present disclosure relates generally to a sensor chip and methods for the detection of an analyte. In particular, the disclosure relates to a sensor chip for detecting an analyte in a subject suffering from a neurodegenerative disease and other diseases such as amyloidosis.

BACKGROUND

Surface plasmon resonance (SPR) sensing is a technique that is widely used in the laboratory to characterize interactions between biomolecules, such as between an antibody-antigen. The technique is typically based on immobilizing a ligand capture molecule on a metal surface and measuring the change in refractive index when the ligand binds to the capture molecule. The technique is a label-free technique that does not require the use of specialized tag or dyes for the sensitive measurements of interaction between molecules. It is currently being developed for use in the laboratory for the diagnosis of patients with different medical conditions such as dementia, hepatitis, diabetes and cancer.

Dementia is the public health crisis of the 21st century. The most common form of severe dementia, Alzheimer's disease (AD), is characterized by a progressive loss of memory and cognitive functions. Affected individuals display marked limitations in self-care, social and occupational functioning: However, long before these full-blown clinical symptoms appear, AD molecular hallmarks may manifest and advance. These include extracellular amyloid β (Aβ) plaques and intracellular tau neurofibrillary tangles. Due to the complex and progressive neuropathology, early detection and intervention are thought to be essential to the success of disease-modifying therapies.

Current AD diagnosis and disease monitoring, however, are subjective and late-stage. They are achieved through clinical and neuropsychological assessments using published criteria. These approaches lack sensitivity and specificity, especially in the early phases where symptoms are subtle and overlap significantly with a variety of other disorders. New molecular diagnostic assays are being developed, including cerebrospinal fluid measurements and brain amyloid plaque imaging through positron emission tomography (PET); however, these tests face limitations as they either require invasive lumbar punctures or are too expensive for wider clinical adoption. As a result, there is intense interest in finding serologic biomarkers of AD to assist in early diagnosis and disease monitoring.

Accordingly, there is a need to overcome, or at least to alleviate, one or more of the above-mentioned problems.

SUMMARY OF THE INVENTION

Disclosed herein is a sensor chip and methods for the detection of an analyte via surface plasmon resonance.

In one aspect, there is provided a sensor chip comprising a conductive layer on a membrane support layer, wherein a plurality of apertures extend through the conductive layer and the membrane support layer and are arranged such that illumination of the conductive layer and/or the membrane support layer produces a surface plasmon resonance.

In one aspect, there is provided an imaging system comprising a light source, a detector, and a sensor chip as defined herein, wherein the light source is arranged to illuminate the sensor chip and the detector is positioned to detect light transmitted through the sensor chip.

In one aspect, there is provided a method of fabricating a sensor chip, the method comprising steps of:
  a) providing a top membrane support layer;
  b) depositing a conductive layer on the top membrane support layer;
  c) forming a plurality of apertures that extend through the membrane support layer, said apertures also extending through the conductive layer, and being arranged such that illumination of the conductive layer and/or the top membrane support layer produces a surface plasmon resonance.

In one aspect, there is provided a method of detecting an analyte in a sample, the method comprising:
  a) capturing an analyte onto a surface of a sensor chip as defined herein;
  b) detecting binding of a second recognition molecule to the captured analyte on the surface of the sensor chip, wherein the second recognition molecule is specific to the analyte, wherein an increased binding of the second recognition molecule as compared to a control sample indicates the presence of the analyte in the sample.

In one aspect, there is provided a kit comprising a sensor chip as defined herein.

In one aspect, there is provided a method of detecting a neurodegenerative disease or amyloidosis in a subject, the method comprising:
  a) contacting a sample obtained from the subject with the surface of a sensor chip as defined herein;
  b) detecting binding of a second recognition molecule to an analyte captured on the surface of the sensor chip; wherein the second recognition molecule is specific to the analyte, wherein an increased binding of the second recognition molecule as compared to a sample obtained from a control subject indicates that the subject is suffering from a neurodegenerative disease.

Also provided is the use of a sensor chip described herein in a method of detecting a neurodegenerative disease or amyloidosis in a subject.

BRIEF DESCRIPTION OF THE DRAWINGS

Some embodiments of the present invention will now be described by way of non-limiting example only, with reference to the accompanying drawings in which:

FIG. 1: APEX platform for analysis of circulating exosome-bound Aβ

(a) Exosomes associate with Aβ proteins. As proteins, the main component of amyloid plaques found in AD brain pathology, are released into the extracellular space. Exosomes are nanoscale extracellular membrane vesicles actively secreted by mammalian cells. Through their surface glycoproteins and glycolipids, exosomes can associate with the released Aβ proteins. (b) Transmission electron micrograph of exosome-bound Aβ. Exosomes derived from neuronal cells (SH-SY5Y) were treated with Aβ42 aggregates, and labeled with gold nanoparticles (10 nm) via a Aβ42-specific antibody. The nanoparticles appear as block dots (indicated by the red arrow). (c) APEX assay schematics. To enable sensitive profiling at the nanoscale, exosomes are first immuno-captured onto a plasmonic nanosensor (before amplification). Through an in situ enzymatic amplification, insoluble optical deposits are locally formed on the sensor-bound exosomes (after amplification). This deposition is spatially defined for molecular co-localization analysis, and changes the refractive index for SPR signal enhancement. Note to complement the enzymatic amplification, the nanosensor is back illuminated (away from the enzyme activity) to achieve analytical stability. The deposition causes a resultant red shift in the transmitted light through the nanosensor. (d) A representative schematic of changes in the transmission spectra with APEX amplification. Specific exosome binding (before) and subsequent amplification profiling (after) were monitored as transmission spectral shifts (Δλ) by the APEX platform. a.u., arbitrary unit. (e) Exosome-bound Aβ was measured using the APEX platform, in blood samples of patients with Alzheimer's disease (AD), mild cognitive impairment (MCI) and controls with no cognitive impairment (NCI). The blood measurements were correlated to corresponding PET imaging of brain amyloid plaque deposition. (f) A photograph of the APEX microarray. Each sensor chip contains 6×10 sensing elements, made up of uniformly fabricated plasmonic lattice, for multiplexed measurements. See FIG. 7-10 for sensor fabrication, characterization and design optimization, respectively.

Figure 2:
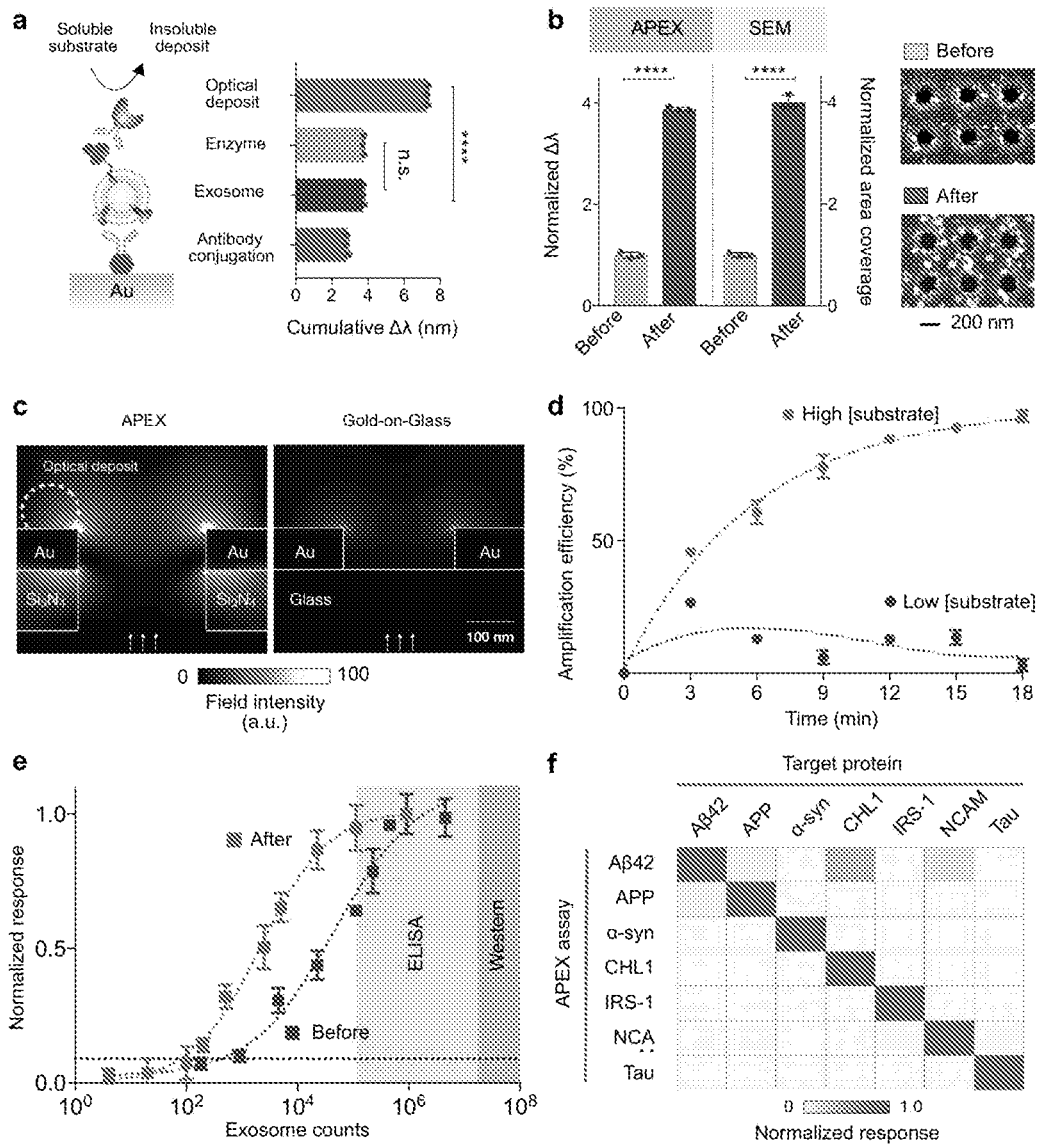

FIG. 2: APEX signal amplification and multiplexed profiling
(a) Step-by-step APEX transmission spectral changes. We performed a series of operations, namely antibody conjugation (anti-CD63) onto the sensor, exosome binding, enzyme labeling and enzymatic deposition, and monitored the resultant spectral shifts. While the enzyme labeling did not cause any significant changes, the deposit formation led to ~400% signal enhancement (**$P<0.0001$, n.s. not significant, Student's t-test). (b) Comparison of APEX signal amplification and optical deposit area coverage. The increase in area coverage was determined by scanning electron microscopy (SEM) analysis (**$P<0.0001$, Student's t-test). All data were normalized to that before the signal amplification. Inserts (right) show SEM images of sensor-bound exosomes, before and after APEX amplification. (c) Finite-difference time-domain simulations with back illumination. The APEX sensor design, but not the gold-on-glass design, enables the generation of enhanced electromagnetic fields through back illumination. Back illumination minimizes direct incident light exposure on the enzyme activity (which occurs on the sensor top). Arrows indicate the direction of incident illumination. (d) Real-time sensorgrams of APEX amplification kinetics. Different concentrations of the optical substrate (3,3'-diaminobenzidine tetrahydrochloride; high: 1 mg/ml, low: 0.01 mg/ml) were used to monitor the amplification efficiency. All data were normalized against negative controls, performed with IgG isotope control antibodies. (e) Comparison of the detection sensitivities of APEX, ELISA and Western blotting. The APEX detection limit (dotted line), before and after amplification, was determined by titrating a known quantity of exosomes and measuring their CD63 signal. (f) Specificity of APEX assays for measuring target proteins. Assays were developed for amyloid β (Aβ42), amyloid precursor protein (APP), alpha-synuclein (α-syn), close homolog of L1 (CHL1), insulin receptor substrate 1 (IRS-1), neural cell adhesion molecule (NCAM) and tau protein. All assays demonstrated specific detection. Heat map signals were assay (row) normalized. All measurements were performed in triplicate, and the data are displayed as mean±s.d. in a, b, d and e.

FIG. 3: Preferential association between Aβ aggregates and exosomes
(a) Schematics of Aβ protein aggregation. We varied the degree of clustering and used filtration approaches to prepare small and big Aβ42 aggregates, respectively. (b) Characterization of Aβ protein aggregates. (Left) Transmission electron micrographs showed globular morphology of the prepared Aβ42 aggregates. (Right) Dynamic light scattering analysis confirmed the unimodal size distribution of the different-sized preparations. (c) Schematics of the exosome-Aβ association analysis. Aβ42 aggregates (small vs. big) were immobilized onto the APEX sensors and treated with equal concentrations of exosomes derived from neuronal cells (SH-SY5Y) to determine the association kinetics. All exosome binding data were normalized against respective Aβ42 aggregate surface areas immobilized onto the sensors (see Methods for details). (d) Real-time sensorgrams of exosome binding kinetics. In comparison to similar-sized bovine serum albumin (BSA) control aggregates (see FIG. 13), exosomes associated more strongly with the Aβ42 aggregates. Importantly, as compared to their binding affinity to the smaller Aβ42 aggregates (left), exosomes demonstrated a much stronger affinity to the bigger Aβ42 aggregates (right). Note the difference in scale on the y axis. All binding affinities (KD) were determined from normalized exosome binding data and relative to BSA controls. KD(small)/KD(big)=5.27. (e) Differential association of various extracellular vesicles to Aβ42 aggregates. Vesicles were derived from different cell origins, namely neurons, glial cells, endothelial cells, monocytes, erythrocytes, platelets and epithelial cells, respectively, and used in equal concentrations for the binding analysis. Employing the APEX platform, we first measured the vesicles' direct binding with the Aβ42-functionalized sensor (direct). Next, for each cell origin, we labeled the bound vesicles for origin-specific marker (cell origin-specific marker) or pan-exosome marker (i.e., CD63, pan-exosome marker), and measured the associated APEX signal amplification. All measurements were made relative to IgG isotope control antibodies, and performed in triplicate. The data are displayed as mean±s.d. in e.

Figure 4:
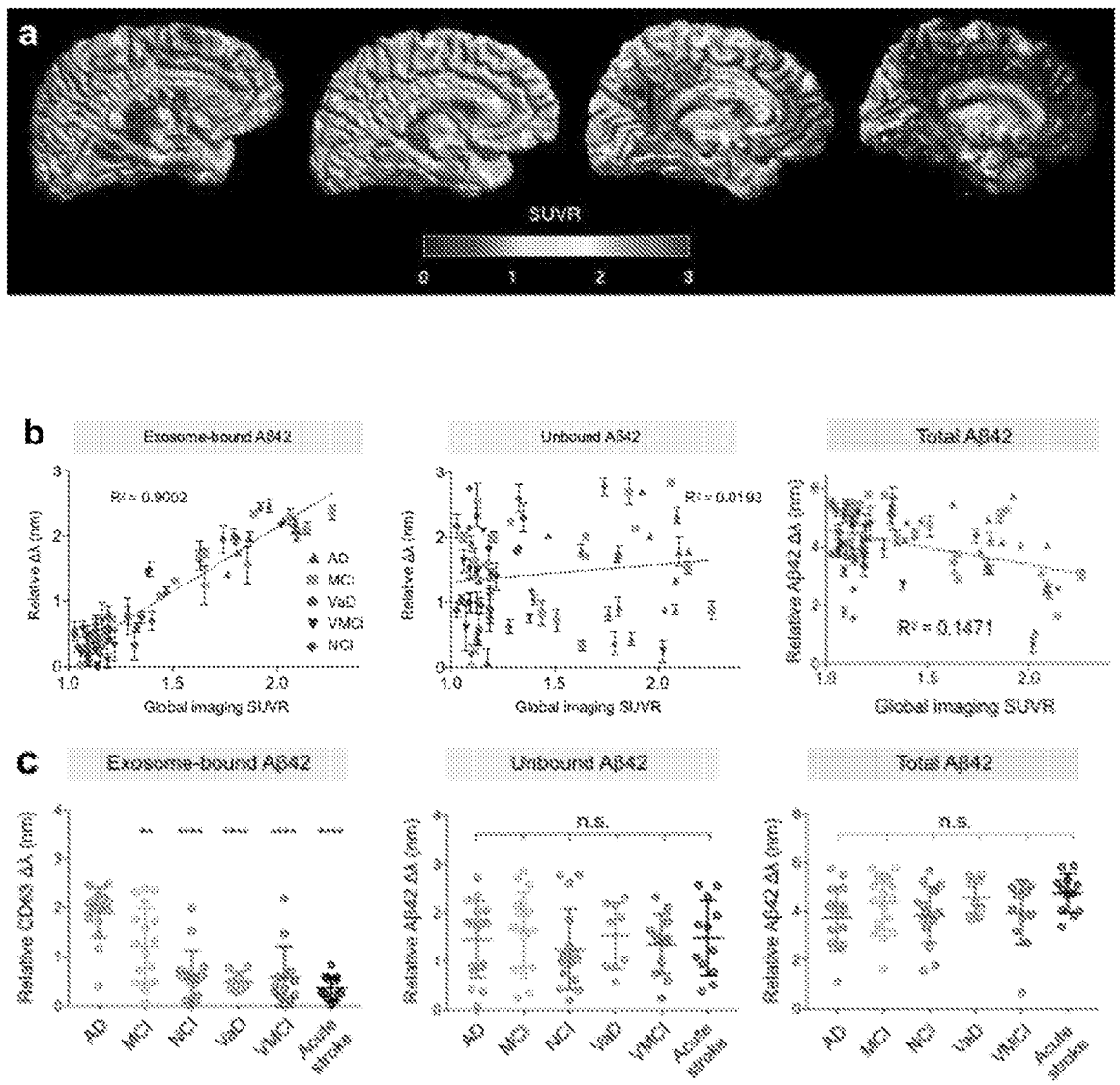

FIG. 4: Clinical correlation of circulating exosome-bound Aβ to brain imaging
(a) Representative reconstructed PET brain images from clinical subjects, showing increasing brain amyloid plaque load. SUVR, standardized uptake value ratio, of specific brain region was normalized relative to the mean cerebellar grey matter intensity to determine brain amyloid plaque load. (b) Correlations of different populations of circulating Aβ42 with global average PET brain imaging (n=72). Using the APEX assays, we measured the respective signals from exosome-bound Aβ42 (left), unbound Aβ42 (center), as well as total Aβ42 (right), in blood samples of patients with Alzheimer's disease (AD), mild cognitive impairment (MCI) as well as control subjects with no cognitive impairment (NCI), vascular dementia (VaD) and vascular mild cognitive impairment (VMCI). When correlated to the global imaging data of brain amyloid plaque, the exosome-bound Aβ42 measurements demonstrated the best correlation (left, $R^2=0.9002$), as compared to that of the unbound Aβ42 population (center, $R^2=0.0193$) or the total Aβ42 (right, $R^2=0.1471$). (c) Analysis of different populations of circulating Aβ42 in distinguishing various clinical groups (n=84). Only APEX measurements of circulating exosome-bound Aβ42 (left) could distinguish between the AD clinical groups (AD and MCI), as well as from other normal (NCI) and clinical controls (VaD, VMCI and acute stroke). Neither the unbound Aβ42 measurements (center) nor the total Aβ42 measurements (right) showed any statistical significance among the different clinical groups ($P<0.01$, **$P<0.0001$, n.s., not significant, Student's t-test). All measurements were made relative to IgG isotype control antibodies, and performed in triplicate. The data are displayed as mean±s.d. in b-c.

Figure 5:
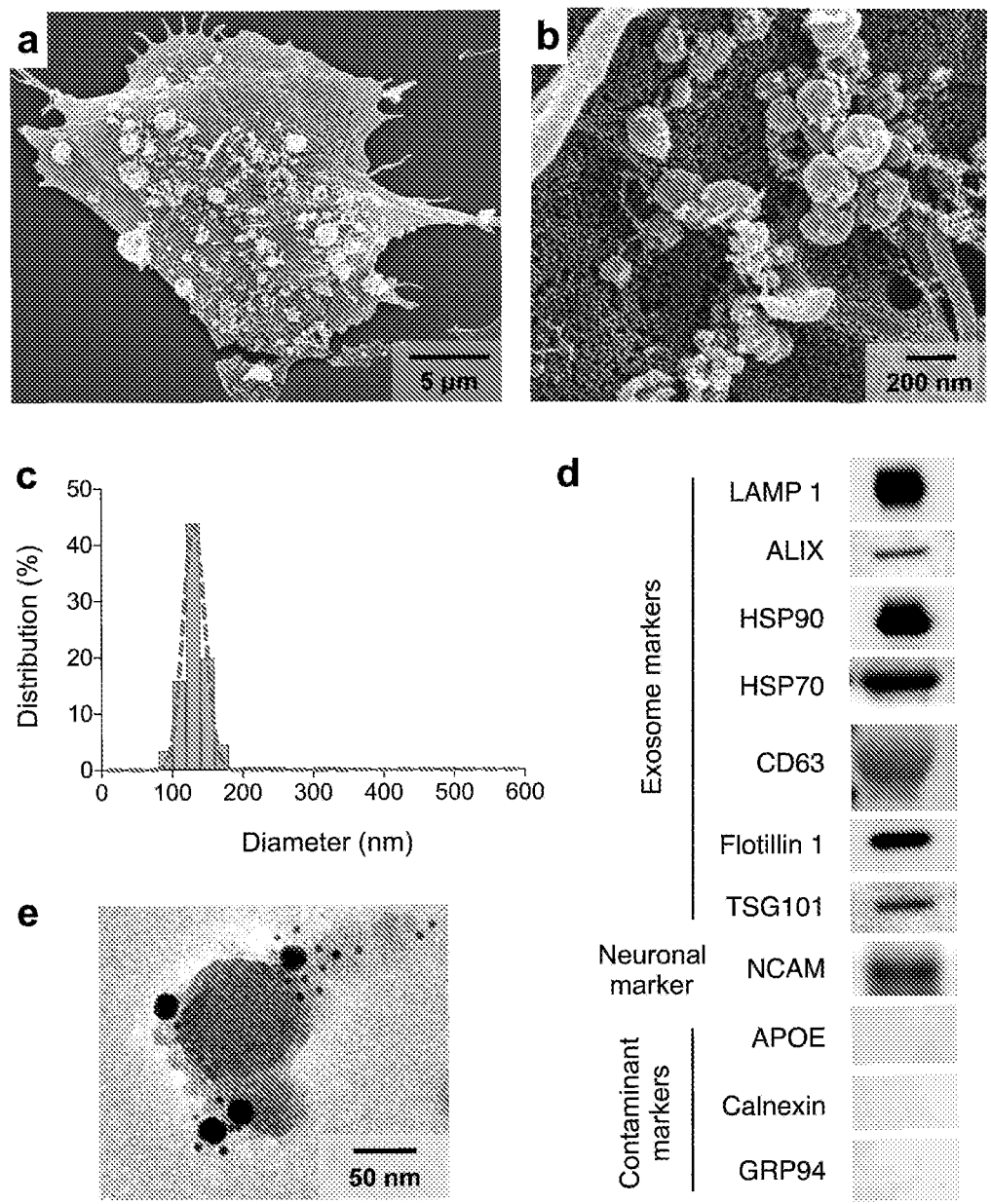

FIG. 5: Characterization of extracellular vesicles shed by neuronal cells.
(a) Scanning electron micrograph of a neuronal cell (SH-SY5Y), showing avid release of nanoscale extracellular vesicles from the cell. (b) High magnification image of the released vesicles. (c) Unimodal size distribution of extracellular vesicles, as determined by nanoparticle tracking analysis, showing a mean diameter of ~150 nm. (d) Western blotting analysis of the vesicle lysate. The vesicles were lysed and immunoblotted for exosomal markers (LAMP 1, ALIX, HSP90, HSP70, CD63, Flotillin 1, TSG101), neuronal marker (NCAM) as well as negative markers including lipoprotein (APOE) and markers of other membranous compartments (Calnexin, GRP94). (e) Transmission electron micrograph of double immuno-labeling with different-sized gold nanoparticles (CD63, 20 nm; Aβ42, 5 nm) confirmed the co-localization of both markers on the same vesicle, illustrating the presence of exosome-bound Aβ.

FIG. 6: APEX amplification product.
Scanning electron micrographs of the APEX sensor (a) before amplification, with exosomes captured onto the sensor via anti-CD63 antibody, and (b) after amplification, showing localized growth of insoluble optical deposits from the soluble substrate (3,3'-diaminobenzidine tetrahydrochloride). The resultant APEX signal amplification correlated well to the increase in area coverage by the localized deposits.

Figure 7:
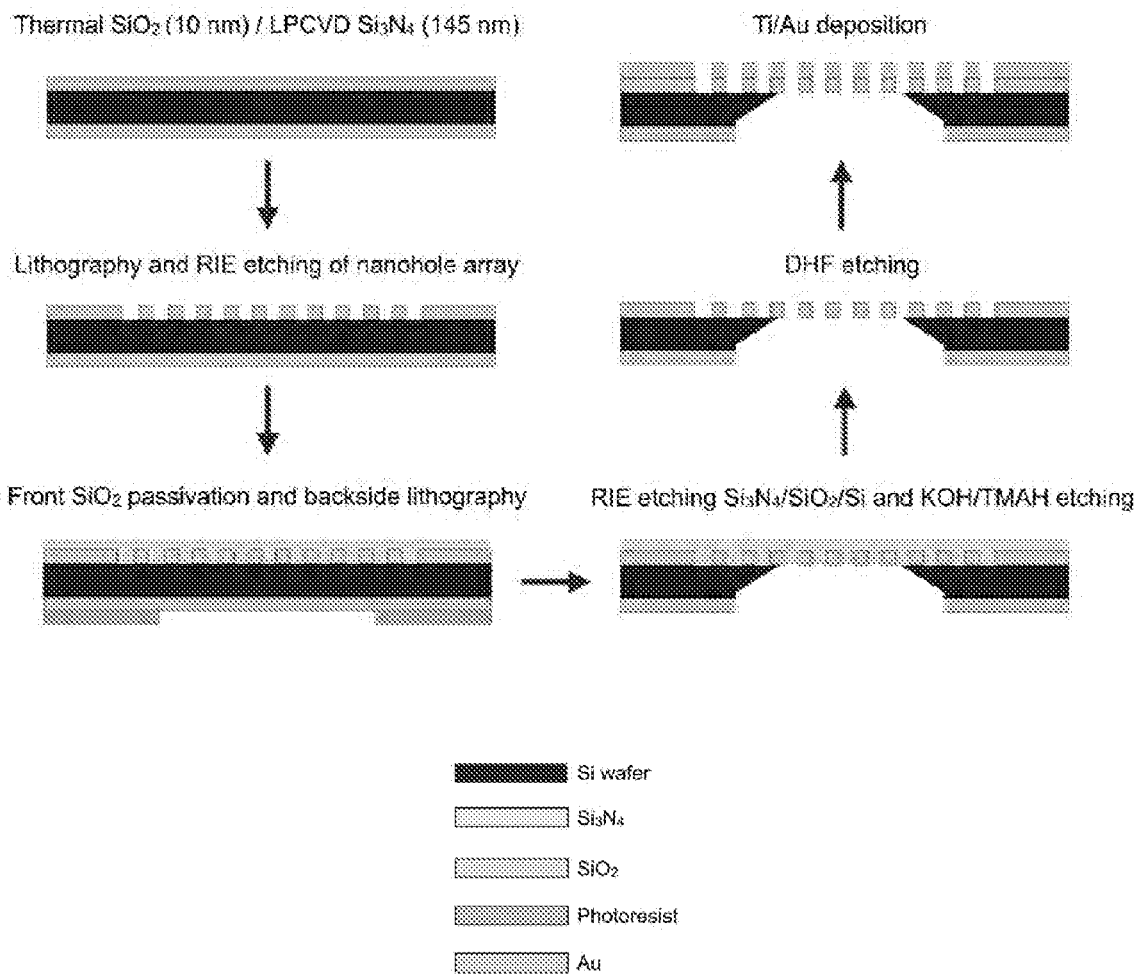

FIG. 7: Mass fabrication of APEX microarray sensors.
All APEX sensors were fabricated on 8-inch silicon (Si) wafer. The fabrication steps include the following: (1) A 10-nm silicon dioxide ($SiO_2$) layer was prepared through thermal oxidation and a 145-nm silicon nitride ($Si_3N_4$) was deposited on the wafer through low pressure chemical vapor deposition (LPCVD). (2) After coating with photoresist, deep ultraviolet (DUV) lithography was performed to define the nanohole array pattern in the resist. This pattern was transferred via reaction ion etching (RIE) to the $Si_3N_4$ membrane. (3) After removing the photoresist, a thin protective layer (100 nm) of $SiO_2$ was deposited on the frontside of the wafer using plasma enhanced chemical vapor deposition (PECVD). To enable light transmission, the backside of the wafer was spin-coated with photoresist; lithography method was used to define the sensing area. (4) $Si_3N_4$ and $SiO_2$ were etched by RIE followed by potassium hydroxide (KOH) and tetramethylammonium hydroxide (TMAH) etching of Si. (5) After etching, diluted hydrogen fluoride (DHF) (1:100) was used to remove the protective $SiO_2$ layer. (6) Ti/Au (10 nm/100 nm) were deposited onto the $Si_3N_4$ membrane.

Figure 8:
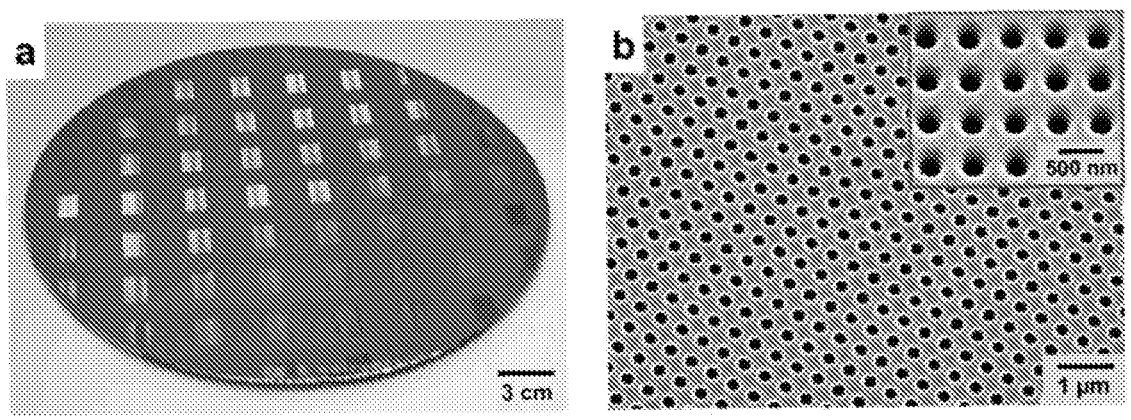

FIG. 8: Characterization of APEX microarray sensors.
(a) Photograph of an 8-inch wafer showing large-scale fabrication of APEX microarray sensor chips. Each wafer consists of >2000 sensing elements. (b) Scanning electron micrograph of highly uniform nanoholes in the APEX sensor. Insert shows a magnified view of the nanohole lattice.

Figure 9:
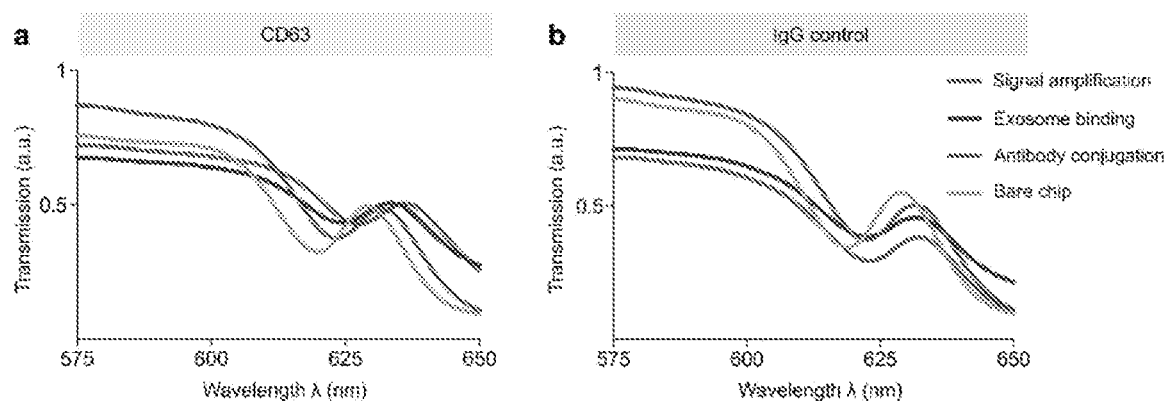

FIG. 9: Step-by-step spectral changes.
APEX sensors were conjugated with either (a) anti-CD63 antibody for exosome capture or (b) isotope control antibody. All sensors were treated with equal concentrations of exosomes derived from neuronal cell line (SH-SY5Y) before APEX amplification. While the sensors showed a similar degree of surface functionalization with the antibodies (antibody conjugation), only the anti-CD63 functionalized sensor demonstrated significant spectral shifts associated with exosome binding and APEX amplification, respectively. Note that in the control sensor, in the absence of exosome binding, APEX amplification induced negligible spectral change. a.u., arbitrary unit.

Figure 10:
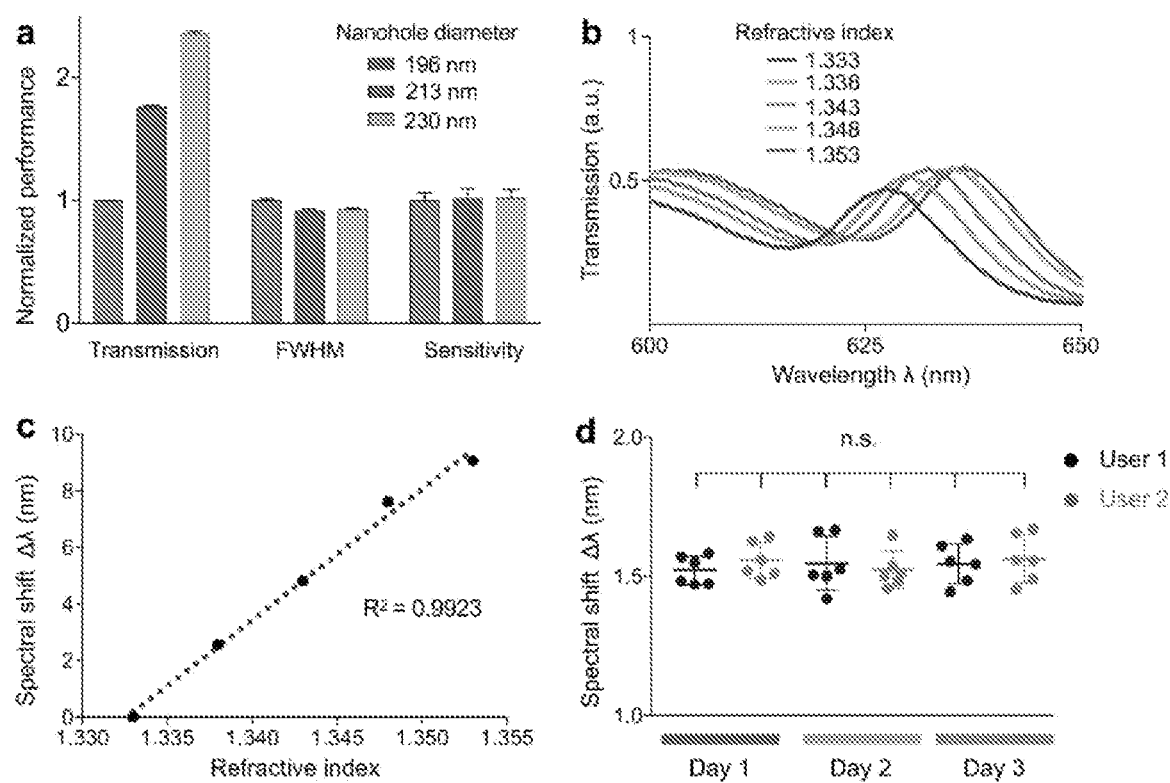

FIG. 10: Optimization of APEX sensor performance.
(a) Comparison of sensor performance with back illumination. We compared the SPR transmission intensity, full width at half maximum (FWHM) of the spectral peak, and detection sensitivity of different APEX sensors with varying nanohole diameter. All sensors were illuminated from the backside to complement the APEX enzymatic amplification. The optimized APEX design has a nanohole diameter of 230 nm, patterned with a regular periodicity of 450 nm in a 100 nm-thick gold layer suspended on a silicon nitride membrane. This double-layered plasmonic structure supports SPR excitation through back illumination. (b) Transmission spectral changes of the optimized sensor against increasing refractive index. Increase in refractive index induced a change in the transmission spectrum and shifted the resonance peak to a longer wavelength. (c) Spectral shifts showed a linear correlation to increasing refractive index. (d) APEX reproducibility and repeatability. APEX enzymatic amplification was performed on the same sample, and measured across different users, sensor chips and time of measurement. The measurements showed the following analytical coefficients of variation: between group=2.76%, within group=4.14%, total=4.59%. All measurements were performed in triplicate or more, and the data are displayed as mean±s.d. in (a). a.u., arbitrary unit, n.s., not significant, Student's t-test.

Figure 11:
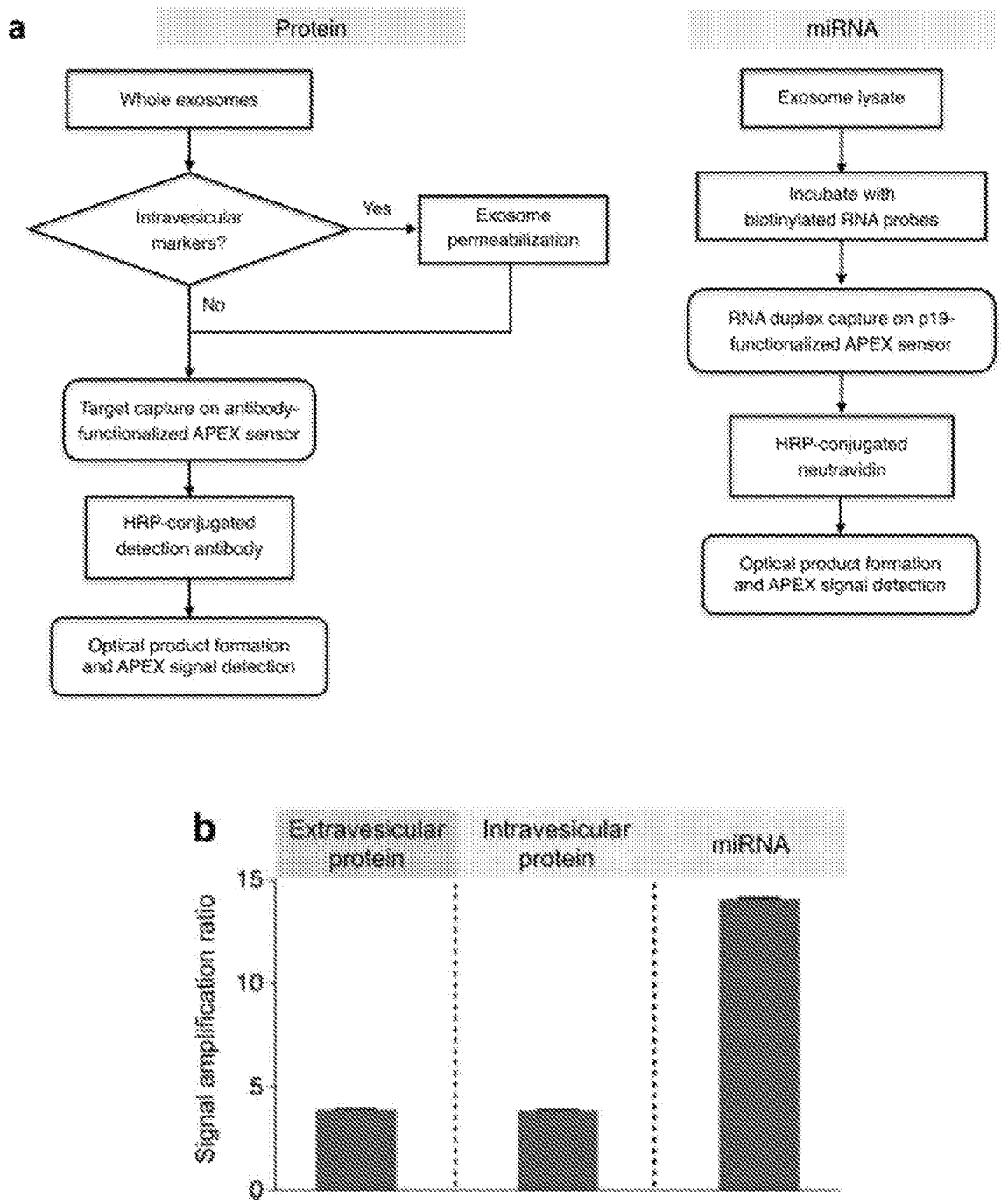

FIG. 11: APEX workflow and amplification efficiency.
(a) APEX workflow for detection of proteins (extra- and intra-vesicular) and miRNA. (b) APEX amplification efficiency for different molecular targets. APEX signals were acquired for the following targets: extravesicular protein, Aβ42 protein; intravesicular protein, heat shock protein 90; miRNA, miRNA-9. All signals were normalized to that before the addition of the optical substrate to determine the amplification ratio. Measurements were performed in triplicate, and the data are displayed as mean±s.d. in (b).

Figure 12:
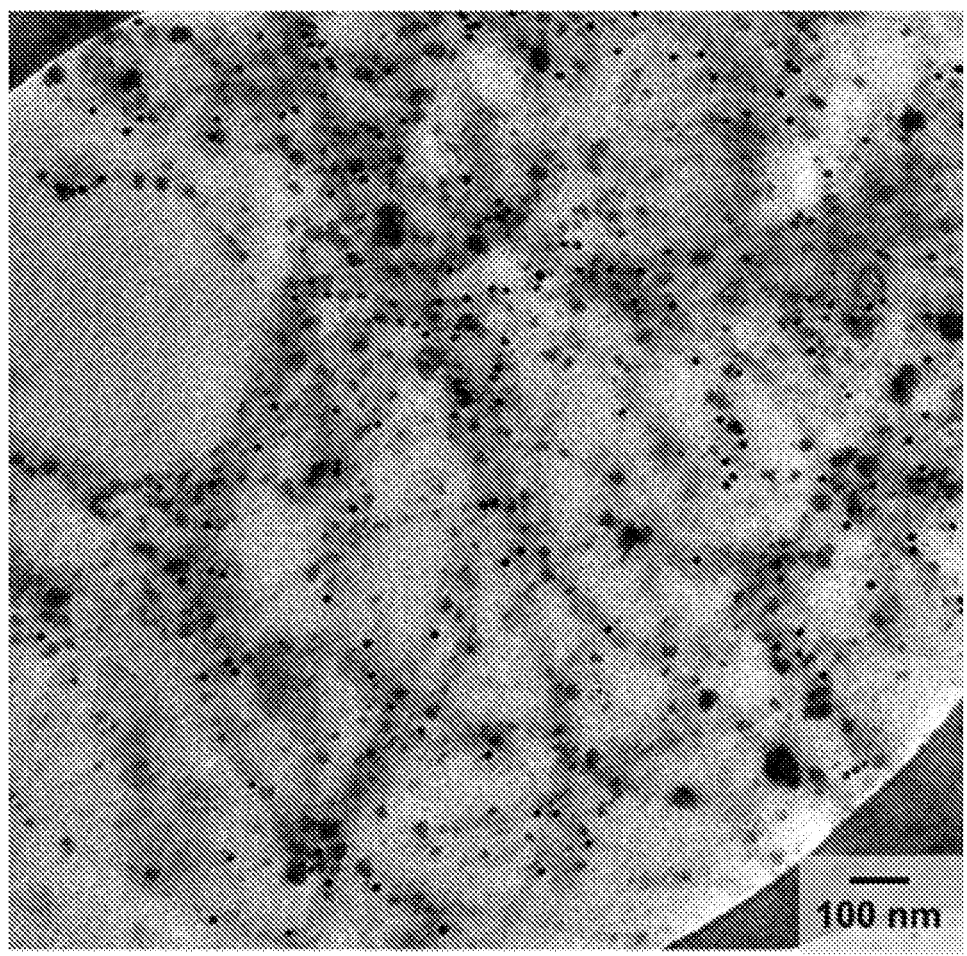

FIG. 12: Fibrillar structures assembled from big Aβ aggregates.
Amyloid fibrils were observed after a 2-hour incubation of the prepared big Aβ42 aggregates. The formed structures were immuno-labeled with gold nanoparticles (15 nm) via anti-Aβ42 antibody and characterized with transmission electron microscopy.

FIG. 13: Preparation of BSA control aggregates.
(a) Schematics of BSA protein aggregation. We varied the duration of heating to prepare small and big BSA control aggregates, respectively. (b) Characterization of BSA protein aggregates. The hydrodynamic diameters of the BSA aggregates were determined by dynamic light scattering analysis. Both aggregates showed unimodal size distribution. The small aggregates have a diameter ~15 nm and the big aggregates have a diameter ~100 nm.

FIG. 14: Extracellular vesicles isolated from various cell origins.
Extracellular vesicles were obtained from (a) neurons (SH-SY5Y), (b) glial cells (GLI36), (c) endothelial cells (HU-VEC), (d) monocytes (THP-1), (e) erythrocytes, (f) platelets, (g) epithelial cells of prostate origin (PC-3), and (h) epithelial cells of ovarian origin (SK-OV-3), respectively. All vesicles were characterized with nanoparticle tracking analysis.

Figure 15:
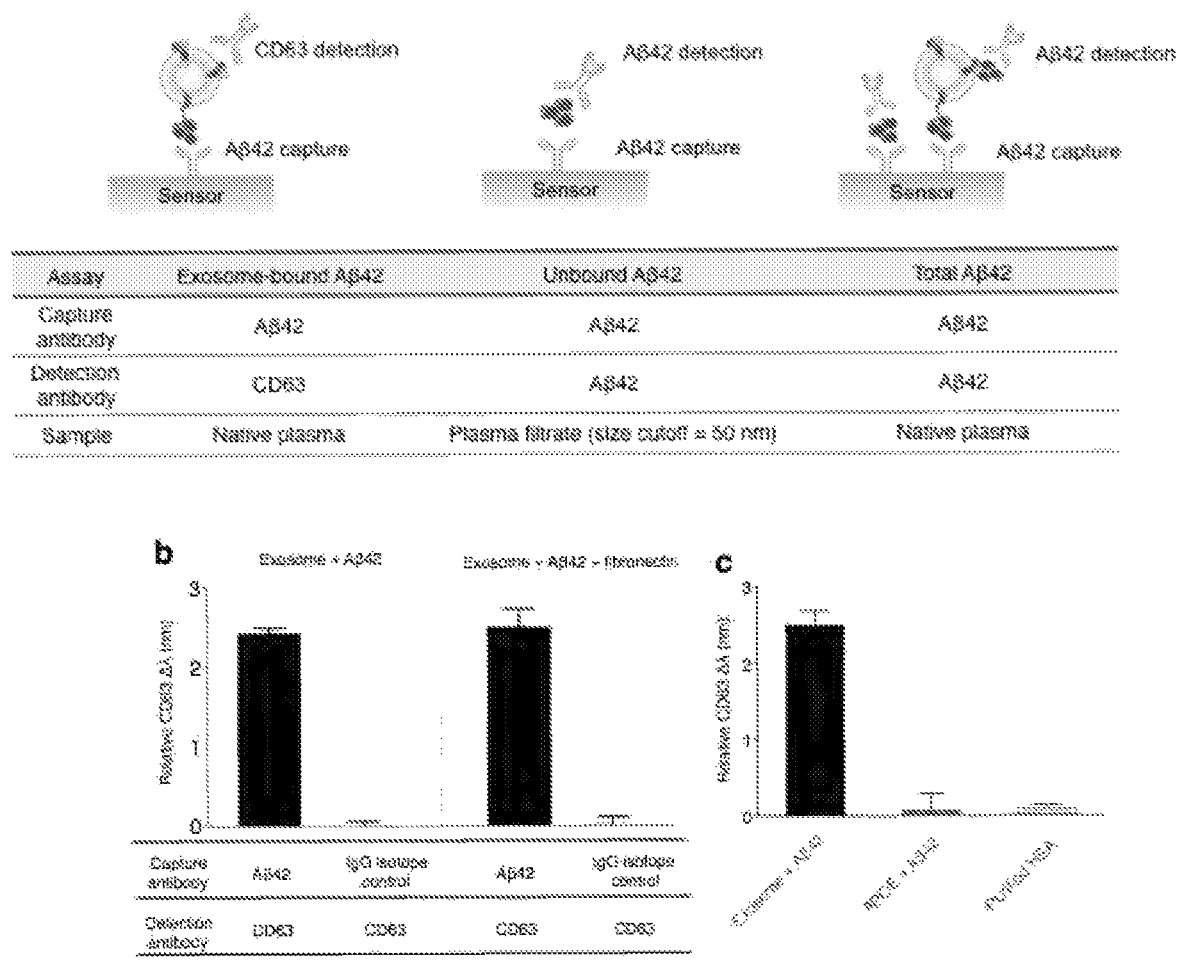

FIG. 15: APEX measurements of different populations of circulating Aβ.
(a) APEX assay configurations for characterizing different populations of circulating Aβ in clinical plasma samples. Exosome-bound Aβ42 and total Aβ42 populations were measured from native plasma while unbound Aβ42 population was detected from plasma filtrate. (b) Incubation of fibronectin with exosome-bound Aβ42 resulted in negligible changes to the APEX signals. (c) Negative controls (APOE lipoprotein with Aβ42 protein, human serum albumin/HSA) showed negligible signals, demonstrating the APEX assay specificity for exosome-bound Aβ42. All measurements were performed in triplicate, and the data are displayed as mean±s.d.

Figure 16:
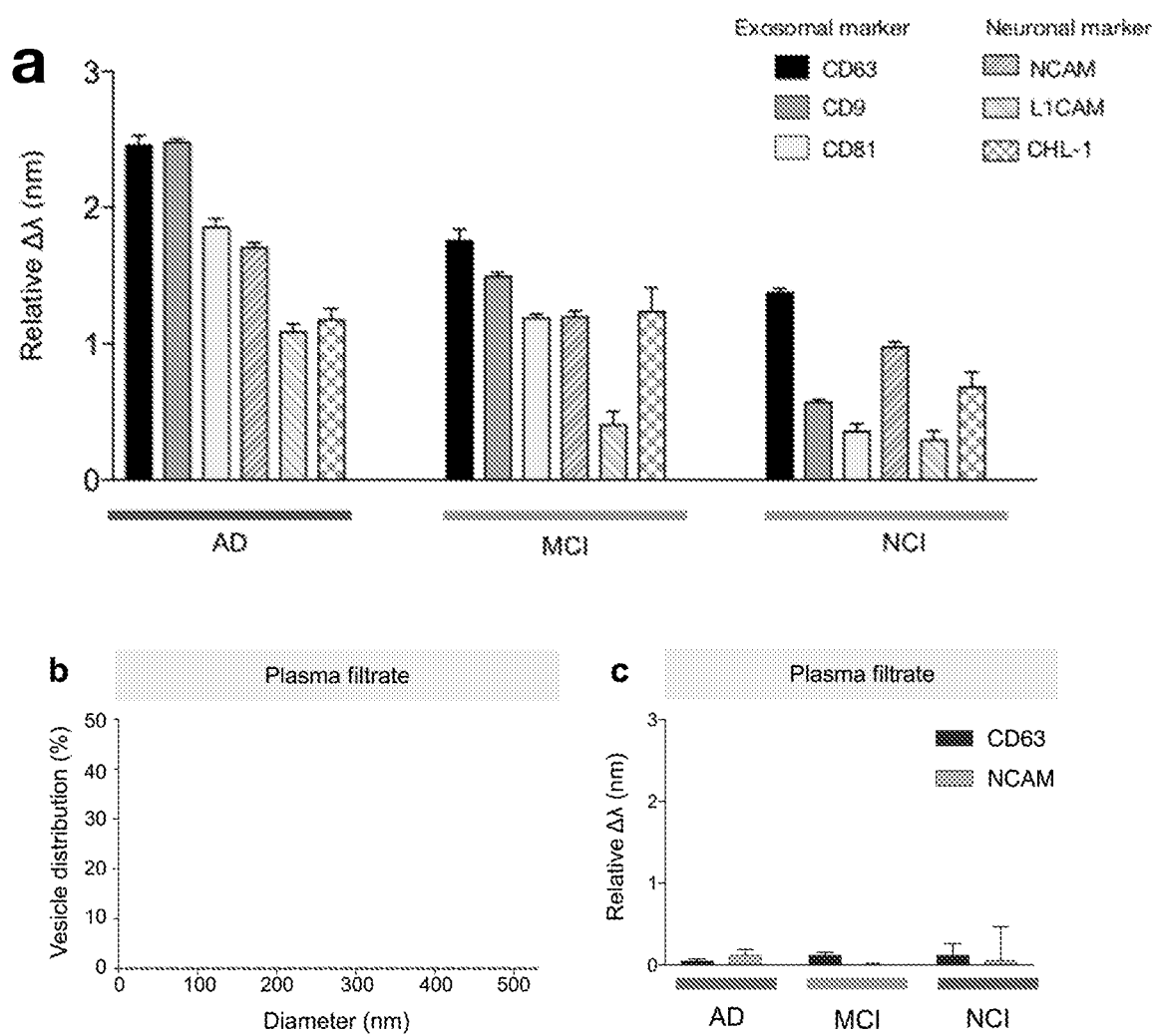

FIG. 16: Characterization of Aβ populations in clinical samples.
(a) Exosome-bound Aβ42 population. We enriched for Aβ42 directly from native plasma samples, and measured the relative levels of co-localized signals for exosomal markers (CD63, CD81 and CD9) and neuronal markers (NCAM, L1CAM and CHL-1) in the captured Aβ42. All markers could be detected, with CD63 being the most highly expressed marker across the clinical samples tested. (b) Plasma filtrate for characterizing the unbound Aβ42 population. To evaluate the unbound Aβ42 population, we used membrane filtration (size cutoff=50 nm, Nuclepore, Whatman) to prepare vesicle-free plasma filtrate. The filtrate showed negligible vesicle counts, as determined by nanoparticle tracking analysis. (c) The plasma filtrate also showed negligible signals for exosomal marker (CD63) and neuronal marker (NCAM), demonstrating the efficient removal of exosomes through filtration. Alzheimer's disease (AD), mild cognitive impairment (MCI), and healthy controls with no cognitive impairment (NCI). All measurements were performed in triplicate, and the data are displayed as mean±s.d.

Figure 17:
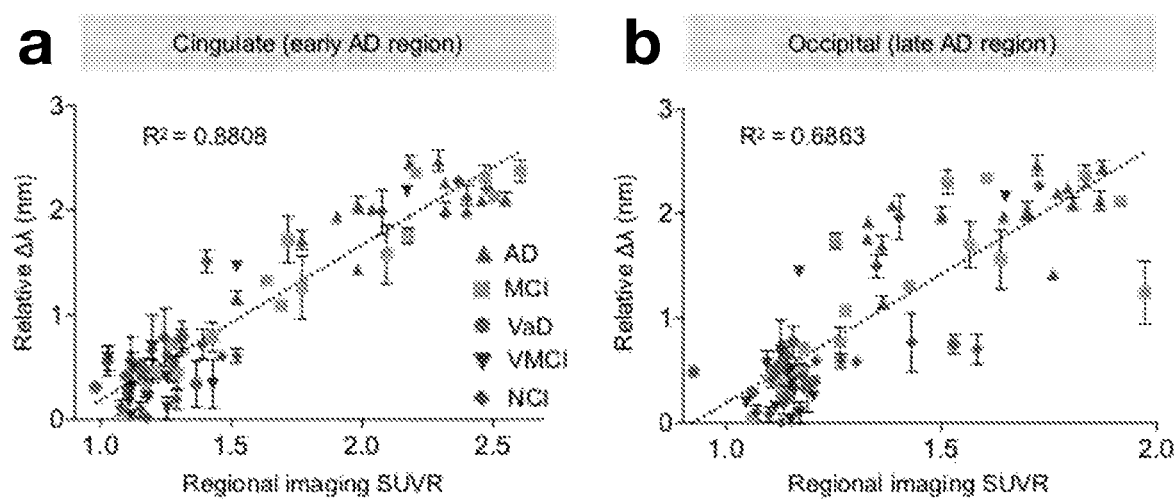

FIG. 17: Correlations of exosome-bound Aβ42 to regional brain amyloid load.
We determined the imaging SUVR of specific brain regions, namely the early AD-affected cingulate region and the late AD-affected occipital region. APEX measurements of exosome-bound Aβ42 showed a better agreement to the imaging data of the early AD-affected region (a, $R^2$=0.8808) than to that of the late AD-affected region (b, $R^2$=0.6863). Alzheimer's disease (AD, n=17), mild cognitive impairment (MCI, n=18), vascular dementia (VaD, n=9), vascular mild cognitive impairment (VMCI, n=12), healthy controls with no cognitive impairment (NCI, n=16). All measurements were performed in triplicate, and the data are displayed as mean±s.d.

Figure 18:
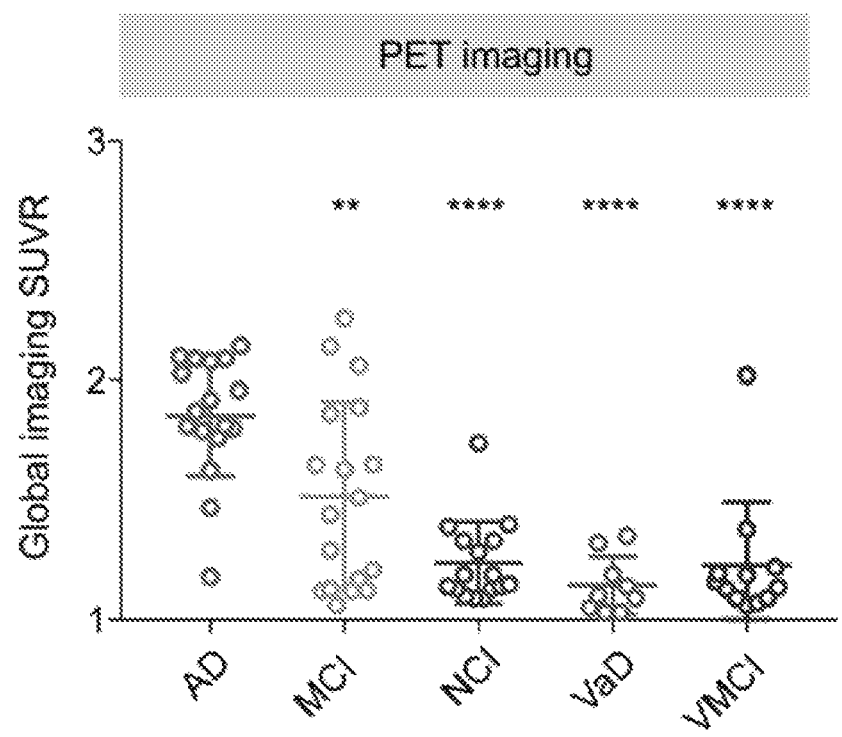

FIG. 18: Comparison of PET imaging in clinical subjects with different diagnoses.
PET imaging of brain amyloid plaque burden was performed in patients with different clinical diagnoses (n=72): AD (n=17), MCI (n=18), NCI (n=16), VaD (n=9) and VMCI (n=12). Standardized Uptake Value Ratio (SUVR) of global average plaque deposition could distinguish between the AD clinical groups (AD and MCI), as well as from other healthy subjects (NCI) and clinical controls (VaD and VMCI) ($P<0.01$, **$P<0.0001$, Student's t-test).

Figure 19:
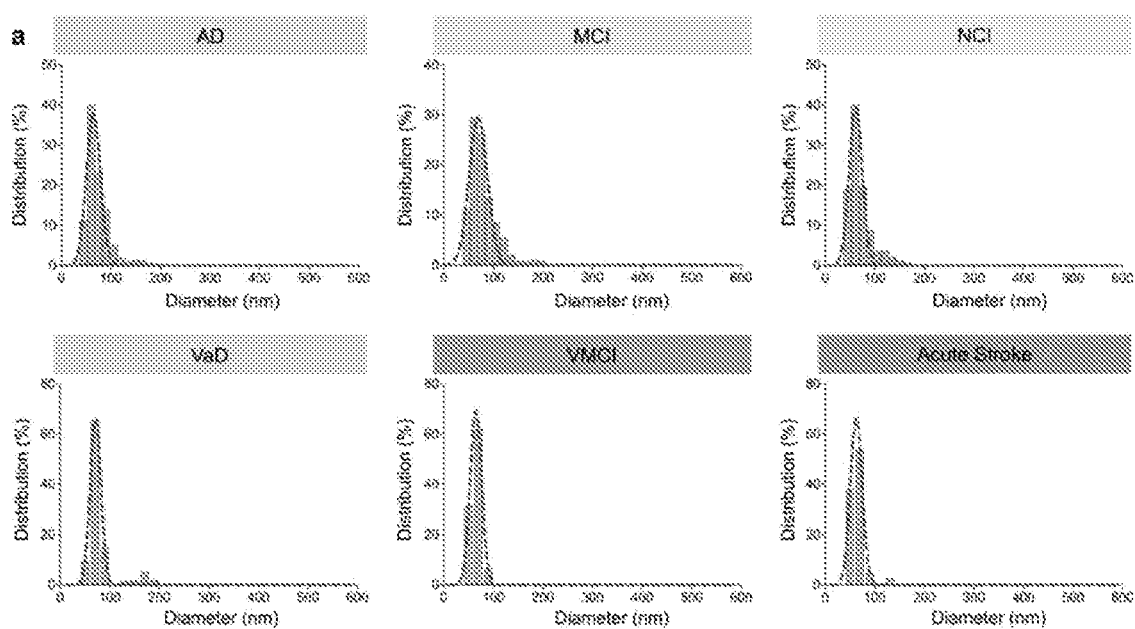

FIG. 19: Extracellular vesicles in clinical samples.
(a) Representative analysis of extracellular vesicles, as measured by nanoparticle tracking analysis, of blood samples from subjects with different clinical diagnoses (AD=17, MCI=18, NCI=16, VaD=9, VMCI=12, and acute stroke=12). Comparisons of (b) vesicle size and (c) vesicle concentration from the clinical blood samples (n=84). Note that neither vesicle size nor concentration was found to be significantly different among samples of different clinical diagnoses (n.s., not significant, Student's t-test).

Figure 20:
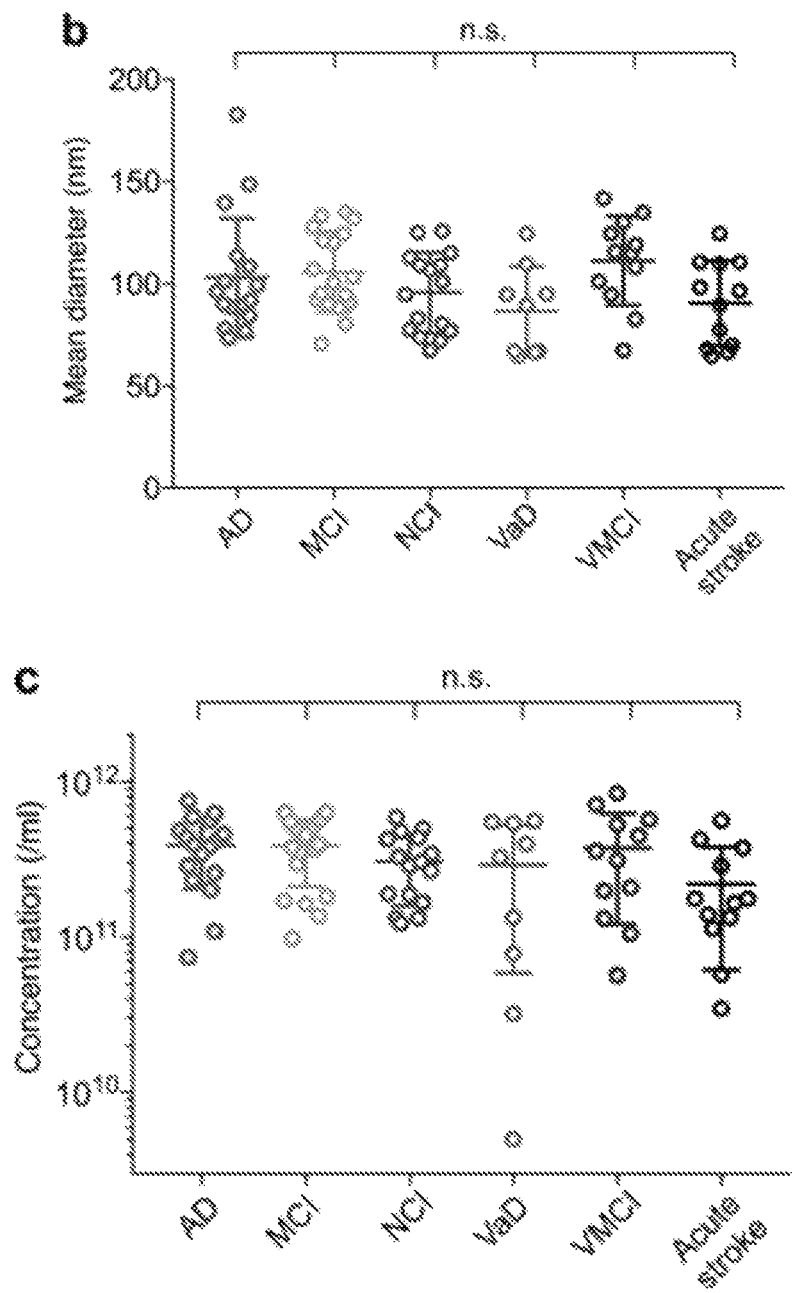

FIGS. 20A and 20B: Comparison of APEX assay technology, sensor design and fabrication.

Figure 21:
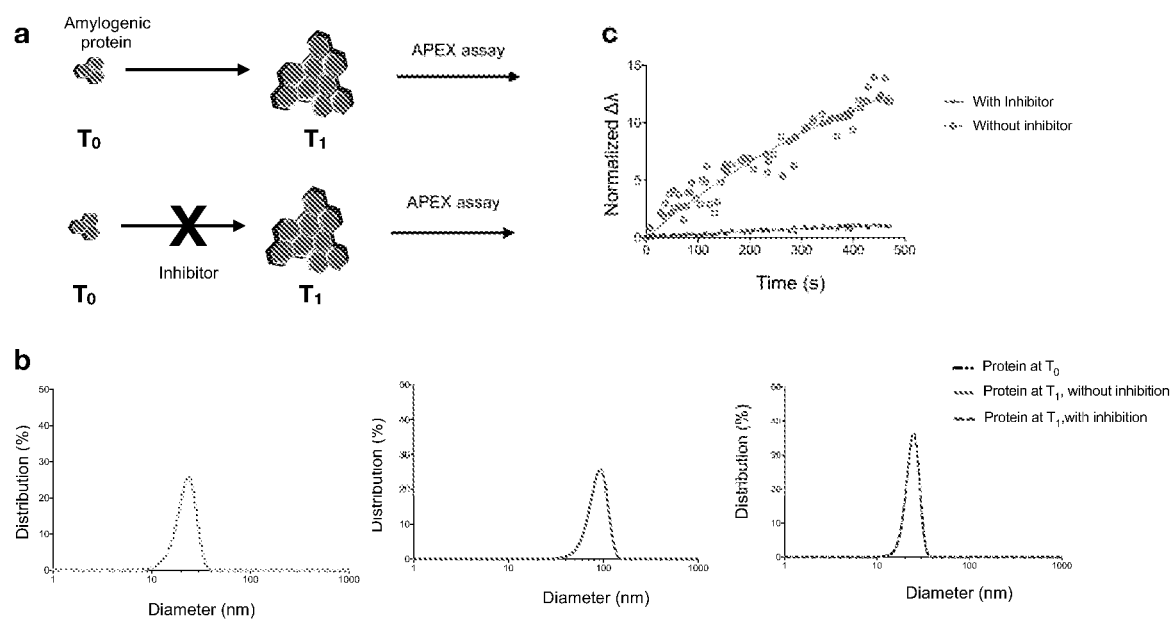

FIG. 21 shows (a) Inhibition of aggregation of amylogenic protein. (b) Dynamic light scattering analysis confirmed the unimodal size distribution and the difference in size when the amylogenic protein was incubated with and without inhibitor. (c) Real-time sensorgrams of exosome binding kinetics. Compared to the smaller Aβ42 aggregates (treated with inhibitor), exosomes demonstrated a much stronger affinity to the bigger Aβ42 aggregates (untreated).

Figure 22:
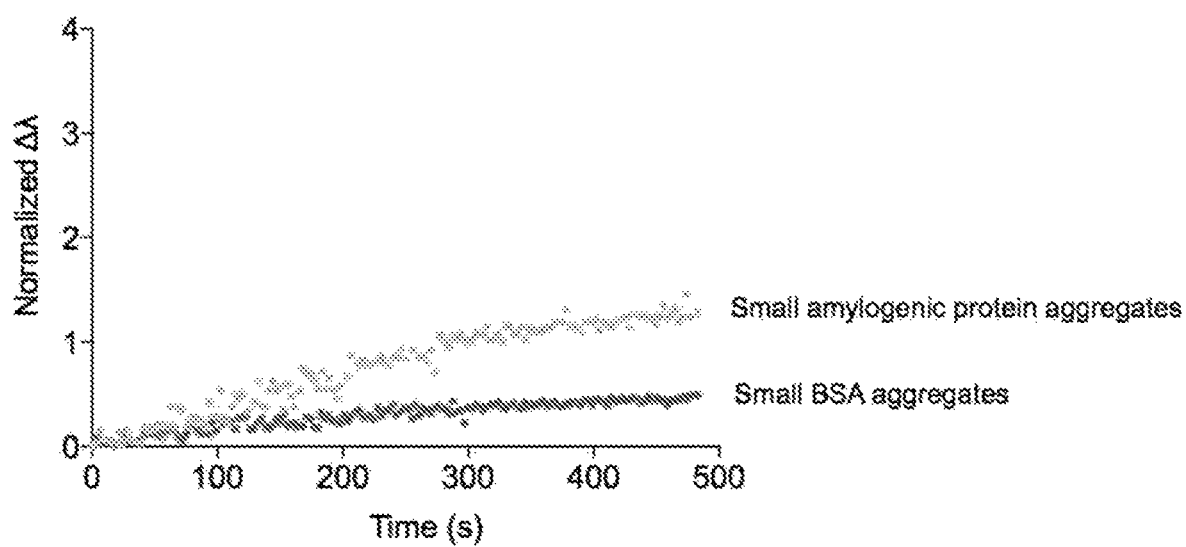

FIG. 22 shows real-time sensorgrams of exosome binding kinetics. In comparison to similar-sized bovine serum albumin (BSA) control aggregates, exosomes associated more strongly with the amylogenic protein (e.g. Aβ, APP, α-Syn, IRS-1, Tau, APOE, SOD1, TDP-43, bassoon, fibronectin) aggregates.

Figure 23:
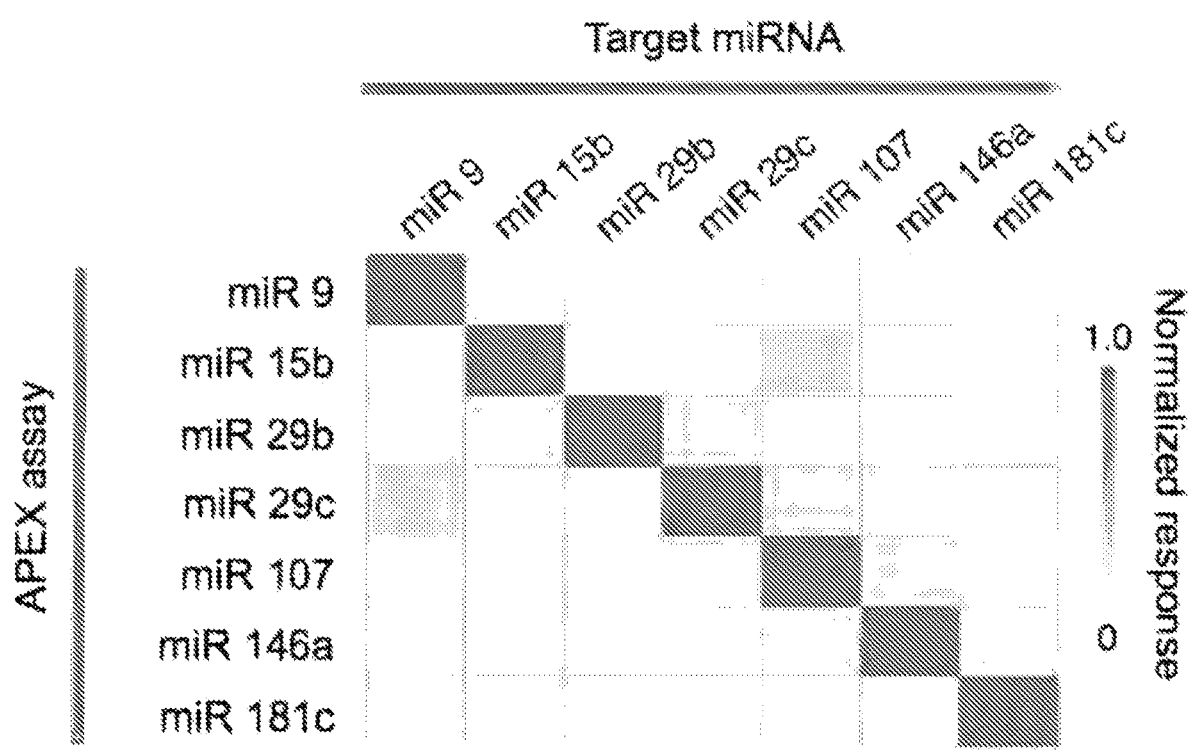

FIG. 23 shows specificity of APEX assays for measuring target miRNA molecules. Assays were developed for miR-9, miR-15b, miR-29b, miR-29c, miR-107, miR-146a and miR-181c. All assays demonstrated specific detection. Heat map signals were assay (row) normalized.

DETAILED DESCRIPTION

Disclosed herein is a sensor chip and methods for the detection of an analyte via surface plasmon resonance.

In one aspect, there is provided a sensor chip comprising a conductive layer on a membrane support layer, wherein a plurality of apertures extend through the conductive layer and the membrane support layer and are arranged such that illumination of the conductive layer and/or the membrane support layer produces a surface plasmon resonance.

In one embodiment, the design of multiple-layer of structured materials (conductive metal and supporting substrates) enables plasmonic coupling. This design may support bidirectional excitation of surface plasmon resonance where the SPR performance from bidirectional illumination (from the top or from the bottom) is comparable.

The term "conductive layer" as used herein may be a conductive material that exhibits surface plasmon resonance when excited with electromagnetic energy, such as light waves. The conductive material may refer to, for example, metallic conductive materials. Such metallic conductive materials can be any metal, including noble metals, alkali metals, transition metals, and alloys. Examples of conductive materials include, but are not limited to, gold, rhodium, palladium, silver, platinum, osmium, iridium, titanium, aluminium, copper, lithium, sodium, potassium, nickel, a metallic alloy, indium tin oxide, aluminium zinc oxide, gallium zinc oxide, titanium nitride, and graphene. In one embodiment, the conductive material is gold, silver, aluminium, sodium, indium or titanium. The metals may be in its bare form or coated with additional layers of protective and enhancing materials.

A conductive material can be "optically observable" when it exhibits significant scattering intensity in the optical region (ultraviolet-visible-infrared spectra), which includes wavelengths from approximately 100 nanometers (nm) to 3000 nm. A conductive material can be "visually observable" when it exhibits significant scattering intensity in the wavelength band from approximately 380 nm to 750 nm, which is detectable by the human eye, i.e., the visible spectrum.

In one embodiment, the membrane support layer is a structured membrane support layer.

In one embodiment, the membrane support layer is silicon nitride or sodium dioxide. Other support materials include substrates that can be patterned to form a coupled multilayer plasmonic structure.

The diameter and periodicity of the plurality of apertures that extend through the conductive layer and membrane support layer can be varied to achieve different resonance wavelength and penetration of the evanescent wave.

The plurality of apertures include symmetric circular holes, spatially anistropic shapes, e.g., elliptical shapes, slits, and also include any aperture of a triangular, square, rectangular, or polygonal shape. A combination of different shaped holes can also be used. The apertures may have a dimension or diameter of about 1500 nm or less, about 1400 nm or less, about 1300 nm or less, about 1200 nm or less, about 1100 nm or less, about 1000 nm or less, about 900 nm or less, about 800 nm or less, about 700 nm or less, about 600 nm or less, about 500 nm or less, about 450 nm or less, about 400 nm or less, about 350 nm or less about 300 nm or less, about 250 nm or less, about 240 nm or less, about 230 nm or less, about 220 nm or less, about 210 nm or less, about 200 nm or less, about 190 nm or less, about 180 nm or less, about 170 nm or less, about 160 nm or less, about 150 nm or less, about 140 nm or less, about 130 nm or less, about 120 nm or less, about 110 nm or less, about 100 nm or less, about 90 nm or less, about 80 nm or less, about 70 nm or less, about 60 nm or less, about 50 nm or less, about 40 nm or less, about 30 nm or less, about 20 nm or less, or about 10 nm or less.

In one embodiment, the apertures may have a dimension or diameter of about 150 nm to about 450 nm. In one embodiment, the apertures have a dimension or diameter selected from the group consisting of 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm or anywhere in between. In one embodiment, the apertures are holes and have a diameter of 230 nm.

The term "periodicity" refers to the recurrence or repetition of apertures at regular intervals by their positioning on the sensor chip. The term "periodic" thus refers to the regular predefined pattern of apertures with respect to each other.

The surface plasmon resonance sensor chip may comprise a periodic array of apertures. The regular periodicity may allow the tight control of the resonance wavelength and penetration of the evanescent wave. In one embodiment, the apertures have a periodicity of about 250 nm to about 650 nm. In one embodiment, the apertures have a periodicity selected from the group consisting of 250 nm, 260 nm, 270 nm, 280 nm, 290 nm, 300 nm, 310 nm, 320 nm, 330 nm, 340 nm, 350 nm, 360 nm, 370 nm, 380 nm, 390 urn, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm and 650 nm or anywhere in between. In one embodiment, the apertures have a periodicity of 450 nm.

In one embodiment, the apertures are arranged such that the surface plasmon resonance produced on illumination has a decay length approximately equal to a diameter of a target of the first recognition molecule.

In one embodiment, the conductive layer and the membrane support layer are disposed on a substrate, the substrate having a void formed therein in a region adjacent to the plurality of apertures to enable illumination of the conductive layer and/or the membrane support layer in either direction to produce the surface plasmon resonance.

In one embodiment, the sensor chip comprises a first recognition molecule immobilized onto the surface of the conductive layer. The first recognition molecule may be immobilized onto the surface using techniques that are well known in the art. For example, the first recognition molecule may be adsorbed onto the surface. Alternatively, the surface may be coated with a layer of streptavidin or avidin prior to immobilization of the first recognition molecule. The first recognition molecule may be biotinylated and immobilized onto the surface via streptavidin-biotin conjugation. In one embodiment, the surface may be incubated with polyethylene glycol (PEG) molecules. The surface may be incubated with an active (carboxylated) thiol-PEG. The surface may then be activated through carbodimide crosslinking in a mixture of excess NHS/EDC dissolved in MES buffer, and conjugated with the first recognition molecule. In an alternative embodiment, the surface may be incubated with a mixture of polyethylene glycol (PEG) containing long active (carboxylated) thiol-PEG and short inactive methylated thiol-PEG. The ratio of long active (carboxylated) thiol-PEG to short inactive methylated thiol-PEG can be optimized for maximal functional binding. The surface may then be activated through carbodimide crosslinking in a mixture of excess NHS/EDC dissolved in MES buffer, and conjugated with a first recognition molecule.

The term "recognition molecule" may refer to a molecule that is able to bind specifically to an analyte. The "recognition molecule" may be an antibody, a nucleic acid, a peptide, an aptamer, a small molecule or other synthetic agents.

The term "analyte" refers to a substance that is present in a sample to be detected or measured on a sensor chip. An "analyte" may include a cell, virus, nucleic acid, lipid, a protein, peptide, glycopeptide, nanovesicle, microvesicle, an exosome, extracellular vesicle, sugar, metabolite, or combinations or organizational states thereof. The "analyte" may, for example, be a peptide or nucleic acid (such as an miRNA) biomarker bound to or associated with an exosome. The "analyte" may also be a complex between a cell and a protein, or a protein and a nucleic acid, for example.

In one embodiment, the first recognition molecule is an antibody or a fragment thereof. The antibody may, for example, be an antibody that recognizes a pan-exosome marker or a marker that is associated or bound to an exosome. For example, the antibody may be an antibody that is specific to CD63, CD9 or CD81, which are abundant and characteristic in exosomes. The antibody may also be specific to a cell origin-specific marker such as CHL1, L1CAM or NCAM. The antibody may also recognize a biomarker that is associated or bound to an exosome. For example, the antibody may be an anti-A3 antibody that recognizes Aβ, or an antibody that recognizes APP, α-syn or Tau that is bound to or associated with an exosome.

As used herein, the term "antibody" includes, but is not limited to, synthetic antibodies, monoclonal antibodies, recombinantly produced antibodies, multispecific antibodies (including bi-specific antibodies), human antibodies, humanized antibodies, chimeric antibodies, single-chain Fvs (scFv), Fab fragments, F(ab') fragments, disulfide-linked Fvs (sdFv) (including bi-specific sdFvs), and anti-idiotypic (anti-Id) antibodies, and epitope-binding fragments of any of the above. The antibodies provided herein may be monospecific, bispecific, trispecific or of greater multi-specificity. Multispecific antibodies may be specific for different epitopes of a polypeptide or may be specific for both a polypeptide as well as for a heterologous epitope, such as a heterologous polypeptide or solid support material.

The terms "protein" and "polypeptide" are used interchangeably and refer to any polymer of amino acids (dipeptide or greater) linked through peptide bonds or modified peptide bonds. Polypeptides of less than about 10-20 amino acid residues are commonly referred to as "peptides." The polypeptides of the invention may comprise non-peptidic components, such as carbohydrate groups. Carbohydrates and other non-peptidic substituents may be added to a polypeptide by the cell in which the polypeptide is produced, and will vary with the type of cell. Polypeptides are defined herein, in terms of their amino acid backbone structures; substituents such as carbohydrate groups are generally not specified, but may be present nonetheless.

A "nucleic acid", as described herein, can be RNA or DNA, and can be single or double stranded, and can be, for example, a nucleic acid encoding a protein of interest, a polynucleotide, an oligonucleotide, a nucleic acid analogue, for example peptide-nucleic acid (PNA), pseudo-complementary PNA (pc-PNA), locked nucleic acid (LNA) etc. Such nucleic acid sequences include, for example, but are not limited to, nucleic acid sequence encoding proteins, for example that act as transcriptional repressors, antisense molecules, ribozymes, small inhibitory nucleic acid sequences, for example, but not limited to, RNAi, shRNAi, siRNA, micro RNAi (mRNAi), antisense oligonucleotides etc.

As used herein, a "nanovesicle" may refer to a naturally occurring or synthetic vesicle that includes a cavity inside. The nanovesicle may comprise a lipid bilayer membrane enclosing contents of an internal cavity. A nanovesicle may include a liposome, an exosome, extracellular vesicle, microvesicle, apoptotic vesicles (or apoptotic body), a vacuole, a lysosome, a transport vesicle, a secretory vesicle, a gas vesicle, a matrix vesicle, or a multivesicular body. A nanovesicle may have a dimension of about 1000 nm or less, about 900 nm or less, about 800 nm or less, about 700 nm or less, about 600 nm or less, about 500 nm or less, about 450 nm or less, about 400 nm or less, about 350 nm or less about 300 nm or less, about 250 nm or less, about 240 nm or less, about 230 nm or less, about 220 nm or less, about 210 nm or less, about 200 nm or less, about 190 nm or less, about 180 nm or less, about 170 nm or less, about 160 nm or less, about 150 nm or less, about 140 nm or less, about 130 nm or less, about 120 nm or less, about 1 10 nm or less, about 100 nm or less, about 90 nm or less, about 80 nm or less, about 70 nm or less, about 60 nm or less, about 50 nm or less, about 40 nm or less, about 30 nm or less, about 20 nm or less, or about 10 nm or less.

Exosomes are a type of nanovesicle, also referred to in the art as extracellular vesicles, microvesicles or microparticles. These vesicles are shed by eukaryotic cells, or budded off of the plasma membrane, to the exterior of the cell. These membrane vesicles are heterogeneous in size with diameters ranging from about 10 nm to about 5000 nm. The small vesicles (approximately 10 to 1000 nm, preferably 30 to 100 nm in diameter) that are released by exocytosis of intracellular multivesicular bodies are referred to in the art as "exosomes". The methods and compositions described herein are equally applicable for other vesicles of all sizes The term "sample" refers to any sample comprising or being tested for the presence of an analyte. Such a sample includes samples derived from or containing cells, organisms (bacteria, viruses), lysed cells or organisms, cellular extracts, nuclear extracts, components of cells or organisms, extracellular fluid, media in which cells or organisms are cultured in vitro, blood, plasma, serum, gastrointestinal secretions, urine, ascites, homogenates of tissues or tumors, synovial fluid, feces, saliva, sputum, cyst fluid, amniotic fluid, cerebrospinal fluid, peritoneal fluid, lung lavage fluid, semen, lymphatic fluid, tears, pleural fluid, nipple aspirates, breast milk, external sections of the skin, respiratory, intestinal, and genitourinary tracts, and prostatic fluid. A sample can be a viral or bacterial sample, a sample obtained from an environmental source, such as a body of polluted water, an air sample, or a soil sample, as well as a food industry sample. A sample can be a biological sample which refers to the fact that it is derived or obtained from a living organism. The organism can be in vivo (e.g. a whole organism) or can be in vitro (e.g., cells or organs grown in culture). A "biological sample" also refers to a cell or population of cells or a quantity of tissue or fluid from a subject. Most often, a sample has been removed from a subject, but the term "biological sample" can also refer to cells or tissue analyzed in vivo, i.e., without removal from the subject. Often, a "biological sample" will contain cells from a subject, but the term can also refer to non-cellular biological material, such as non-cellular fractions of blood, saliva, or urine. The biological sample may be from a resection, bronchoscopic biopsy, or core needle biopsy of a primary, secondary or metastatic tumor, or a cellblock from pleural fluid. In addition, fine needle aspirate biological samples are also useful. In one embodiment, a biological sample is primary ascite cells. Biological samples also include explants and primary and/or transformed cell cultures derived from patient tissues. A biological sample can be provided by removing a sample of cells from subject, but can also be accomplished by using previously isolated cells or cellular extracts (e.g. isolated by another person, at another time, and/or for another purpose). Archival tissues, such as those having treatment or outcome history may also be used. Biological samples include, but are not limited to, tissue biopsies, scrapes (e.g. buccal scrapes), whole blood, plasma, serum, urine, saliva, cell culture, or cerebrospinal fluid. The samples analyzed by the compositions and methods described herein may have been processed for purification or enrichment of exosomes contained therein. In one embodiment, the sample is blood.

In one aspect, there is provided an imaging system comprising a light source, detector and sensor chip as defined herein, wherein the detector is positioned to detect light produced by the light source and transmitted through the sensor chip.

In one aspect, there is also provided a kit comprising a sensor chip as defined herein.

The kit may further comprise a second recognition molecule that is specific to the captured analyte or an analyte associated with the captured analyte on the surface of the sensor chip. The kit may comprise one or more second recognition molecules that is each specific to one or more analytes such that one or more analytes may be detected.

The second recognition molecule may allow for 1) signal amplification, 2) co-localization analysis (e.g., detecting different targets that are concurrently found in the same vesicle) and 3) differentiation of subpopulations of analytes based on molecular and organizational differences.

The second recognition molecule may be coupled to a signal amplification moiety and wherein the signal amplification moiety is capable of inducing the formation of an insoluble aggregate of increased optical density relative to the captured analyte and increasing the surface plasmon resonance signal that is measured. For example, the kit may comprise a second recognition molecule that is an antibody (such as an antibody that is specific to Aβ42). The second recognition molecule may be conjugated to a Horse Radish Peroxidase enzyme. The kit may further comprise an enzyme substrate. The Horse Radish Peroxidase enzyme is thus able to induce the formation of an insoluble aggregate of increased optical density relative to the captured analyte on the surface of the sensor chip.

The term "signal amplification molecule" refers to a molecule that is able to induce the formation of an insoluble aggregate on the surface on the sensor chip and thereby increasing the optical density relative to a captured analyte. This helps to increase the sensitivity of the sensor chip by resulting in a greater change in transmission wavelength (spectral shift) or change in transmission intensity when a second recognition molecule binds to an analyte on the surface of the sensor chip. The "signal amplification molecule" may, for example, be an enzyme such as Horse Radish Peroxidase, which reacts with an enzyme substrate to form an insoluble aggregate on the surface of the sensor chip. The "signal amplification molecule" may also be a secondary antibody that binds to a second recognition molecule on the surface of the sensor chip and forms an aggregate. The secondary antibody may be further coupled to an enzyme, a gold particle or a large molecule that aids in forming a larger aggregate to increase the optical density.

In one embodiment, the present invention relates a highly sensitive analytical platform, namely amplified plasmonic exosome (APEX), for detecting exosome-bound amyloid β (Aβ) directly from blood samples of Alzheimer's disease (AD) patients. The said analytical method may leverage on transmission surface plasmon resonance (SPR) and in situ enzymatic conversion of optical product to enable multiplexed population analysis. The APEX technology may enable multi-parametric, in situ profiling of exosomal contents (e.g., proteins and miRNAs). The APEX platform may be used to measure different populations of circulating Aβ (exosome-bound, unbound and total) as well as different organizational states of circulating Aβ and correlates these blood measurements to PET imaging of brain amyloid plaque load.

In one aspect, there is provided a method of fabricating a sensor chip, the method comprising steps of:
  a) providing a top membrane support layer;
  b) depositing a conductive layer on the top membrane support layer;
  forming a plurality of apertures that extend through the membrane support layer, said apertures also extending through the conductive layer and being arranged such that illumination of the conductive layer and/or the top membrane support layer produces a surface plasmon resonance.

The method may comprise:
  coating the top membrane support layer and a bottom membrane support layer on the top and bottom surfaces of a silicon substrate;
  providing a layer of photoresist on the top membrane support layer, and
  defining a plurality of apertures in the photoresist via deep ultraviolet lithography (DUV) and transferring the pattern of the plurality of apertures to the top membrane support layer via reaction ion etching (RIE).

The method may further comprise the steps of:
  removing the photoresist on the top membrane support layer and coating a silicon dioxide protective layer on the surface of the top membrane support layer;
  coating a layer of photoresist on the bottom membrane support layer;
  defining a sensing area in the photoresist via photolithography; and transferring the pattern of the sensing area to the bottom membrane support layer via reaction ion etching (RIE); transferring the pattern of the sensing area to the silicon substrate;
  removing of the protective layer on the surface of the top membrane support layer with diluted hydrogen fluoride;
  and depositing the conductive layer on the top membrane support layer.

The term "sensing area" as used herein refers to an area in a sensor chip that includes a plurality of holes which are arranged such that the illumination of the plasmonic layer and/or the membrane support layer produces a surface plasmon resonance.

As used herein, the term "resist" refers to both a thin layer used to transfer an image or pattern to a substrate which it is deposited upon. A resist can be patterned via lithography to form a (sub)micrometer-scale, temporary mask that protects selected areas of the underlying substrate during subsequent processing steps, typically etching. The material used to prepare the thin layer (typically a viscous solution) is also encompassed by the term resist. Resists are generally mixtures of a polymer or its precursor and other small molecules (e.g. photoacid generators) that have been specially formulated for a given lithography technology. Resists used during photolithography, for example, are called "photoresists." Resists used during electron-beam lithography are called "ebeam resists."

In one aspect, there is provided a method of detecting an analyte in a sample, the method comprising:
  a) capturing an analyte onto a surface of a sensor chip as defined herein; and
  b) detecting binding of a second recognition molecule to the captured analyte on the surface of the sensor chip, wherein the second recognition molecule is specific to the analyte, wherein an increased binding of the second recognition molecule as compared to a control sample indicates the presence of the analyte in the sample.

The method may comprise the detection of binding of one or more second recognition molecules (either sequentially or, concurrently) that are specific to one or more analytes. This allows the detection, quantitation and analysis of the organizational states (e.g., co-localization) of multiple analytes or biomarkers in a sample. Each analyte may be recognized by a different set of first and second recognition molecules. First and second recognition molecules may recognize the same analyte or different analytes respectively. Different combinations of the first and second recognition molecules may allow the detection of co-localization of the analytes. This may allow the detection of multiple analytes at the same time and may allow the detection of co-localization of these molecules.

In one embodiment, the method comprises detecting two or more analytes that are co-localized in the sample. The two or more analytes may, for example, be present in or on a cell. Alternatively, the two or more analytes may, for example, be bound to the same exosome.

In one embodiment, the first recognition molecule is an antibody which recognizes Aβ42 and the second recognition molecule is another antibody which recognizes Aβ42.

In one embodiment, the first recognition molecule is an antibody which recognizes Aβ42 and the second recognition molecule is an antibody which recognizes CD63, detecting the co-localization of Aβ42 and CD63.

The detection of "binding" of a second recognition molecule to the captured analyte on the surface of a sensor chip may be via a spectral shift in terms (change in transmission wavelength) or a change in transmission intensity at a fixed wavelength. For example, an analyte that is captured on a surface of a sensor chip will have an initial reference wavelength. Upon binding of a second recognition molecule, the transmission wavelength may shift to a longer wavelength.

The change in transmission resonance wavelength (or spectral shift in terms ($\Delta\lambda$)) or change in transmission intensity at a fixed wavelength in a sample may be compared to the change that is observed in a control sample. This may be used to, for example, determine whether there is increased binding of a second recognition molecule to the captured analyte.

The "increased binding of the second recognition molecule" in a sample as compared to a control sample may be determined by comparing the change in spectral shift, or a change in transmission intensity at a fixed wavelength, between the sample and the control sample upon binding of the second recognition molecule. An increased change in spectral shift or change in transmission intensity may indicate that there is an increased binding of the second recognition molecule to the analyte.

In one embodiment, the increased change in spectral shift or transmission intensity may refer to a 1.2 fold or greater increase between the subject and the control subject. The term may also refer to an increase that is selected from a group consisting of 1.1 fold, 1.3 fold, 1.4 fold, 1.5 fold, 1.6 fold, 1.7 fold, 1.8 fold, 1.9 fold, 2 fold, 3 fold, 4 fold, 5 fold, 6 fold, 7 fold, 8 fold, 9 fold, 10 fold, 11 fold, 12 fold, 13 fold, 14 fold, 15 fold, 16 fold, 17 fold, 18 fold, 19 fold, 20 fold, 21 fold, 22 fold, 23 fold, 24 fold, 25 fold, 26 fold, 27 fold, 28 fold, 29 fold, 30 fold, 31 fold, 32 fold, 33 fold, 34 fold, 35 fold, 36 fold, 37 fold, 38 fold, 39 fold, 40 fold, 41 fold, 42 fold, 43 fold, 44 fold, 45 fold, 46 fold, 47 fold, 48 fold, 49 fold, 50 fold, 51 fold, 52 fold, 53 fold, 54 fold, 55 fold, 56 fold, 57 fold, 58 fold; 59 fold, 60 fold, 61 fold, 62 fold, 63 fold, 64 fold, 65 fold, 66 fold, 67 fold, 68 fold, 69 fold, 70 fold, 71 fold, 72 fold, 73 fold, 74 fold, 75 fold, 76 fold, 77 fold, 78 fold, 79 fold, 80 fold, 81 fold, 82 fold, 83 fold, 84 fold, 85 fold, 86 fold, 87 fold, 88 fold, 89 fold, 90 fold, 91 fold, 92, fold, 93 fold, 94 fold, 95 fold, 96 fold, 97 fold, 98 fold, 99 fold and 100 fold.

The second recognition molecule may be one that is specific to the analyte. The second recognition molecule may be coupled to a signal amplification moiety and wherein the signal amplification moiety is capable of inducing the formation of an insoluble aggregate of increased optical density relative to the captured analyte. For example, an analyte that is captured on a surface of a sensor chip will have an initial reference wavelength. Upon binding of a second recognition molecule, the transmission wavelength may shift to a longer wavelength. When the second recognition molecule is coupled to a signal amplification moiety, the transmission wavelength may shift to an even longer wavelength due to the increase in optical density.

The second recognition molecule may be fused to the signal amplification moiety. The second recognition molecule may alternatively be conjugated to the signal amplification moiety.

The signal amplification moiety may be an enzyme. In one embodiment, the signal amplification moiety is an enzyme. The enzyme may be horse radish peroxidase (HRP), alkaline phosphatase, glucose oxidase, β-lactamase or β-galactosidase or an enzymatic fragment thereof. In one embodiment, the enzyme is horse radish peroxidase. In one embodiment, the first biorecognition molecule is fused to the signal amplification moiety. For example, the first biorecognition molecule may be an antibody that is covalently fused to a horse radish peroxidase enzyme that is covalently linked to the antibody using techniques that are well known in the art.

The method may further comprise contacting the enzyme with an enzyme substrate. The enzyme substrate may be one that could form an insoluble product in the presence of enzymes or upon enzymatic action. For horse radish peroxidase (HRP), formulations such as 3-amino-9-ethylcarbazole, 3,3',5,5'-Tetramethylbenzidine or Chloronaphthol, 4-chloro-1-naphthol can be used. These substrates are able to turn into an insoluble product upon enzymatic reaction of HRP. In one embodiment, the enzyme substrate is 3,3'-diaminobenzidine tetrahydrochloride.

In an alternative embodiment, the signal amplification moiety may be a secondary antibody capable of binding to the second recognition molecule. The binding of the secondary antibody to the second recognition molecule may induce the formation of an insoluble aggregate.

In one embodiment, a first recognition molecule is immobilized on the surface of the surface plasmon resonance sensor chip, wherein the first recognition molecule is capable of capturing the analyte on the surface of the sensor chip. The analyte may be an exosome-bound or associated biomarker. The analyte may be an exosome bound or associated aggregated biomarker. The first recognition molecule may be specific to the analyte.

In one embodiment, the first recognition molecule is an antibody. The antibody may, for example, be an antibody that recognizes a pan-exosome marker or a marker that is associated or bound to an exosome. For example, the antibody may be an antibody that is specific to CD63, CD9 or CD81, which are abundant and characteristic in exosomes. The antibody may also be specific to a cell origin-specific marker such as CHL1, L1CAM or NCAM. The antibody may also recognize a biomarker that is associated or bound to an exosome. For example, the antibody may be an anti-Aβ antibody that recognizes Aβ, or an antibody that recognizes APP, α-syn or Tau that is bound to or associated with an exosome.

The term "control sample" refers to a sample that does not contain an analyte. The "control sample" may be used as a comparison with a sample to determine whether a sample contains an analyte of interest.

The term "biomarker" as used herein is understood to be an agent or entity whose presence or level correlates with an event of interest. The biomarker may be a cell, a protein, nucleic acid, peptide, glycopeptide, an exosome, or combinations thereof. For example, the biomarker is an Aβ42 or Tau peptide whose presence or level indicates whether a subject suffers from, or is at risk of developing, a neurodegenerative disease or amyloidosis. In another example, the biomarker is an exosome-bound or exosome-associated Aβ42 or Tau peptide whose presence or level indicates whether a subject suffers from, or is at risk of developing, a neurodegenerative disease or amyloidosis.

In one embodiment, there is provided a use of a sensor chip as defined herein for the detection on an analyte.

In one aspect, there is provided a method of detecting a neurodegenerative disease or amyloidosis in a subject, the method comprising:
a) contacting a sample with the surface of a sensor chip as defined herein; and
b) detecting binding of a second recognition molecule to an analyte captured on the surface of the sensor chip.
wherein the second recognition molecule is specific to the analyte, wherein an increased binding of the second recognition molecule as compared to a control subject indicates that the subject is suffering from a neurodegenerative disease or amyloidosis.

The term "subject" means any animal, including any vertebrate or mammal, and, in particular, a human, and can also be referred to, e.g., as an individual or patient.

The term "control subject" refers to a subject that is known not to be suffering from a neurodegenerative disease or amyloidosis or a subject who is not at risk of suffering from a neurodegenerative disease or amyloidosis. The "control subject" may also be a healthy subject. The "control subject" may be one having no cognitive impairment (NCI). The term includes a sample obtained from a control subject.

In one embodiment, the biomarker is an exosome-bound or exosome-associated biomarker. In one embodiment, the biomarker is an exosome-bound aggregated biomarker. The biomarker may be selected from the group consisting of but not limited to Aβ, APP, α-Syn or Tau. In one embodiment, the Aβ is A(342. In another embodiment, the Aβ is Aβ40. In one embodiment, the biomarker is Tau. In some embodiments, the biomarker is selected from the group consisting of Aβ, APP, α-Syn, CD9, CD63, CD81, ALIX, TSG101, Flotilin-1, Flotilin-2, LAMP-1, HSP70, HSP90, CHL1, IRS-1, L1CAM, NCAM, Tau, APOE, SOD1, TDP-43, bassoon, fibronectin, DNA, and RNA or combinations and associated complexes thereof.

The neurodegenerative disease may be selected from the group consisting of Alzheimer's disease and mild cognitive impairment.

The method may further comprise treating the subject found to be suffering from a neurodegenerative disease or amyloidosis.

The term "treating" as used herein may refer to (1) preventing or delaying the appearance of one or more symptoms of the disease; (2) inhibiting the development of the disease or one or more symptoms of the disease; (3) relieving the disease, i.e., causing regression of the disease or at least one or more symptoms of the disease; and/or (4) causing a decrease in the severity of one or more symptoms of the disease.

In one embodiment, the term "treating" refers to administrating a drug to slow down the progression of a neurodegenerative disease or amyloidosis.

Provided herein is a method of detecting a neurodegenerative disease or amyloidosis in a subject, the method comprising detecting the level of an exosome-bound biomarker in a sample obtained from the subject, wherein an increased level of the exosome-bound biomarker as compared to a reference indicates that the subject is suffering from a neurodegenerative disease or amyloidosis.

In one aspect, there is provided a method of detecting a neurodegenerative disease or amyloidosis in a subject, the method comprising detecting the level of an exosome-bound aggregated biomarker in a sample obtained from the subject, wherein an increased level of the exosome-bound aggregated biomarker as compared to a reference indicates that the subject is suffering from a neurodegenerative disease or amyloidosis.

The method may comprise the detection of one or more exosome-bound biomarkers in a sample. This allows the detection of the co-localization or presence of multiple biomarkers that are present on the same exosome.

The biomarker may be selected from the group consisting of but not limited to A3, APP, α-Syn or Tau.

The method may comprise detecting the level of a molecular subtype of the exosome-bound biomarker.

In one embodiment, the Aβ is Aβ42 or Aβ40.

In one embodiment, the Aβ is a prefibrillar aggregate. Prefibrillar Aβ aggregates were found to preferentially bind with exosomes. Enhanced binding between Aβ In one embodiment, the method as defined herein comprises detection of exosomes bound to prefibrillar Aβ aggregates.

In one embodiment, the aggregated biomarker is a prefibrillar aggregate. The aggregated biomarker may be a prefibrillar aggregate of Aβ. Alternatively, the aggregated biomarker may be a prefibrillar aggregate of APP, α-Syn or Tau.

In one embodiment, the reference is a control subject.

In one embodiment, there is provided a method of measuring exosome association as a surrogate to determine the prefibrillar organizational state of protein aggregates, wherein an increased level of the protein aggregates in prefibrillar organizational state as compared to a control indicates that the subject is suffering from a neurodegenerative disease or amyloidosis.

In one embodiment, the method further comprises detecting an exosomal biomarker selected from the group consisting of CD63, CD9 and CD81 wherein the exosomal biomarker is co-localized with the exosome-bound biomarker. In some embodiments, the exosomal biomarker is selected from the group consisting of Aβ, APP, α-Syn, CD9, CD63, CD81, ALIX, TSG101, Flotilin-1, Flotilin-2, LAMP-1, HSP70, HSP90, CHL1, IRS-1, L1CAM, NCAM, Tau, APOE, SOD1, TDP-43, bassoon, fibronectin, DNA, and RNA or combinations and associated complexes thereof.

In one embodiment, the method further comprises detecting a neuronal biomarker selected from the group consisting of NCAM, L1CAM and CHL-1 wherein the neuronal biomarker is co-localized with the exosome-bound biomarker.

In one embodiment, there is provided a method of measuring different organizational and molecular subpopulations of biomarkers. For example, the method may comprise the measurement of exosome-bound biomarker, free (unbound) biomarker and total (exosome-bound and unbound) biomarker. The method may also comprise measuring the relative concentration of different biomarkers to better predict a disease.

In one embodiment, the neurodegenerative disease is selected from the group consisting of Alzheimer's disease, mild cognitive impairment, vascular dementia and vascular mild cognitive impairment.

In one embodiment, the neurodegenerative disease is selected from the group consisting of Alzheimer's disease and mild cognitive impairment.

The method may further comprise treating the subject suffering from a neurodegenerative disease or amyloidosis.

The method may be further correlated with brain imaging studies such as PET imaging. This includes correlation with imaging of specific brain regions. In one embodiment, there is provided a method of identifying and measuring circulating biomarkers which are correlative to brain imaging (PET). In one embodiment, there is provided a method of identifying and measuring circulating biomarkers which are correlative to imaging of specific brain regions (PET).

The present invention is based on the finding that 1) biomarkers (including co-localized distinct markers) can be used to measure and characterize different molecular, biophysical and organizational subpopulations of circulating Aβ, 2) circulating exosome-bound Aβ in blood can correlate strongly to PET imaging of Aβ deposition (global average), across different patient populations; 3) circulating exosome-bound Aβ in blood can correlate strongly to PET imaging of Aβ (early AD region, cingulate region), across different patient populations, and 4. circulating exosome-bound Aβ can differentiate clinical subgroups (such as Alzheimer's disease, mild cognitive impairment, no cognitive impairment, vascular dementia, vascular mild cognitive impairment and acute stroke).

The method may comprise administering a therapeutically effective amount of a drug to the subject in need of treatment. The drug may, for example, be a cholinesterase inhibitor such as Donepezil, Rivastigmate, or Galantamine. The drug may also be a NMDA receptor antagonist, such as Memantine. The drug may be a combination a cholinesterase inhibitor and a NMDA receptor antagonist such as a combination between Donepezil and Memantine. The drug may be a BACE1 inihibitor such as AZD3293 or an antibody, e.g., an anti-amyloid antibody such as Aducanumab. The drug may also be an anti-tau drug such as TRx0237 (LMTX). In some embodiments, a therapeutically effective amount of one or more, or a combination of two or more of the drugs described herein can be administered to the subject in need of treatment.

In some embodiments, molecules that are effective in reducing the amount of amylogenic protein aggregates can be potential candidates for therapies. Thus, in some embodiments, the method can comprise administering one or more, or a combination of two or more of the following molecules (drugs) to a subject in need of treatment: methylthioninium chloride, leuco-methylthioninium bis(hydromethanesulfonate), curcumin, acid fuchsin, epigallocatechin gallate, safranal, congo red, apigenin, azure C, basic blue 41, (trans, trans)-1-bromo-2,5-bis-(3-hydroxycarbonyl-4-hy-droxy) styrylbenzene (BSB), Chicago sky blue 6B, -cyclodextrin, daunomycin hydrochloride, dimethyl yellow, direct red 80, 2,2-dihydroxybenzophenone, hexadecyltrimethylammonium bromide (C16), hemin chloride, hematin, indomethacin, juglone, lacmoid, meclocycline sulfosalicylate, melatonin, myricetin, 1,2-naphthoquinone, nordihydroguaiaretic acid, R( )-norapomorphine hydrobromide, orange G, o-vanillin (2-hydroxy-3-methoxybenzaldehyde), pherphenazine, phthalocyanine, rifamycin SV, phenol red, rolitetracycline, quinacrine mustard dihydrochloride, thioflavin S, ThT, and trimethyl(tetradecyl)ammonium bromide (C17), diallyltartar, eosin Y, fenofibrate, neocuproine, nystalin, octadecylsulfate, and rhodamine B.

The increased level of an exosome-bound biomarker can refer to a 1.2 fold or greater increase in level between the subject and the control subject, The term "increased level" may also refer to a increase that is selected from the group consisting of selected from a group consisting of 1.1 fold, 1.3 fold, 1.4 fold, 1.5 fold, 1.6 fold, 1.7 fold, 1.8 fold, 1.9 fold, 2 fold, 3 fold, 4 fold, 5 fold, 6 fold, 7 fold, 8 fold, 9 fold, 10 fold, 11 fold, 12 fold, 13 fold, 14 fold, 15 fold, 16 fold, 17 fold, 18 fold, 19 fold, 20 fold, 21 fold, 22 fold, 23 fold, 24 fold, 25 fold, 26 fold, 27 fold, 28 fold, 29 fold, 30 fold, 31 fold, 32 fold, 33 fold, 34 fold, 35 fold, 36 fold, 37 fold, 38 fold, 39 fold, 40 fold, 41 fold, 42 fold, 43 fold, 44 fold, 45 fold, 46 fold, 47 fold, 48 fold, 49 fold, 50 fold, 51 fold, 52 fold, 53 fold, 54 fold, 55 fold, 56 fold, 57 fold, 58 fold, 59 fold, 60 fold, 61 fold, 62 fold, 63 fold, 64 fold, 65 fold, 66 fold, 67 fold, 68 fold, 69 fold, 70 fold, 71 fold, 72 fold, 73 fold, 74 fold, 75 fold, 76 fold, 77 fold, 78 fold, 79 fold, 80 fold, 81 fold, 82 fold, 83 fold, 84 fold, 85 fold, 86 fold, 87 fold, 88 fold, 89 fold, 90 fold, 91 fold, 92, fold, 93 fold, 94 fold, 95 fold, 96 fold, 97 fold, 98 fold, 99 fold and 100 fold.

In one aspect, there is provided a method of detecting a subject at risk of developing a neurodegenerative disease, the method comprising detecting the level of an exosome-bound biomarker in a sample obtained from the subject, wherein an increased level of the exosome-bound biomarker as compared to a control subject indicates that the subject is suffering from a neurodegenerative disease.

In one aspect, there is provided a method of detecting and treating a neurodegenerative disease or amyloidosis in a subject, the method comprising:
  a) detecting the level of an exosome-bound aggregated biomarker in a sample obtained from the subject, wherein an increased level of an exosome-bound aggregated biomarker as compared to a reference indicates that the subject is suffering from a neurodegenerative disease or amyloidosis;
  and b) treating the subject suffering from neurodegenerative disease or amyloidosis.

In one aspect, there is provided a method of treating a neurodegenerative disease or amyloidosis in a subject, the method comprising:
  a) detecting the level of an exosome-bound aggregated biomarker in a sample obtained from the subject, wherein an increased level of an exosome-bound aggregated biomarker as compared to a reference indicates that the subject is suffering from a neurodegenerative disease or amyloidosis;
  and b) treating the subject suffering from neurodegenerative disease or amyloidosis.

In one embodiment, there is provided a method of detecting and slowing down the progression of a neurodegenerative disease or amyloidosis in a subject, the method comprising:
  a) detecting the level of an exosome-bound aggregated biomarker in a sample obtained from the subject, wherein an increased level of an exosome-bound aggregated biomarker as compared to a reference indicates that the subject is suffering from a neurodegenerative disease or amyloidosis;
  and b) treating the subject suffering from neurodegenerative disease or amyloidosis.

In one aspect, there is provided a method of determining the aggregation state of a biomarker in a sample, the method comprising detecting the level of exosome-bound biomarker in the sample, wherein an increased level of exosome-bound biomarker as compared to a reference is indicative of the degree of aggregation of the biomarker.

The method may comprise the step of contacting the sample with a population of exosomes prior to the step of detecting the level of exosome-bound biomarker.

In one embodiment, the aggregated biomarker in the sample, as compared to the non-aggregated biomarker, binds preferentially to exosomes.

The sample may be obtained from a subject.

In one embodiment, an increased degree of aggregation of the biomarker as compared to a reference is indicative of a neurodegenerative disease or amyloidosis in the subject.

The method may further comprise treating the subject suffering from a neurodegenerative disease or amyloidoisis.

In one embodiment, there is provided a method of determining the aggregation state of a biomarker in a sample, the method comprising contacting the sample with a population of exosomes and detecting the level of exosome-bound biomarker in the sample, wherein an increased level of exosome-bound biomarker as compared to a reference is indicative of the degree of aggregation of the biomarker.

Those skilled in the art will appreciate that the invention described herein is susceptible to variations and modifications other than those specifically described. It is to be understood that the invention includes all such variations and modifications which fall within the spirit and scope.

The invention also includes all of the steps, features, compositions and compounds referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Certain embodiments of the invention will now be described with reference to the following examples which are intended for the purpose of illustration only and are not intended to limit the scope of the generality hereinbefore described.

EXAMPLES

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Materials and Methods

Cell culture. Human cell lines SH-SY5Y (neuron), HUVEC (umbilical vein endothelial), THP-1 (monocyte), PC-3 (prostate epithelial) and SK-OV-3 (ovarian epithelial) were obtained from American Type Culture Collection. GLI36 (glia) and SK-OV-3 were grown in Dulbecco's Modified Essential Medium (DMEM, Gibco). SH-SY5Y was cultured in Dulbecco's Modified Eagle Medium: Nutrient Mixture F-12 Medium (DMEM/F12 Gibco). PC-3, THP-1 and HUVEC were grown in F-12K, RPMI-1640 and EGM-2 media, respectively. With the exception of EGM-2, which was supplemented with 5% fetal bovine serum (FBS), all other media were supplemented with 10% FBS and penicillin-streptomycin.

Exosome isolation and quantification. Cells at passages 1-15 were cultured in vesicle-depleted medium (with 5% depleted FBS) for 48 h before vesicle collection. All media containing exosomes were filtered through a 0.2-μm membrane filter (Millipore), isolated by differential centrifugation (first at 10,000 g and subsequently at 100,000 g), and used for exosome analysis with the APEX platform. For exosome isolation from blood cells and platelets, blood cells were derived from blood fractionation and platelets from platelet-rich plasma. These components were washed in HEPES buffered saline and incubated at 37° C. with 2 mM calcium chloride and 2 μM calcium ionophore (A23187) to stimulate exosome production. All vesicles were then collected as previously described. For independent quantification of exosome concentration, nanoparticle tracking analysis (NTA) system (NS300, Nanosight) was used. Exosome concentrations were adjusted to obtain ~50 vesicles in the field of view to achieve optimal counting. All NTA measurements were done with identical system settings for consistency.

APEX sensor fabrication. APEX sensors were fabricated on 8-inch silicon (Si) wafers. Briefly, a 10-nm silicon dioxide ($SiO_2$) layer was prepared through thermal oxidation and a 145-nm silicon nitride ($Si_3N_4$) was deposited on the wafer through low pressure chemical vapor deposition (LPCVD). After coating with photoresist, deep ultraviolet (DUV) lithography was performed to define the nanohole array pattern in the resist. This pattern was transferred via reactive ion etching (RIE) to the $Si_3N_4$ membrane. After removing the photoresist, a thin protective layer (100 nm) of $SiO_2$ was deposited on the front side of the wafer using plasma enhanced chemical vapor deposition (PECVD). To enable light transmission, the back side of the wafer was spin-coated with photoresist; lithography method was used to define the sensing area. $Si_3N_4$ and $SiO_2$ were etched by RIE and followed by potassium hydroxide (KOH) and tetramethylammonium hydroxide (TMAH) etching of Si. After etching, diluted hydrogen fluoride (DHF) (1:100) was used to remove the protective $SiO_2$ layer. Finally, Ti/Au (10 nm/100 nm) were deposited onto the $Si_3N_4$ membrane. All nanohole dimension and sensor uniformity were characterized by scanning electron microscopy (JEOL 6701).

Channel assembly. Standard soft lithography was used for fabricating a multi-channel flow cell. SU-8 negative resist (SU8-2025, Microchem) was used to prepare the mold. The photoresist was spin-coated onto a Si wafer at 2000 rpm for 30 s, and baked at 65° C. and 95° C. for 2 min and 5 min, respectively. After UV light exposure, the resist was baked again before being developed under agitation. The developed mold was chemically treated with trichlorosilane vapor inside a desiccator for 15 min before subsequent use. Polydimethylsiloxane polymer (PDMS) and crosslinker were mixed at a ratio of 10:1 and casted onto the SU-8 mold. After curing at 65° C. for 4 h, the PDMS layer was cut from the mold and assembled onto the APEX sensor. All inlets and outlets were made with 1.1-mm biopsy punch for sample processing.

Optical setup and spectral analysis. A tungsten halogen lamp (StockerYale Inc.) was used to illuminate the APEX sensor through a 10× microscope objective. Transmitted light was collected by an optical fiber and fed into a spectrometer (Ocean Optics). All measurements were performed at room temperature, in an enclosed box to eliminate ambient light interference. The transmitted light intensity was digitally recorded in counts against wavelength (330 nm ~1600 nm). For spectral analysis, the spectral peaks were determined using a custom-built R program by fitting the transmission peak using local regression method. All fittings were done locally. That is, for the fit at point x, the fit is made using points near x, weighted by their distance from x. In comparison to fitting by multi-order polynomial curve, this method could eliminate the result variation caused by the number of data points and data range being analyzed. In determining the optimal sensor geometry (FIG. 10), spectral changes to quantify peak transmission intensity, peak shape (full width at half maximum, FWHM) and detection sensitivity in response to refractive index changes, respectively, were used. The measured transmission spectra demonstrated uniformity across different sensors, with a s.d. of 0.03 nm in baseline spectral peak positions. All spectral shifts (Δλ) were determined as changes in the transmission spectral peaks, and calculated relative to appropriate control experiments (see below for details).

Sensor surface functionalization. To confer molecular specificity on the APEX sensor, the fabricated Au surface was first incubated with a mixture of polyethylene glycol (PEG) containing long active (carboxylated) thiol-PEG and short inactive methylated thiol-PEG (Thermo Scientific) (1:3 active: inactive, 10 mM in PBS) for 2 h at room temperature. After washing, the surface was activated through carbodimide crosslinking, in a mixture of excess NHS/EDC dissolved in MES buffer, and conjugated with specific probes and ligands (e.g., antibodies and Aβ42 aggregates). All probe information can be found in Table 1.

Excess unbound probes were removed by PBS washing. Conjugated sensors were stored in PBS at 4° C. for subsequent use. All sensor surface modifications were spectrally monitored to ensure uniform functionalization.

TABLE 1

List of markers and their probes used in profiling.

| Protein Description | Description | Antibody, catalog no. |
|---|---|---|
| Aβ42 | Amyloid-beta 42, a hydrophobic 42-peptide fragment from sequential cleavages by β- and γ-secretase of amyloid precursor protein. | Invitrogen, 374200; Abcam, ab34376 |
| APP | Amyloid precursor protein, a large membrane protein that plays an essential role in neural growth and repair. It is enriched in synapses of neurons. | Fitzgerald, 10R-1097; Biolegend 806001 |
| α-syn | Alpha-synuclein protein, abundant in brain and localizes at the presynaptic nerve terminals. | Invitrogen, 32-8100; R&D Systems, AF1338 |
| CD9 | A tetraspanin scaffold glycoprotein that is abundant and characteristic in exosomes. | BD Biosciences, 555370 |
| CD63 | A type III lysosomal membrane protein, a member of the tetraspanin family, abundant and characteristic in exosomes. | BD Biosciences, 556019 |
| CD81 | Also known as TAPA-1, a widely expressed protein in the tetraspanin family known to associate with integrins and is characteristic in exosomes. | BD Biosciences, 555675 |
| CHL1 | Close homolog of L1, also known as neural cell adhesion molecule L1-like. A neural extracellular matrix and cell adhesion protein that plays a role in nervous system development and in synaptic plasticity and may be involved in signal transduction pathways. | R&D Systems, MAB2126, AF2126 |
| IRS-1 | Insulin receptor substrate 1, a signaling adapter protein which can mediate the control of various cellular processes by insulin. | R&D Systems, MAB39781; Fitzgerald, 70R-35306 |
| L1CAM | Neural cell adhesion molecule L1. A transmembrane protein involved in processes such as neuronal migration, axonal growth, synaptogenesis, myelination and neuronal differentiation. | Invitrogen, 13-1719-82 |
| NCAM | Neural cell adhesion molecule, a homophilic binding glycoprotein that is a cell adhesion molecule involved in neuron-neuron adhesion, neurite fasciculation and outgrowth of neurites. It plays a role in synaptic plasticity as well as learning and memory. | BD Biosciences, 559049; R&D Systems, AF2408 |
| Tau | Tau, a microtubule-associated protein that stabilizes microtubules. It is abundant in neurons of the central nervous system. | Research Instruments, MN1000; R&D Systems, AF3494 |

| Target miRNA Probe sequence | Target miRNA Probe sequence | SEQ ID NO: |
|---|---|---|
| miR 9 | 5-UUUCGGUUAUCUAGCUUUAUUU-3-Biotin | 1 |
| miR 15b | 5-UAAACCAUGAUGUGCUGCUAUU-3-Biotin | 2 |
| miR 29b | 5-CACUGAUUUCAAAUGGUGCUAUU-3-Biotin | 3 |
| miR 29c | 5-ACACCAGGAGAAAUCGGUCAUU-3-Biotin | 4 |
| miR 107 | 5-AUAGCCCUGUACAAUGCUGCUUU-3-Biotin | 5 |
| miR 146a | 5-CCCAUGGAAUUCAGUUCUCAUU-3-Biotin | 6 |
| miR 181c | 5-UCACCGACAGGUUGAAUGUUUU-3-Biotin | 7 |

APEX signal amplification. To establish the APEX amplification, enzymatic growth of insoluble optical product for signal enhancement was incorporated, and the optical substrate concentration and reaction duration to establish the platform was optimized. Briefly, exosomes were incubated for 10 min with the CD63-functionalized APEX sensor (BD Biosciences). The bound vesicles were then labelled with biotinylated anti-CD63 antibody (Ancell, 10 min). As a control experiment, an equivalent amount of biotinylated IgG isotype control antibody (Biolegend) was used on the bound vesicles to determine the amplification efficiency. After washing of unbound antibodies, high sensitivity horseradish peroxidase, conjugated with neutravidin (Thermo Scientific), was allowed to react with the bound vesicles, before the introduction of different concentrations of 3,3'-diaminobenzidine tetrahydrochloride (Life Technologies) as the optical substrate. Real-time spectral changes were monitored to determine the optimal substrate concentration and reaction duration. The optimized conditions were determined to be 1 mg/mL for 3 min. All flow rates for incubation and washing were maintained at 3 μl/min and 10 μl/min, respectively. Localized deposition of insoluble optical product was confirmed through scanning electron microscopy. This optimized workflow is illustrated in FIG. 11a.

Using this set of conditions, a known amount of exosomes was further titrated and their associated APEX signals were measured. The APEX detection limit was determined as the lowest target concentration that could produce a detection signal=3×(s.d. of background signal from control).

APEX protein detection. All sensor surface was blocked with 2% w/v bovine serum albumin (BSA) to reduce non-specific protein binding. Exosomes were introduced onto the functionalized sensor, incubated for 10 min at room temperature for exosome capture and washed with PBS to remove the unbound. For extravesicular protein target, exosomes were labeled directly with the detection antibody for APEX amplification, as described above. For intravesicular protein target, exosomes were subjected to additional fixation and permeablization (eBioscience), before being labeled with the detection antibody. Spectral measurements were performed before and after the APEX amplification, and analyzed by the custom-designed R program.

APEX miRNA detection. APEX sensor was functionalized with p19 protein (New England Biolabs) via its chitin-binding domain and blocked with 2% w/v BSA. For miRNA detection, exosome lysate was incubated with biotinylated RNA probes (350 nM) for 15 min to hybridize with target miRNA strands. The mixture was introduced onto the functionalized sensor in binding buffer (1× p19 Binding Buffer, pH 7.0, 40U RNase inhibitor, 0.1 mg/mL BSA) to enable p19 capture of the hybridized miRNA target/RNA probe duplex. High sensitivity horseradish peroxidase, conjugated with neutravidin (Thermo Scientific), was introduced to the bound biotinylated duplex for APEX amplification. Spectral measurements were performed and analyzed by the custom-designed R program.

Enzyme-linked immunosorbent assay (ELISA). Capture antibodies (5 μg/ml) were adsorbed onto ELISA plates (Thermo Scientific) and blocked with Superblock (Thermo Scientific) before incubation with samples. After washing with PBST (PBS with 0.05% Tween 20), detection antibodies (2 μg/ml) were added and incubated for 2 h at room temperature. Following incubation with horseradish peroxidase-conjugated secondary antibody (Thermo Scientific) and chemiluminescent substrate (Thermo Scientific), chemiluminescence intensity was measured for protein detection (Tecan).

Western blotting. Exosomes isolated by ultracentrifugation were lysed in radioimmunoprecipitation assay (RIPA) buffer containing protease inhibitors (Thermo Scientific) and quantified using bicinchoninic acid assay (BCA assay, Thermo Scientific). Protein lysates were resolved by sodium dodecyl sulfate polyacrylamide gel electrophoresis (SDS-PAGE), transferred onto polyvinylidene fluoride membrane (PVDF, Invitrogen) and immunoblotted with antibodies against protein markers: HSP90 (Cell Signaling), HSP70 (BioLegend), Flotillin 1 (BD Biosciences), CD63 (Santa Cruz), ALIX (Cell Signaling), TSG101 (BD Biosciences), LAMP-1 (R&D Systems) and neuronal marker NCAM (R&D Systems). Following incubation with horseradish peroxidaseconjugated secondary antibody (Cell Signaling), enhanced chemiluminescence was used for immunodetection (Thermo Scientific).

Protein aggregation. Lyophilized NH40H-treated Aβ42 protein (rPeptide) was resuspended in NaOH (60 mM, 4° C.), sonicated and pH adjusted to pH 7.4 in PBS34. The protein was immediately filtered through a 0.2-μm membrane filter (Millipore) and the filtrate was used as the smaller Aβ42 aggregates. For preparation of the bigger Aβ42 aggregates, the protein was treated as described above and incubated with agitation for 1 h to induce further aggregation, before being filtered through a 0.2-μm membrane filter (Millipore). The filtrate was used as the big A3 aggregates. To prepare similar-sized BSA aggregates as controls, 2% w/v BSA was dissolved in PBS, heated at 80° C. for 1 h and 2 h to induce clustering of the small and big control aggregates, respectively.

Aggregate size determination. Hydrodynamic diameter of Aβ42 and BSA aggregates were determined by dynamic light scattering analysis (Zetasizer Nano ZSP, Malvern). 3×14 measurement runs were performed at 4° C. Z-average diameter and polydispersity were analyzed. For every measurement, the autocorrelation function and polydispersity index were monitored to ensure sample quality for size determination.

Characterization of exosome-Aβ association. The prepared protein aggregates (Aβ42 and BSA control) were used for surface functionalization onto the APEX sensors, via EDC/NHS coupling as previously described. Unbound protein aggregates were washed away with PBS. The amount of protein conjugated was measured from the resultant transmission spectral shifts. This information was used to determine the number of conjugated protein aggregates and their associated total protein surface area for exosome binding (see below for detailed information), so as to normalize for binding affinities. Following surface functionalization with the protein aggregates, exosomes ($10^{10}$/ml) were introduced onto the sensors. Spectral changes were measured every 3 s for a total duration of 480 s to construct real-time kinetics sensorgrams. Exosome association kinetics and binding affinities were determined for different-sized protein aggregates. To account for protein aggregate size differences as well as SPR-associated exponential decay of sensitivity (with increasing distance from the sensing surface), the following equation was used $$S = E \times \int_0^{2r} \pi [r^2 - (r-z)^2] \times e^{(-2z/ld)} dz$$

to calculate the total surface area of the conjugated aggregates for interaction with exosomes: where S is the signal, z is the distance from the sensor surface, E is the electric field at z=0 and a constant in this case, ld is the decay length and is set at 200 nm with the current sensor design, r is the radius of the conjugated protein aggregate.

All protein aggregates were approximated as spheres, as supported by transmission electron micrographs (FIG. 3b, left) and their r determined from dynamic light scattering analysis. The above equation was used to determine the number of protein aggregates conjugated onto the sensor as well as their respective total surface area, to estimate the number of available binding sites for interaction with exosomes. All exosome binding data (Δλ) were normalized against their respective protein binding sites. Normalized Aβ42 binding data were made relative to similar-sized BSA controls and fitted to determine the binding affinity constant KD.

Scanning electron microscopy. All samples were fixed with half-strength Karnovsky's fixative and washed twice with PBS. After dehydration in a series of increasing ethanol concentrations, samples were transferred for critical drying (Leica) and subsequently sputter-coated with gold (Leica), before imaging with a scanning electron microscope (JEOL 6701).

Transmission electron microscopy. Exosomes were immunolabeled with gold nanoparticles (15 nm, Ted Pella), fixed with 2% paraformaldehyde and transferred onto a copper grid (Ted Pella). The bound vesicles were washed and contrast-stained with uranyl oxalate and methyl cellulose mixture. Dried samples were imaged with a transmission electron microscope (JEOL 2200FS).

Clinical sample collection. The study was approved by the NUH and NUS Institutional Review Board (2015/00441, 2015/00406 and 2016/01201). All subjects were recruited according to Institutional Review Board approved protocols with informed consents. All recruited subjects underwent several neuropsychological assessments at the National University Hospital (NUH, Singapore), including Mini Mental State Examination (MMSE), Montreal Cognitive Assessment (MoCa) and Vascular Dementia battery (VDB) for cognitive assessment. Clinical diagnosis of AD, MCI or NCI was made by neuropsychological assessments as well as evaluation of clinical features and blood investigations. Clinical diagnosis of VaD and VMCI was made from a combination of neuropsychological assessments, clinical history of stroke and degree of cerebrovascular disease observed through Magnetic Resonance Imaging (MRI). All clinical assessments and classification were performed according to published criteria 46-48 and independent of the APEX measurements. Acute stroke plasma samples were collected from patients within 24 hours of hospital admission with a diagnosis of stroke. Longitudinal plasma samples were collected from patients during follow-up visits over the span of a year, without PET brain imaging. For plasma collection, venous blood (5 ml) was drawn from subjects, prior to infusion of PET radiotracer (where applicable), in EDTA tubes and processed immediately. Briefly, all blood samples were centrifuged for 10 min at 400 g (4° C.). Plasma was transferred without disturbing the buffy coat and centrifuged again for 10 min at 1,100 g (4° C.). All plasma samples were de-identified and stored at −80° C. before measurements with the APEX platform. All APEX measurements were performed blinded from PET imaging results and clinical diagnoses.

Clinical APEX measurements. All plasma samples were measured according to the assay configurations outlined in Supplementary FIG. 15a. Briefly, to measure the exosome-bound Aβ42 population, we used native plasma samples directly, through Aβ42 capture and CD63 detection (Aβ42+CD63+), without requiring any vesicle purification or isolation. To illustrate the existence of the unbound Aβ42 population in plasma samples, we used size-exclusion filtration (cutoff size=50 nm, Whatman) to remove large-sized retentate. This was necessary as the assay configuration, based on Aβ42 capture and Aβ42 detection, could not differentiate between the unbound from the total Aβ42. To measure the unbound Aβ, we evaluated the plasma filtrate through Aβ42 capture and Aβ42 detection (Aβ42+Aβ42+). Note that this filtration was only performed to demonstrate the presence of the unbound Aβ42 population; it is not necessary in the clinical context where only the more reflective exosome-bound Aβ42 will be measured directly from native plasma samples. To measure total Aβ42, we evaluated native plasma samples directly through Aβ42 capture and Aβ42 detection (Aβ42+Aβ42+). For all measurements, we used 5% BSA as a blocking agent for the APEX sensor. We also included a sample-matched negative control, where we incubated the same sample over a control sensor functionalized with IgG isotype control antibody. All measurements were made relative to this IgG control to account for sample-matched non-specific binding.

Positron emission tomography (PET) imaging. Following blood draw, subjects were scanned using a Siemens 3T Biograph mMR system (Siemens Healthineers) for simultaneous acquisition of PET and MR images. PET data were acquired 40-70 min after an intravenous infusion of 370 MBq of 11C-Pittsburgh Compound B (PiB). MR data was acquired using a 12-channel head receive coil for acquisition and consisted of an Ultrashort Echo Time (UTE) image for PET attenuation correction and a T1-weighted Magnetization Prepared Gradient Echo (MPRAGE) image (1 mm isotropic resolution, TI/TE/TR=900/3.05/1950 ms).

PET data analysis. Ti-weighted MPRAGE images were processed using Freesurfer (5.3.0) to produce parcellations of the cortex for PET data analysis. PET images were reconstructed using an Ordinary Poisson Ordered Subset Expectation Maximization (OP-OSEM) algorithm and smoothed using a 4 mm Gaussian filter. Data were attenuated using the UTE based μ-map. Resulting attenuation corrected Standardized Uptake Value (SUV) images were then co-registered to the MPRAGE images using Advanced Normalization Tools (ANTs) and the subject specific Freesurfer parcellation was used to calculate the Standardized Uptake Value Ratio (SUVR) relative to the mean cerebellar grey matter intensity. Mean SUVRs were calculated for specific regions and the global average SUVR for each patient was calculated by averaging the SUVRs of all brain regions.

Statistical analysis. All measurements were performed in triplicate and the data are displayed as mean±s.d. Significance tests were, performed via a two-tailed Student's t-test. For inter-sample comparisons, multiple pairs of samples were each tested, and the resulting P values were adjusted for multiple hypothesis testing using Bonferroni correction. Values that had an adjusted P<0.05 were determined as significant. One-way pairwise ANOVA tests were used to determine analytical and biological coefficients of variation (i.e., within group, between group, and total). For the clinical study, correlations were performed with linear regression to determine the goodness of fit (R2). All statistical analyses were performed using the R-package (version 3.4.2) and Graphpad Prism 7.

Example 1

Amplified Plasmonic Analysis of Exosome-Bound Aβ

One of the earliest pathological hallmarks of AD is brain deposits of Aβ. These plaques are formed from the clustering of abnormal amyloid-protein fragments, majorly the hydrophobic spliced variant Aβ42. As proteins are released into the extracellular space and can circulate through the bloodstream. Also found in the extracellular space, exosomes are nanoscale membrane vesicles secreted by mammalian cells through the fusion of multivesicular endosomes with the plasma membrane. During this exosome biogenesis, glycoproteins and glycolipids are incorporated into the invaginating plasma membrane and sorted into the newly formed exosomes 10,11. Through these surface markers, exosomes can associate and bind with extracellular Aβ proteins (FIG. 1a). Multimodal characterization of extracellular vesicles derived from neuronal origin (SH-SY5Y cells) confirmed their exosomal morphology, size distribution and molecular composition (FIG. 5). Transmission electron microscopy analysis of the vesicles further revealed their ability to bind with Aβ42 protein aggregates (FIG. 1b and FIG. 5).

To evaluate exosome-Aβ association, the APEX platform was developed for amplified, multi-parametric profiling of exosome molecular co-localization. The system measures transmission SPR through a periodic array of plasmonic nanoholes, patterned in a double-layer photonic structure, and uses an in situ enzymatic conversion to rapidly grow an insoluble optical product over bound exosomes (FIG. 1c). To complement the APEX enzymatic deposition (which occurs on the sensor top), size-matching plasmonic nanoholes were patterned in a coupled, double-layered photonic system for enhanced SPR measurements through backside illumination (away from the enzyme activity, FIGS. 20A and 20B). The resultant enzymatic deposition not only stably changes the refractive index for SPR signal amplification, as demonstrated by the red shift in the transmitted light spectrum (spectral shift Δλ, FIG. 1d), but is also spatially defined for molecular colocalization analysis. Scanning electron micrographs of sensor-bound exosomes, before and after APEX ampli-fication, confirmed the localized growth of optical deposits after enzymatic conversion (FIG. 6).

Using the developed APEX platform, the association of Aβ proteins with exosomes was thus measured directly from clinical blood samples of AD patients and control subjects, and the measurements were correlated to PET imaging of global and regional brain plaque deposition (FIG. 1e). For high-throughput, multiplexed clinical analysis, advanced fabrication approach (i.e., deep ultraviolet lithography, FIG. 7) was employed to prepare sensor microarrays on 8-inch wafers; each wafer could accommodate more than 40 microarray chips, with >2000 sensing elements (FIG. 8a). FIG. 1f shows a photograph of the developed APEX microarray chip used in this study for parallel measurements. Scanning electron micrographs of the developed sensor showed highly uniform fabrication (FIG. 8b).

Optimized Signal Amplification for Multiplexed Profiling

The enzymatic APEX amplification was first developed. A series of sensor functionalization was performed, namely antibody conjugation, exosome binding, enzyme labeling and optical product amplification, and the step-by-step total spectral shifts (cumulative Δλ, FIG. 2a) were measured. The sensor were functionalized with antibodies against CD63, a type III lysosomal membrane protein abundant in and characteristic of exosomes, to capture vesicles derived from neuronal cells (SHSY5Y). To facilitate localized deposition of insoluble optical product, horseradish peroxidase was incorporated as the cascading enzyme and was used to catalyze the conversion of its soluble substrate (3,3'-diaminobenzidine tetrahydrochloride). The sensor-bound vesicles were enzyme-labeled via another anti-CD63 antibody. While the enzyme labeling did not cause any significant spectral changes, the optical product formation led to ~400% signal enhancement. In comparison, the control experiment with IgG isotype control antibodies demonstrated minimal background changes (FIG. 9). Importantly, this SPR signal amplification correlated well with the increase in area coverage by the highly localized optical deposits, as confirmed by scanning electron microscopy (FIG. 2b).

To complement the enzymatic amplification (which occurs on the sensor top), the APEX sensor design was optimized to improve its analytical performance and stability. As compared to the established gold-on-glass design, which supports only front illumination (FIGS. 20A and 20B), the APEX's double-layered plasmonic structure enables SPR excitation via back illumination (FIG. 2c). The new optimized design not only showed strong transmission SPR through back illumination (FIG. 10a-c), but also demonstrated analytical stability (FIG. 10d), likely due to reduced direct incident illumination (i.e., temperature fluctuation) on the enzymatic activity. The APEX assay was further established by optimizing the enzyme substrate concentration as well as the reaction duration (FIG. 2d). Through constant back illumination, the real-time spectral changes associated with different substrate concentrations was monitored, and it was found that substantial signal amplification could be accomplished in <10 min, thus enabling the entire APEX workflow to be completed in <1 h.

With these optimized conditions, the APEX detection sensitivity was next measured for exosome quantification. Neuron-derived vesicles (SH-SY5Y) were quantified with standard nanoparticle tracking analysis. Using anti-CD63 antibodies, we performed a titration experiment (FIG. 2e). It was determined that the optimized APEX amplification could boost the detection sensitivity by a 10-fold improvement, establishing a limit of detection (LOD) ~200 exosomes. This observed sensitivity is the best LOD reported thus far for bulk exosome measurements, and fares $10^5$- and $10^3$-fold better than Western blotting and chemiluminescence ELISA, respectively.

Using the microarray APEX platform, assays were further developed for profiling diverse markers associated with neurodegenerative diseases. Specific assays were established for the following protein markers (FIG. 2f): amyloid β (Aβ42), amyloid precursor protein (APP), alpha-synuclein (α-syn), close homolog of L1 (CHL1), insulin receptor substrate 1 (IRS-1), neural cell adhesion molecule (NCAM) and tau protein. Importantly, by further development of the APEX assay workflow (FIG. 11a), the platform demonstrated signal amplification capacity for detecting both extra- and intravesicular proteins, as well as exosomal miRNAs (FIG. 11b). All detection probes used for assay development can be found in Table 1.

Enhanced Binding Between Aβ Aggregates and Exosomes

Using the developed APEX platform, the association of exosomes to different structural forms of pathological Aβ proteins was next evaluated. To mimic various stages of amyloid seeding and fibrillation, different-sized aggregates of Aβ42, a major component of amyloid plaques, were prepared. The degree of clustering was varied to form different-sized Aβ42 aggregates (FIG. 3a, see Methods for experimental details), and their globular morphology and unimodal size distribution were confirmed through transmission electron microscopy and dynamic light scattering analysis, respectively (FIG. 3b). It was further noted that the bigger Aβ42 aggregates demonstrated a strong propensity to form fibrillar structures (FIG. 12).

To determine the kinetics of exosome-Aβ association, the prepared Aβ42 aggregates were immobilised onto the APEX platform, and the sensors were incubated with equal concentrations of neuron-derived exosomes (FIG. 3c). Comparatively, in a control experiment, similar-sized aggregates of bovine serum albumin (BSA) (FIG. 13) were prepared and characterized. By measuring real-time exosome binding, it was demonstrated that regardless of the aggregate size, exosomes could associate more strongly with the Aβ42 aggregates than with similar-sized BSA controls (FIG. 3d). More importantly, in comparison to its binding affinity to the smaller Aβ42 aggregates (FIG. 3d, left), the vesicles showed a significantly higher binding affinity (>5 fold higher) to the bigger Aβ42 aggregates (FIG. 3d, right). All affinities were normalized against Aβ42 aggregate surface areas and made relative to the respective BSA controls (see Methods for details).

Figure 3E:
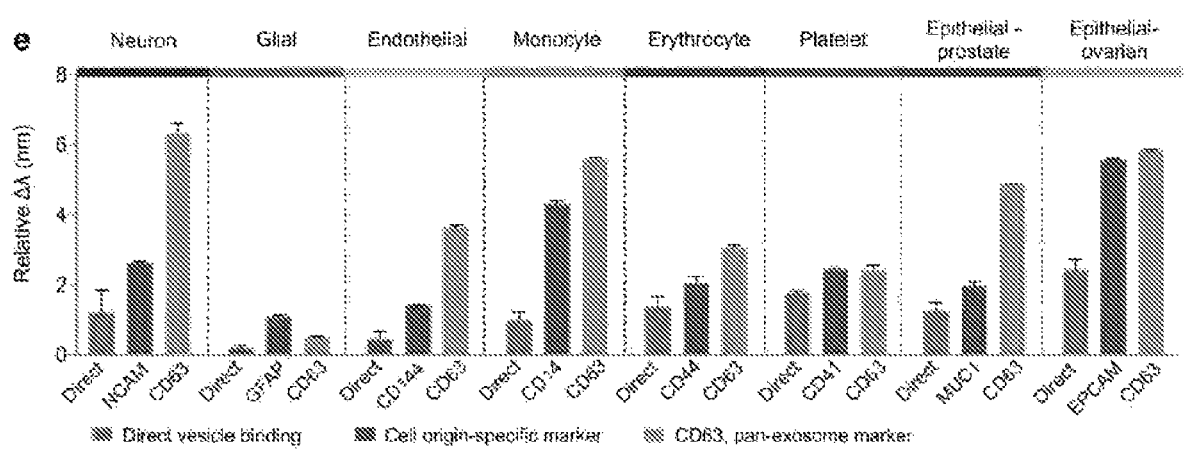

Next, using extracellular vesicles derived from different cell origins, the APEX platform was utilized to measure their respective association with the bigger Aβ42 aggregates (FIG. 3e). Equal concentrations of vesicles derived from various cell origins, as determined by nanoparticle tracking analysis (FIG. 14), were incubated with Aβ42-functionalized sensors. It was noted that of all the cell origins tested, neuron, erythrocyte, platelet and epithelial cell-derived vesicles demonstrated stronger association with the Aβ42 aggregates, while glial and endothelial cell derived vesicles showed negligible binding. A panel of specific markers against these respective cellular origins as well as a pan-exosome marker (i.e., CD63) were next used for APEX signal amplification of the bound vesicles. CD63 performed consistently for signal enhancement across all vesicles tested. With this marker identification, CD63 was thus used to develop the APEX assay to identify and measure exosome-bound Aβ (defined as Aβ42+CD63+; FIG. 15).

Brain Plaque Load Revealed by Blood Exosome-Bound Aβ

In light of enhanced binding between exosomes and prefibrillar Aβ aggregates—the building blocks of amyloid plaques, it was hypothesized that exosome-bound Aβ could serve as a more reflective circulating biomarker of brain plaque load. To test this hypothesis, different APEX assays were developed with various antibodies to evaluate different populations of circulating Aβ42 from clinical blood samples (FIG. 15a). Specifically, to characterize the exosome-bound Aβ42 population, APEX assay was designed to enrich for Aβ42 directly from native plasma and measure the relative amount of CD63 associated with the captured Aβ42. This assay configuration not only showed specific detection for the Aβ42+CD63+ population (FIG. 15b-c), but also reflected functional relevance: with the enhanced binding between prefibrillar Aβ aggregates and exosomes, the associated CD63 signal could be considered as a surrogate indicator to measure the relative amount of prefibrillar Aβ42 among total circulating Aβ42. To illustrate the existence of the unbound Aβ42 population, size-exclusion filtration was used to remove large-sized retentate (e.g., exosomes) in plasma before measuring Aβ42 in the plasma filtrate. Finally, to measure total circulating Aβ42, native plasma was evaluated through direct Aβ42 enrichment and Aβ42 detection.

We next conducted a feasibility clinical study aimed at addressing the following key questions: (1) can APEX measure circulating Aβ42 directly from blood samples, (2) how correlative are different populations of blood-borne Aβ42 with brain plaque load, and (3) can specific populations of circulating Aβ42 distinguish various clinical groups?

To achieve these goals, age-matched subjects (n=84), diagnosed as AD (n=17), mild cognitive impairment (MCI, n=18), healthy controls with no cognitive impairment (NCI, n=16), as well as clinical controls with vascular dementia (VaD, n=9) and neurovascular compromises (i.e., vascular mild cognitive impairment, VMCI, n=12; and acute stroke, n=12), were recruited. All clinical information can be found in Table 2. All subjects were recruited for blood sampling and APEX analysis. With the exception of the acute stroke patients, all subjects were also consented for concurrent PET imaging of brain amyloid plaque. Blood plasma samples were collected just prior to the infusion of Pittsburgh compound B (PiB) radiotracer for PET imaging. Across and within the imaged clinical groups, PET imaging revealed a broad range of brain plaque load (FIG. 4a) and demonstrated brain regional variations (Table 2), consistent with other published clinical studies.

TABLE 2

Clinical information and PET imaging standardized uptake value ratio (SUVR).

| Recruitment diagnosis | Number of subjects n = 84 | Female (%) | Male (%) | Age Range | Median Age | Standardized uptake value ratio (SUVR) | | | | |
|---|---|---|---|---|---|---|---|---|---|---|
| | | | | | | Left-posterior-cingulate | Right-posterior-cingulate | Left-occipital | Right-occipital | Global average |
| Alzheimer's disease (AD) | 17 | 14 (82%) | 3 (18%) | 57-89 | 76 | 1.26-2.58 | 1.28-2.51 | 1.17-1.94 | 1.20-1.97 | 1.18-2.14 |
| Mild cognition impairment (MCI) | 18 | 7 (39%) | 11 (61%) | 58-82 | 75 | 1.05-2.66 | 1.11-2.54 | 1.07-1.84 | 1.05-2.28 | 1.06-2.26 |
| No cognitive impairment (NCI) | 18 | 7 (44%) | 9 (56%) | 55-83 | 75 | 1.12-1.97 | 1.02-2.18 | 1.07-1.84 | 1.07-1.73 | 1.09-1.74 |
| Vascular dementia (VaD) | 9 | 5 (56%) | 4 (44%) | 59-91 | 76 | 0.93-1.41 | 0.90-1.32 | 0.92-1.54 | 0.92-1.52 | 1.03-1.35 |
| Vascular mild cognition impairment (VMCI) | 12 | 7 (58%) | 5 (42%) | 62-81 | 72 | 1.04-2.20 | 1.01-2.14 | 1.04-1.65 | 1.05-1.65 | 1.06-2.02 |
| Acute stroke | 12 | Anonymous and de-identified | | | | PET imaging of amyloid plaque not performed | | | | |

AD: Alzheimer's disease,
MCI: mild cognitive impairment,
NCI: no cognitive impairment,
VaD: vascular dementia,
VMCI: vascular mild cognitive impairment.

Using the developed APEX assays (FIG. 11a), we evaluated different populations of circulating Aβ42 in these clinical plasma samples, namely the exosome-bound Aβ42, the unbound population, as well as the total circulating Aβ42 (FIG. 4b). The exosome-bound Aβ42 population showed strong co-localization signals with exosomal markers (i.e., CD63, CD9 and CD81) and neuronal markers (i.e., NCAM, L1CAM and CHL-1), suggesting that neuronal exosomes could constitute a substantial proportion of the population (FIG. 16a). As the unbound Aβ42 measurements were performed from plasma filtrates, we further characterized these filtrates and confirmed their negligible vesicle counts and minimal co-localization signals with exosomal and neuronal markers (FIG. 16b-c). When correlated to global PET amyloid imaging, the exosome-bound Aβ42 measurements showed the best correlation (FIG. 4b, left, $R^2=0.9002$), as compared to that of the unbound Aβ42 (FIG. 4b, center, $R^2=0.0193$) or the total Aβ42 (FIG. 4b, right, $R^2$ 0.1471). Interestingly, unlike the poor and negative association demonstrated by the total Aβ42 measurements (as shown in the present study as well as other published reports), the relative CD63 measurements from the exosome-bound Aβ42 population showed a highly correlated and positive association to PET imaging of brain amyloid plaque. We attribute this finding to the similar binding preferences of exosomes and PET tracers to Aβ42: (1) exosomes showed enhanced association with prefibrillar Aβ42 aggregates, particularly bigger aggregates which can readily form fibrils (FIG. 3d), and (2) PET tracers avidly bind to larger amyloid fibrils, but show little binding to smaller aggregates. Notably, this superior correlation also demonstrated brain region specificity; the exosome-bound Aβ42 measurements showed a stronger correlation to the brain plaque load in the cingulate region (early AD-affected region, FIG. 17a) than to that of the occipital region (late AD-affected region, FIG. 17b).

On distinguishing the clinical diagnoses, only the APEX analysis of exosome-bound Aβ42, but not that of the unbound population or total Aβ42 population, demonstrated good specificity (FIG. 4d). In particular, the exosome-bound Aβ42 measurements could differentiate not only between the AD clinical groups (i.e., AD and MCI, P<0.01), but also from other healthy and clinical controls (P<0.0001, Student's t-test). This demonstrated specificity is comparable to that of the PET brain amyloid imaging in distinguishing the various clinical groups (FIG. 18). Nanoparticle tracking analysis of the plasma extracellular vesicles, on the other hand, did not reveal any significant difference in vesicle size or concentration across all clinical groups (FIG. 19).

Example 2

AD is the most common form of severe dementia. Due to its complex and progressive neuropathology, early detection and timely intervention are essential to the success of disease modifying therapies. Despite intense interest in finding serologic biomarkers of AD, their development has been confounded by several challenges. First, unlike their counterparts in cerebrospinal fluid, pathological AD molecules in the circulation demonstrate a much lower concentration. Plasma Aβ levels tend to be near the lower limits of detection of conventional ELISA assays; this limitation could have contributed to several conflicting findings in published reports. Second, little correlation has been established between plasma Aβ analysis with brain plaque deposition, the earliest pathological hallmark of AD. One possible reason for this could arise from the different measurement methodologies. PET imaging probes, commonly used to determine brain amyloid burden, preferentially measure insoluble fibrillar deposits while conventional ELISA measures soluble Aβ in plasma. In addition, potential correlations of blood-based measurements to brain pathology may have been masked by previous ensemble blood measurements. However, this difference warrants a more fundamental question—if there are subpopulations of circulating Aβ proteins that could better reflect the fibrillar pathology in the brain.

A dedicated analytical platform (APEX) for multiparametric analysis of exosome-bound Aβ, unbound Aβ and total Aβ directly from blood plasma was developed to differentiate different populations of circulating Aβ. Specifically, it leverages on new advances in sensor design, device fabrication and assay development to achieve enhanced optical performance and detection capabilities (FIGS. 20A and 20B). In terms of sensor design and fabrication, the APEX platform constitutes a periodic array of gold nanoholes, suspended on a patterned silicon nitride membrane, and is fabricated through deep ultraviolet lithography, the state-of-the-art fabrication process for large-scale, precise nanopatterning. These advances propelled the APEX technology to achieve 1) an improved optical performance (i.e., enhanced transmission intensity to enable SPR detection via bidirectional light illumination) and 2) reliable mass production. In terms of assay technology, the APEX platform exploits a rapid, in situ enzymatic conversion to achieve a highly localized, amplified signal. This development not only enables sensitive detection of diverse targets (e.g., intravesicular proteins and RNA targets), but also facilitates exosome co-localization analyses for multi-parametric population studies, as the insoluble deposits are locally formed only when multiple targets are concurrently found in exosomes. Through these integrated advances, the observed APEX sensitivity is thus the best reported so far for exosome profiling and surpasses standard ELISA measurements by several orders of magnitude. Using the developed APEX platform, we demonstrated the enhanced binding between exosomes and bigger prefibrillar Aβ, a key building block of fibrillar amyloid plaque. Subpopulations of exosome-bound amyloid (CD63+Aβ42+) were further identified and quantified in clinical plasma samples, which were found to be highly correlative to brain amyloid plaque burden, across a diverse clinical population (i.e., AD, MCI, cognitively normal controls, and clinical controls with other neurodegenerative and neurovascular diseases).

Evaluating different populations of circulating Aβ could lead to a paradigm shift in AD research and clinical care. Accumulating evidence supports that prefibrillar Aβ aggregates could function as toxic drivers of AD neurodegeneration. Their preferential association with exosomes, as well as recent findings on the enrichment of exosomal markers in human amyloid plaques, not only sheds light on possible new mechanisms of plaque seeding, but also suggests the importance of exosome-bound Aβ as a more reflective circulating biomarker of the complex AD pathology. It is thus envisioned that the present study could complement other pre-clinical and clinical studies, with respect to both technology development as well as biomarker refinement. In terms of technology development, for example, while IP-mass spectrometry enables unbiased molecular screening and is valuable for biomarker discovery, especially in the detection of different molecular isoforms and variants (e.g., (APP)669-711 and Aβ1-40), the APEX technology provides rapid and sensitive readouts from native plasma samples, without requiring extensive sample processing that is typically necessary for mass spectrometry measurements, and is thus suitable for targeted clinical measurements. In terms of biomarker refinement, as demonstrated by the current study, analysis of different populations of circulating Aβ could reveal novel correlations previously masked by ensemble blood measurements, and advance future blood-based clinical management of AD. Importantly, with more than 400 AD clinical trials at present, it is further envisioned that the developed methodology could be strengthened to redefine the current standard-of-care for patients. Through additional technical innovations, such as on-chip exosome processing, combinatorial analysis of other AD markers, as well as longitudinal clinical cohort validation, the developed technology could provide comprehensive capabilities to facilitate minimally-invasive early detection, molecular stratification and serial monitoring, all of which are critical for objective evaluation of disease-modifying therapies at different stages of clinical trials.

Example 3

This example shows that incubating amylogenic protein aggregates with an inhibitor reduced spontaneous protein aggregation.

Methods

Aggregate size determination. Hydrodynamic diameter of amylogenic protein and BSA aggregates were determined by dynamic light scattering analysis (Zetasizer Nano ZSP, Malvern). 3×14 measurement runs were performed at 4° C. Z-average diameter and polydispersity were analyzed. For every measurement, the auto-correlation function and polydispersity index were monitored to ensure sample quality for size determination.

Protein aggregation. Lyophilized amylogenic protein was resuspended in NaOH (60 mM, 4° C.), sonicated, and pH adjusted to pH 7.4 in PBS. The protein was immediately filtered through a 0.2-μm membrane filter (Millipore) and the filtrate was used as the small initial aggregates. For preparation of the bigger aggregates, the protein was treated as described above and incubated with agitation for 1 h to induce further aggregation. For treatment with inhibitors, 10 μM of inhibitor (e.g. methylene blue) was added to protein before the incubation. Aggregate size determination was performed at the end of the incubation.

Optical analysis. For experimental analysis, a tungsten halogen lamp (StockerYale Inc.) was used to back illuminate the APEX sensor through a ×10 microscope objective. Transmitted light was collected by an optical fiber and fed into a spectrometer (Ocean Optics). All measurements were performed at room temperature, in an enclosed box to eliminate ambient light interference. The transmitted light intensity was digitally recorded in counts against wavelength. For spectral analysis, the spectral peaks were determined using a custom-built R program by fitting the transmission peak using local regression method. All fittings were done locally. That is, for the fit at point x, the fit is made using points near x, weighted by their distance from x. In comparison to fitting by multi-order polynomial curve, this method could eliminate the result variation caused by the number of data points and data range being analyzed. All spectral shifts (Δλ) were determined as changes in the transmission spectral peaks, and calculated relative to appropriate control experiments.

Characterization of exosome-protein association. The prepared protein aggregates (Aβ42 and BSA control) were used for surface functionalization onto the APEX sensors, via EDC/NHS coupling as previously described. Unbound protein aggregates were washed away with PBS. The amount of protein conjugated was measured from the resultant transmission spectral shifts. We used this information to determine the number of conjugated protein aggregates and their associated total protein surface area for exosome binding (see below for detailed information), so as to normalize for binding affinities. Following surface functionalization with the protein aggregates, exosomes were introduced onto the sensors. Spectral changes were measured every 3 s for a total duration of 480 s to construct real-time kinetics sensorgrams. Exosome association kinetics and binding affinities were determined for different-sized protein aggregates.

To account for protein aggregate size differences as well as SPR-associated exponential decay of sensitivity (with increasing distance from the sensor surface), the following equation was used to calculate the total surface area of the conjugated aggregates for interaction with exosomes:

$$S = E \times \int_0^{2r} \pi [r^2 - (r-z)^2] \times e^{(-2z/l_d)} dz$$

where S is the signal, z is the distance from the sensor surface, E is the electric field at z=0 and a constant in this case, $l_d$ is the decay length and is set at 200 nm with the current sensor design, r is the radius of the conjugated protein aggregate.

All protein aggregates were approximated as spheres, and their r determined from dynamic light scattering analysis. We used the above equation to determine the number of protein aggregates conjugated onto the sensor as well as their respective total surface area, to estimate the number of available binding sites for interaction with exosomes. All exosome binding data (Δλ) were normalized against their respective protein binding sites. Normalized Aβ42 binding data were made relative to similar-sized BSA controls and fitted to determine the binding affinity constant $K_D$.

miRNA analysis. Exosome lysate was incubated with biotinylated RNA probes followed by RNA duplex capture on p19-functionalized APEX sensor and APEX signal amplification.

Results

The pathology of a number of neurodegenerative diseases—Alzheimer's disease, Parkinson's disease and amyotrophic lateral sclerosis, involves the aggregation of misfolded amylogenic proteins. Treatments targeting protein aggregation involves various strategies for the clearance of aggregated amylogenic proteins, including breaking apart aggregates of the amylogenic proteins or inhibiting the aggregation of the amylogenic proteins. Molecules that were shown to be effective in reducing the amount of amylogenic protein aggregates, and thus potential candidates for disease-modifying therapies, include methylthioninium chloride, leuco-methylthioninium bis(hydromethanesulfonate), curcumin, acid fuchsin, epigallocatechin gallate, safranal, congo red, apigenin, azure C, basic blue 41, (trans,trans)-1-bromo-2,5-bis-(3-hydroxycarbonyl-4-hy-droxy)styrylbenzene (BSB), Chicago sky blue 6B, -cyclodextrin, daunomycin hydrochloride, dimethyl yellow, direct red 80, 2,2-dihydroxybenzophenone, hexadecyltrimethylammonium bromide (C16), hemin chloride, hematin, indomethacin, juglone, lacmoid, meclocycline sulfosalicylate, melatonin, myricetin, 1,2-naphthoquinone, nordihydroguaiaretic acid, R( )-norapomorphine hydrobromide, orange G, o-vanillin (2-hydroxy-3-methoxybenzaldehyde), pherphenazine, phthalocyanine, rifamycin SV, phenol red, rolitetracycline, quinacrine mustard dihydrochloride, thioflavin S, ThT, and trimethyl(tetradecyl)ammonium bromide (C17), diallyltartar, eosin Y, fenofibrate, neocuproine, nystalin, octadecylsulfate, and rhodamine B.

As no animal model has been demonstrated to exhibit accurate pathology that is reflective of the AD pathology in the human brain, we utilized an in vitro experiment to model the effect of disease-modifying treatment in the inhibition of aggregation of amylogenic proteins. The initial size of the amylogenic protein was confirmed by dynamic light scattering analysis before aliquots of the protein were incubated with or without inhibitor. In the absence of inhibitor, the protein aggregates grew in size, with increasing incubation duration, as a result of the spontaneous aggregation of the amylogenic protein. In presence of the inhibitor, however, the increase in size as a result of spontaneous protein aggregation was minimal, resulting the formation of smaller protein aggregates.

Following incubation, the amylogenic proteins were functionalized onto the surface of the sensor chip before being incubated with neuronal exosomes. Neuronal exosomes were observed to have a preferential association with the larger protein aggregates, as seen by the difference in binding affinities, and demonstrated reduced binding to the inhibitor-treated, smaller protein aggregates. As the association of the exosomes with proteins can be a surrogate indicator of the biophysical and/or biochemical properties of the proteins—properties that are affected by disease-modifying therapeutics—the APEX platform enables efficacy assessment of disease-modifying therapeutics.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

All publications, sequence accession numbers, patents, and patent applications cited herein are hereby incorporated by reference in their entirety for all purposes.

Exemplary Embodiments of the Disclosure

In some aspects and embodiments, described herein is:

A sensor chip comprising a conductive layer on a membrane support layer, wherein a plurality of apertures extend through the conductive layer and the membrane support layer and are arranged such that illumination of the conductive layer and/or the membrane support layer produces a surface plasmon resonance.

In some embodiments, the conductive layer is gold, silver, aluminum, sodium, indium or titanium.

In some embodiments, the membrane support layer is silicon nitride or sodium dioxide.

In some embodiments, the apertures have a diameter of about 150 nm to about 450 nm.

In some embodiments, the apertures are arranged periodically.

In some embodiments, the apertures have a periodicity of about 250 nm to about 650 nm.

In some embodiments, a first recognition molecule is immobilized onto the surface of the conductive layer.

In some embodiments, the apertures are arranged such that the surface plasmon resonance produced on illumination has a decay length approximately equal to a diameter of a target of the first recognition molecule.

In some embodiments, the conductive layer and the membrane support layer are disposed on a substrate, the substrate having a void formed therein in a region adjacent to the plurality of apertures to enable illumination of the conductive layer and/or the membrane support layer in either direction to produce the surface plasmon resonance.

In another aspect, described herein is an imaging system comprising a light source, a detector, and a sensor chip of any one of 1-9, wherein the light source is arranged to illuminate the sensor chip and the detector is positioned to detect light transmitted through the sensor chip.

In another aspect, described herein is a method of fabricating a sensor chip, the method comprising main steps of: a) providing a top membrane support layer; b) depositing a conductive layer on the top membrane support layer; forming a plurality of apertures that extend through the membrane support layer, said apertures also extending through the conductive layer, and being arranged such that illumination of the conductive layer and/or the top membrane support layer produces a surface plasmon resonance.

In some embodiments, the method comprises: coating the top membrane support layer and a bottom membrane support layer on the top and bottom surfaces of a silicon substrate; providing a layer of photoresist on the top membrane support layer, and defining a plurality of apertures in the photoresist via deep ultraviolet lithography (DUV) and transferring the pattern of the plurality of apertures to the top membrane support layer via reaction ion etching (RIE).

In some embodiments, the method further comprises the steps of: removing the photoresist on the top membrane support layer and coating a silicon dioxide protective layer on the surface of the top membrane support layer; coating a layer of photoresist on the bottom membrane support layer; defining a sensing area in the photoresist via photolithography; and transferring the pattern of the sensing area to the bottom membrane support layer via reaction ion etching (RIE); transferring the pattern of the sensing area to the silicon substrate; removing the protective layer on the surface of the top membrane support layer with diluted hydrogen fluoride; and depositing the conductive layer on the top membrane support layer.

In another aspect, described herein is a method of detecting an analyte in a sample, the method comprising: a) capturing an analyte onto a surface of a sensor chip of anyone of 1-9; and b) detecting binding of a second recognition molecule to the captured analyte on the surface of the sensor chip, wherein the second recognition molecule is specific to the analyte, wherein an increased binding of the second recognition molecule as compared to a control sample indicates the presence of the analyte in the sample.

In some embodiments, the second recognition molecule is specific to the analyte, wherein the second recognition molecule is coupled to a signal amplification moiety, and wherein the signal amplification moiety is capable of inducing the formation of an insoluble aggregate of increased optical density relative to that of the captured analyte.

In some embodiments, the second recognition molecule is fused to the signal amplification moiety.

In some embodiments, the signal amplification moiety is an enzyme.

In some embodiments, the enzyme is horse radish peroxidase.

In some embodiments, the method further comprises contacting the enzyme with an enzyme substrate.

In some embodiments, the signal amplification moiety is a secondary antibody capable of binding to the second recognition molecule.

In some embodiments, a first recognition molecule is immobilized on the surface of the surface plasmon resonance sensor chip, wherein the first recognition molecule is capable of capturing the analyte on the surface of the sensor chip.

In some embodiments, the analyte is an exosome-bound biomarker.

In some embodiments, the method comprises detecting two or more analytes that are co-localized in the sample.

In another aspect, described herein is a kit comprising a sensor chip described herein.

In some embodiments, the kit comprises a second recognition molecule for detecting a captured analyte on the surface of the sensor chip.

In some embodiments, the second recognition molecule is coupled to a signal ampli-fication moiety, and wherein the signal amplification moiety is capable of inducing the formation of an insoluble aggregate of increased optical density relative to that of the captured analyte.

In another aspect, described herein is a method of detecting a neurodegenerative disease or amyloidosis in a subject, the method comprising: a) contacting a sample from the subject with the surface of a sensor chip of any one of 1-9; and b) detecting binding of a second recognition molecule to an analyte captured on the surface of the sensor chip, herein the second recognition molecule is specific to the analyte, wherein an increased binding of the second recognition molecule as compared to a control sample or control subject indicates that the subject is suffering from a neurodegenerative disease.

In some embodiments of the method, the second recognition molecule is coupled to a signal amplification moiety, and wherein the signal amplification moiety is capable of inducing the formation of an insoluble aggregate of increased optical density relative to that of the captured analyte.

In some embodiments, the analyte is an exosome-associated biomarker.

In some embodiments, the analyte is an exosome-associated biomarker or biomarker contained within exosome.

In some embodiments, the biomarker is selected from the group consisting of Aβ, APP, α-Syn, CD9, CD63, CD81, ALIX, TSG101, Flotilin-1, Flotilin-2, LAMP-1, HSP70, HSP90, CHL1, IRS-1, L1CAM, NCAM, Tau, APOE, SOD1, TDP-43, bassoon, fibronectin, DNA, and RNA or combinations and associated complexes thereof.

In some embodiments, the Aβ is Aβ42, Aβ40, Aβ39 or Aβ38.

In some embodiments, the neurodegenerative disease is selected from the group consisting of Alzheimer's disease, mild cognitive impairment, dementia, vascular dementia, Parkinson's disease, Amyotrophic lateral sclerosis, Multiple sclerosis, Progressive supranuclear palsy, Taupathies, and/or vascular mild cognitive impairment.

In some embodiments, the method further comprises treating the subject found to be suffering from a neurodegenerative disease.

In some embodiments, the treating comprises administering a therapeutically effective amount of one or more drugs, or a combination thereof, to the subject.

In some embodiments, the drug is selected from a cholinesterase inhibitor such as Donepezil, Rivastigmate, or Galantamine; an NMDA receptor antagonist, such as Memantine; a combination of acholinesterase inhibitor and a NMDA receptor antagonist such as a combination between Donepezil and Memantine; a BACE1 inihibitor such as AZD3293; an antibody such as Aducanumab; or an anti-tau drug such as TRx0237 (LMTX).

In some embodiments, the drug is selected from methylthioninium chloride, leuco-methylthioninium bis(hydromethanesulfonate), curcumin, acid fuchsin, epigallocatechin gallate, safranal, congo red, apigenin, azure C, basic blue 41, (trans,trans)-1-bromo-2,5-bis-(3-hydroxycarbonyl-4-hydroxy)styrylbenzene (BSB), Chicago sky blue 6B, -cyclodextrin, daunomycin hydrochloride, dimethyl yellow, direct red 80, 2,2-dihydroxybenzophenone, hexadecyltrimethylammonium bromide (C16), hemin chloride, hematin, indomethacin, juglone, lacmoid, meclocycline sulfosalicylate, melatonin, myricetin, 1,2-naphthoquinone, nordihydroguaiaretic acid, R( )-norapomorphine hydrobromide, orange G, o-vanillin (2-hydroxy-3-methoxybenzaldehyde), pherphenazine, phthalocyanine, rifamycin SV, phenol red, rolitetracycline, quinacrine mustard dihydrochloride, thioflavin S, ThT, and trimethyl(tetradecyl)ammonium bromide (C17), diallyltartar, eosin Y, fenofibrate, neocuproine,

What is claimed is:

1. An imaging system comprising:
 a) a light source;
 b) a detector;
 c) a sensor chip comprising:
  i) a conductive layer on a membrane support layer wherein the conductive layer and the membrane support layer are disposed on a substrate, the substrate having a void formed therein in a region adjacent to a plurality of apertures to enable illumination of the membrane support layer to produce a surface plasmon resonance;
  ii) the plurality of apertures extending through the conductive layer and the membrane support layer, wherein the plurality of apertures are arranged such that illumination of the membrane support layer produces the surface plasmon resonance; and iii) a first recognition molecule that bids specifically to a first analyte, the first recognition molecule being immobilized onto a surface of the conductive layer; and d) a second recognition molecule that binds specifically to the first analyte or to a second analyte that is co-localized on a cell or exosome with the first analyte, wherein the second recognition molecule is coupled to a signal amplification moiety, and wherein the signal amplification moiety is capable of inducing the formation of an insoluble aggregate of increased optical density relative to that of the first analyte when the first analyte is captured by the first recognition molecule, wherein the light source is arranged for illumination of the membrane support layer, and the detector is positioned to detect light transmitted through the sensor chip.

2. The imaging system of claim 1, wherein the conductive layer is gold, silver, aluminum, sodium, indium or titanium.

3. The imaging system of claim 1, wherein the membrane support layer is silicon nitride or silicon dioxide.

4. The imaging system of claim 1, wherein the apertures have a diameter of about 150 nm to about 450 nm.

5. The imaging system of claim 1, wherein the apertures are arranged periodically.

6. The imaging system of claim 5, wherein the apertures have a periodicity of about 250 nm to about 650 nm.

7. The imaging system of claim 1, wherein the apertures are arranged such that the surface plasmon resonance produced on illumination has a decay length approximately equal to a diameter of the first analyte.

8. A method of detecting a first analyte in a sample or of detecting a cell or exosome on which a first analyte and a second analyte are co-localized in a sample, the method comprising:

a) An imaging system comprising:
A light source;
A detector;
A sensor chip comprising:
A conductive layer on a membrane support layer, wherein the conductive layer and the membrane support layer are disposed on a substrate, the substrate having a void formed therein in a region adjacent to a plurality of apertures to enable illumination of the membrane support layer to produce a surface plasmon resonance;
The plurality of apertures extending through the conductive layer and the membrane support layer, wherein the plurality of apertures are arranged such that illumination of the membrane support layer produces the surface plasmon resonance; and
A first recognition molecule that binds specifically to the first analyte, the first recognition molecule being immobilized onto a surface of the conductive layer; and
A second recognition molecule that binds specifically to the first analyte or to the second analyte that is co-localized on a cell or exosome with the first analyte, wherein the second recognition molecule is coupled to a signal amplification moiety, and wherein the signal amplification moiety is capable of inducing the formation of an insoluble aggregate of increased optical density relative to that of the first analyte when the first analyte is captured by the first recognition molecule, Wherein the light source is arranged for illumination of the membrane support layer and the detector is positioned to detect light transmitted through the sensor chip;

b) capturing the first analyte onto the surface of the conductive layer of the sensor chip; and c) detecting binding of the second recognition molecule to the captured first analyte on the surface of the conductive layer of the sensor chip, or to the second analyte co-localized on a cell or exosome with the captured first analyte, wherein an increased binding of the second recognition molecule as compared to a control sample indicates the presence of the first analyte in the sample or indicates the presence of a cell or exosome on which the first analyte and the second analyte are co-localized in the sample.

9. The method of claim 8, wherein the second recognition molecule binds specifically to the first analyte.

10. The method of claim 9, wherein the second recognition molecule is fused to the signal amplification moiety, or the signal amplification moiety is an enzyme or a secondary antibody capable of binding to the second recognition molecule.

11. The method of claim 10, wherein the enzyme is horse radish peroxidase, and the method further comprises contacting the enzyme with an enzyme substrate.

12. The method of claim 8, wherein the second analyte is an exosome-bound biomarker.

13. The imaging system of claim 1, wherein the first analyte comprises a protein, a nucleic acid, or a combination, association, or organizational subunit of a protein or nucleic acid.

14. The imaging system of claim 1, wherein the first analyte is a protein, and wherein the second analyte is an exosome-bound biomarker.

15. The imaging system of claim 14, wherein the protein is amyloid β (Aβ), amyloid precursor protein (APP), α-synuclein (α-Syn), insulin receptor substrate 1 (IRS-1), NCAM, tau protein, lipoprotein (APOE), SOD1 TDP-43, bassoon, or fibronectin.

16. The imaging system of claim 14, wherein the exosome—bound biomarker is CD9, CD63, CD81, ALIX, TSG101, Flotilin-1, LAMP-1, HSP70, or HSP90.

17. The imaging system of claim 1, wherein the second recognition molecule is fused to the signal amplification moiety.

18. The imaging system of claim 1, wherein the signal amplification moiety is an enzyme.

19. The imaging system of claim 18, wherein the enzyme is horse radish peroxidase.

20. The imaging system of claim 18, wherein the imaging system further comprises a substrate of the enzyme.

21. The imaging system of claim 1, wherein the signal amplification moiety is a secondary antibody capable of binding to the second recognition molecule.

* * * * *